(12) United States Patent
Fukuda et al.

(10) Patent No.: US 7,460,383 B2
(45) Date of Patent: Dec. 2, 2008

(54) STORAGE APPARATUS, CONTROLLER AND CONTROL METHOD

(75) Inventors: Hideaki Fukuda, Odawara (JP); Naoki Moritoki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 11/563,855

(22) Filed: Nov. 28, 2006

(65) Prior Publication Data
US 2008/0086585 A1     Apr. 10, 2008

(30) Foreign Application Priority Data
Oct. 10, 2006     (JP)     ............................ 2006-276917

(51) Int. Cl.
*G11C 15/00*     (2006.01)
(52) U.S. Cl. .................. 365/49; 365/221; 365/185.22
(58) Field of Classification Search .................. 365/49, 365/221, 185.22, 185.08, 185.33, 189.01, 365/189.04; 711/100, 113
See application file for complete search history.

(56) References Cited

U.S. PATENT DOCUMENTS 5,784,712 A * 7/1998 Byers et al. .................. 711/219
2007/0220210 A1* 9/2007 Grimsrud .................... 711/141

FOREIGN PATENT DOCUMENTS

JP     2004-021811     1/2004

* cited by examiner

*Primary Examiner*—Dang T. Nguyen
(74) *Attorney, Agent, or Firm*—Mattingly, Stanger, Malur & Brundidge, P.C.

(57) ABSTRACT

Proposed is a highly reliable storage apparatus with fast access speed and low power consumption, as well as a controller and control method for controlling such a storage apparatus. This storage apparatus is equipped with a flash memory that provides a storage extent for storing data, a disk-shaped memory device with more data write cycles than the flash memory, and a cache memory with faster access speed than the flash memory. Data provided from a host system is stored in the cache memory, this data is read from the cache memory at a prescribed timing, data read from the cache memory is stored in the disk-shaped memory device, and, when a prescribed condition is satisfied, this data is read from the disk-shaped memory device, and the data read from the disk-shaped memory device is stored in the flash memory.

18 Claims, 42 Drawing Sheets

FIG.5

| FM BLOCK NUMBER | CM HIT/MISS INFORMATION | HDD HIT/MISS INFORMATION | CM ADDRESS | HDD ADDRESS | HDD DATA IN-MIGRATION FLAG | FM DATA IN-MIGRATION FLAG |
|---|---|---|---|---|---|---|
| BLOCK NUMBER 1 | Hit or Miss | Hit or Miss | xxxx | xxxx | 1 or 0 | 1 or 0 |
| ⋅⋅⋅ | ⋅⋅⋅ | ⋅⋅⋅ | ⋅⋅⋅ | ⋅⋅⋅ | ⋅⋅⋅ | ⋅⋅⋅ |
| BLOCK NUMBER n-1 | Hit or Miss | Hit or Miss | xxxx | xxxx | 1 or 0 | 1 or 0 |
| BLOCK NUMBER n | Hit or Miss | Hit or Miss | xxxx | xxxx | 1 or 0 | 1 or 0 |
| 50A | 50B | 50C | 50D | 50E | 50F | 50G |

50

STORAGE APPARATUS, CONTROLLER AND CONTROL METHOD

CROSS REFERENCES

This application relates to and claims priority from Japanese Patent Application No. 2006-276917, filed on Oct. 10, 2006, the entire disclosure of which is incorporated herein by reference.

BACKGROUND

The present invention generally relates to a storage apparatus, a controller and a control method, and, in particular, can be suitably applied to a storage apparatus adopting a flash memory as its memory device.

Conventionally, a semiconductor memory or a hard disk drive is used as the memory device in storage apparatuses. A semiconductor memory boasts such benefits as fast access speed, compact size, low power consumption and high reliability, but also has a drawback in that the cost per unit bit is expensive. Meanwhile, a hard disk drive has drawbacks in comparison to a semiconductor memory such as slow access speed, bulky size, high power consumption and low reliability, but also is advantageous in that the cost per unit bit is dramatically cheaper than a semiconductor memory.

Thus, in recent years, hard disk drives have become mainstream as the memory device in a storage system, and technological innovation relating to hard disk drives has accelerated. As a result, the storage capacity per unit area in a hard disk drive has increased by leaps and bounds.

In addition, reliability, which was the weak point of hard disk drives, has improved due to the application of RAID (Redundant Array of Inexpensive Disks) technology, and in recent years a large-scale storage system with a capacity of several TB has appeared in the market.

Meanwhile, in recent years, a flash memory as a semiconductor device enabling the free rewriting of data and which retains data even when the power is turned off is being widely used as a memory device. Pursuant to the diffusion of this flash memory, the cost per unit bit of flash memories is coming down.

Under the foregoing circumstances, it is anticipated that a storage apparatus equipped with a flash memory as the memory device will hit the streets in the future. By adopting the foregoing configuration, it is assumed that a storage apparatus with fast access speed and low power consumption can be realized.

Incidentally, Japanese Patent Laid-Open Publication No. 2004-21811 proposes a storage that consolidates a flash memory and a hard disk drive.

SUMMARY

Nevertheless, a flash memory is only able to guarantee a write cycle of roughly 100,000 times. Thus, when adopting a flash memory as the memory device in a storage system, it is anticipated that the flash memory will frequently malfunction if no measures are taken in view of the foregoing characteristics of a flash memory. As a result, if no measures are taken, much cost and labor will be required in replacing the flash memory, and the operating cost of the storage apparatus will increase drastically. In addition, reliability of the storage apparatus will be lost from the perspective of data protection.

The present invention was made in view of the foregoing points. Thus, an object of the present invention is to propose a highly reliable storage apparatus with fast access speed and low power consumption, as well as a controller and control method for controlling such a storage apparatus.

In order to achieve the foregoing object, the present invention provides a storage apparatus connected to a host system. This storage apparatus comprises a nonvolatile memory for storing data sent and received from the host system, a disk device for storing data sent and received from the host system, a cache memory for temporarily storing data sent and received from the host system, a first control unit for controlling the reading and writing of the data from and into the nonvolatile memory, a second control unit for controlling the reading and writing of the data from and into the disk device, and a third control unit for controlling reading and writing of the data from and into the cache memory. The first, second and third control units are connected via a mutual network. The third control unit stores the data sent from the host system in the cache memory, and reads the data from the cache memory at a prescribed opportunity and sends it to the second control unit. The second control unit stores the data sent from the third control unit in the disk device and, when a prescribed condition is satisfied, reads the data from the disk device and sends it to the first control unit. The first control unit stores the data sent from the second control unit in the nonvolatile memory.

The present invention further provides a controller for controlling a storage apparatus connected to a host system. This controller comprises a first control unit for controlling the reading and writing of data from and into a nonvolatile memory storing the data to be sent and received from the host system, a second control unit for controlling the reading and writing of data from and into a disk device storing data to be sent and received from the host system, and a third control unit for controlling the reading and writing of data from and into a cache memory temporarily storing the data to be sent and received from the host system. The first, second and third control units are connected via a mutual network. The third control unit stores the data sent from the host system in the cache memory, and reads the data from the cache memory at a prescribed opportunity and sends it to the second control unit. The second control unit stores the data sent from the third control unit in the disk device and, when a prescribed condition is satisfied, reads the data from the disk device and sends it to the first control unit. The first control unit stores the data sent from the second control unit in the nonvolatile memory.

The present invention additionally provides a control method of controlling a storage apparatus connected to a host system. The storage apparatus comprises a nonvolatile memory for storing data sent and received from the host system, a disk device for storing data sent and received from the host system, and a cache memory for temporarily storing data sent and received from the host system. The control method comprises a first step for storing the data sent from the host system in the cache memory, and reading the data from the cache memory at a prescribed opportunity, a second step for storing the data sent from the third control unit in the disk device and, when a prescribed condition is satisfied, reading the data from the disk device, and a third step for storing the data read from the disk device in the nonvolatile memory.

According to the present invention, the duration of the flash memory can be prolonged and problems caused by malfunctions of the flash memory can be prevented. Thus, it is possible to provide a highly reliable storage apparatus with fast access speed and low power consumption.

DESCRIPTION OF DRAWINGS

FIG. 4A to FIG. 4D-2 are conceptual diagrams explaining the outline of data read/write processing;

FIG. 5 is a diagram showing a data management table;

DETAILED DESCRIPTION

An embodiment of the present invention is now explained in detail with reference to the attached drawings.

Figure 1:
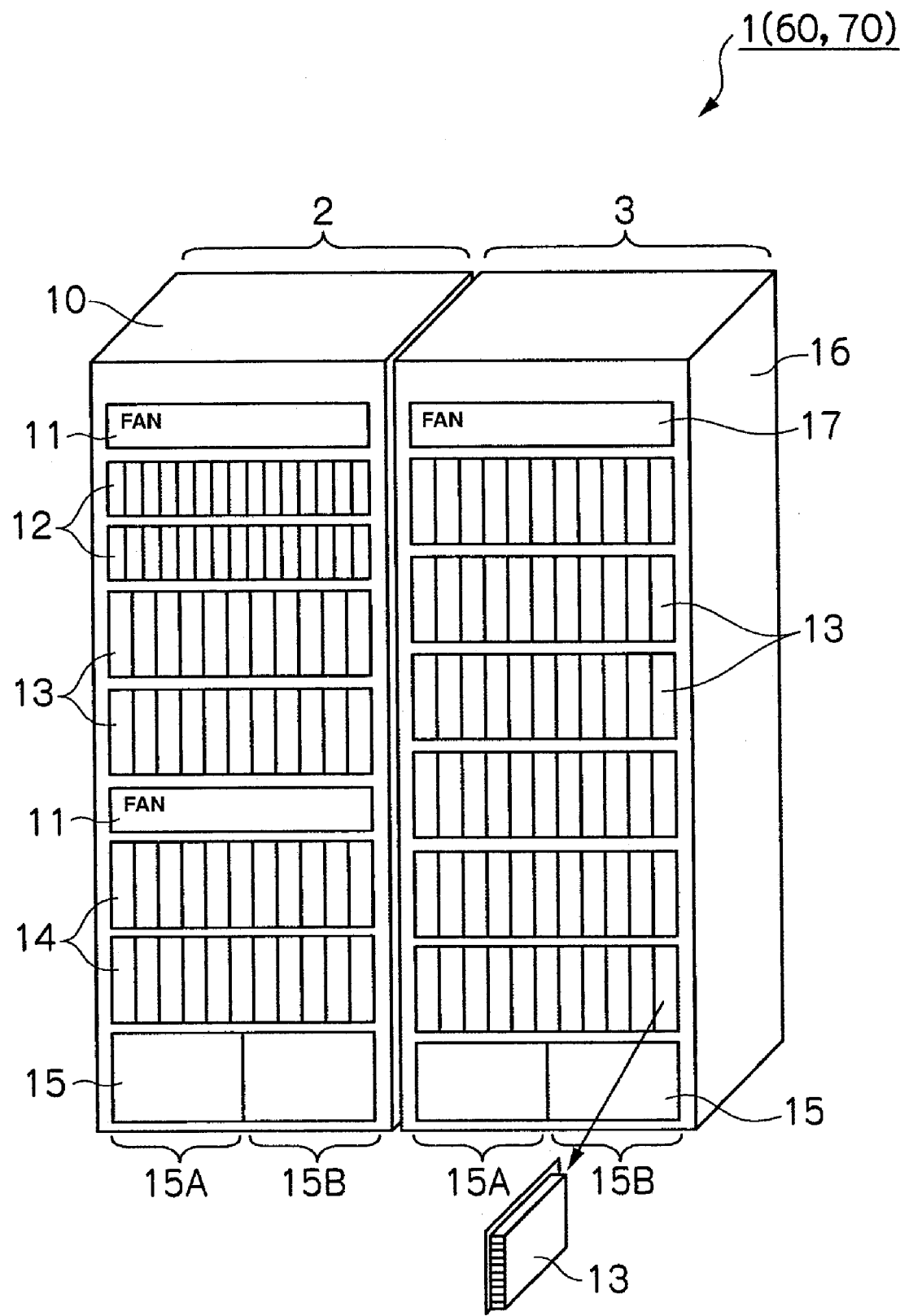
FIG. 1 is a perspective view schematically showing the external configuration of a storage system according to embodiments of the present invention.

(1) CONFIGURATION OF STORAGE SYSTEM IN PRESENT EMBODIMENT (1-1) External Configuration of Storage System FIG. 1 shows an overall storage system 1 according to an embodiment of the present invention. The storage system 1 comprises a storage controller 2 equipped with a data I/O control function for inputting and outputting data, and a storage apparatus 3 housing a plurality of flash memory packages 13.

The storage controller 2 is configured by housing a plurality of cooling fan units 11, a plurality of hard disk drive units 12, a plurality of flash memory packages 13, a plurality of logical substrates 14, and a plurality of power supply battery units 15 inside a rectangular rack frame 10.

The cooling fan unit 11 is a unit having one or more fans built therein, and is used for discharging the heat arising in the flash memory packages 13, the hard disk drive units 12, the logical substrates 14 and so on outside the rack frame 10.

The hard disk drive unit 12 is configured by housing, for instance, 3.5-inch hard disk drives in a case of a prescribed size. A connector (not shown) is provided to the back side of this case, and, by connecting this connector with a connector on a backboard (not shown) disposed inside the rack frame 10, the hard disk drive unit 12 can be mounted on the backboard in a physically and electrically connected state.

Figure 2:
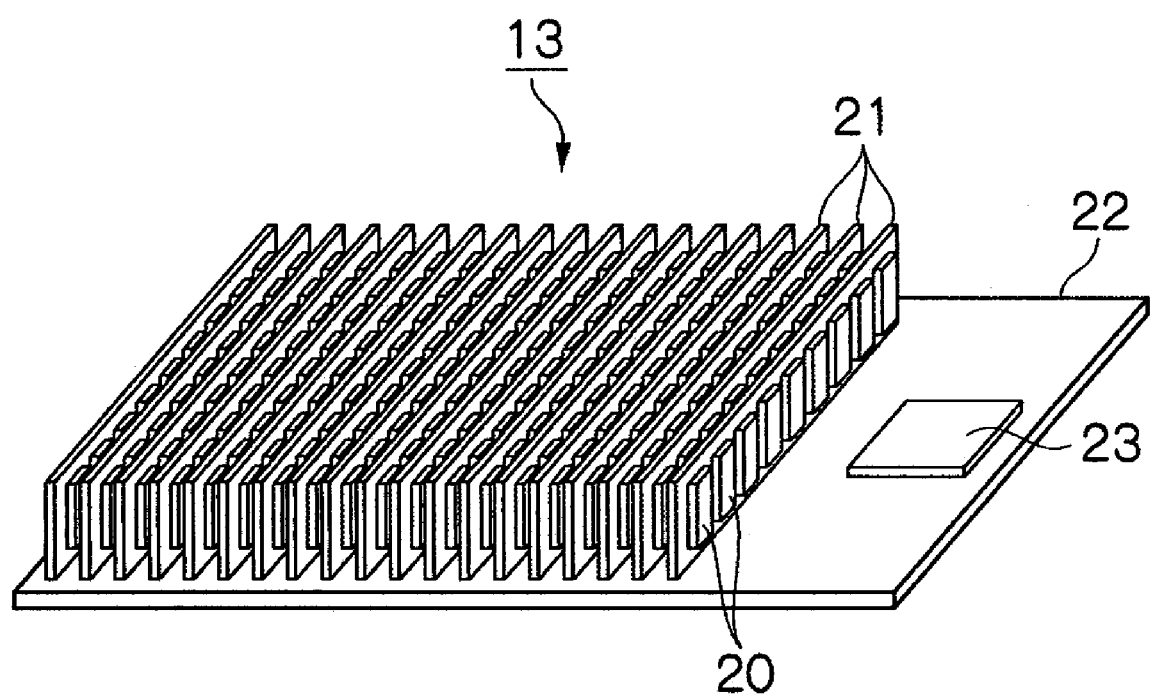
FIG. 2 is a perspective view schematically showing the configuration of a flash memory package.

The flash memory package 13, as shown in FIG. 2 for instance, is configured by a plurality of flash memory modules 21 respectively mounted with a plurality of flash memory chips (hereinafter also referred to as flash memories) 20 being replaceably mounted on a wiring board 22 of a prescribed size. A flash memory control LSI (Large Scale Integration) circuit 23 is mounted on one end of the wiring board 22, and a flash memory controller 33 described later formed in the flash memory control LSI circuit 23 is able to input and output data in and from the respective flash memory chips 20 in the flash memory package 13.

A connector (not shown) is provided to the back end of the flash memory package 13, and, by connecting this connector with a corresponding connector on a backboard (not shown) disposed inside the rack frame 10, the flash memory package 13 can be mounted on the backboard in a physically and electrically connected state.

The logical substrates 14 are configured from a channel controller 31, a disk controller 32, a cache memory 34, a cache memory controller 35, a connection 36, a processor unit 37 and the like described later with reference to FIG. 3. These logical substrate 14 are removeably connected to a backboard (not shown) disposed inside the rack frame 10 so as to enable communication with the other logical substrates 14 mounted inside the rack frame 10 via the backboard.

The power supply battery unit 15 is configured from a power supply unit 15A and a battery unit 15B. Among the above, the power supply unit 15A converts commercially available AC power supplied from the outside into DC power, and supplies this to the respective components inside the storage controller 2. Further, the battery unit 15B is used as a backup power supply for supplying power to the respective components inside the storage controller 2 during a blackout or a malfunction in the power supply unit 15A.

The rack frame 10 is configured so that it can be internally partitioned into a plurality of rows with partition boards. In this embodiment, the rack frame 10 is internally partitioned into a total of nine rows, and the cooling fan unit 11 is housed in the top row and the sixth row from the top, the hard disk units 12 are housed in the second and third rows from the top, the flash memory packages 13 are housed in the fourth and fifth rows from the top, the logical substrates 14 are housed in the seventh and eighth rows from the top, and the power supply battery units 15 are housed in the bottom row, respectively.

Meanwhile, the storage apparatus 3 is configured by housing the cooling fan unit 11, a plurality of flash memory packages 13 and the power supply battery unit 15 in a rack frame 16. The storage apparatus 3 is connected to the storage controller 2 via a communication cable not shown formed from a fiber channel or the like, and the logical substrates 14 in the storage controller 2 are thereby able to communicate with the respective flash memory packages 13 mounted on the storage apparatus 3 via such communication cable.

The rack frame 16 is basically configured the same as the rack frame 11 of the storage controller 2. In this embodiment, the rack frame 16 is internally partitioned into a total of eight rows, and the cooling fan unit 11 is housed in the top row and the power supply battery unit 15 is housed in the bottom row, respectively, and the flash memory packages 13 are respectively housed in each of the other rows other than the top row and the bottom row.

(1-2) Internal Configuration of Storage System

Figure 3:
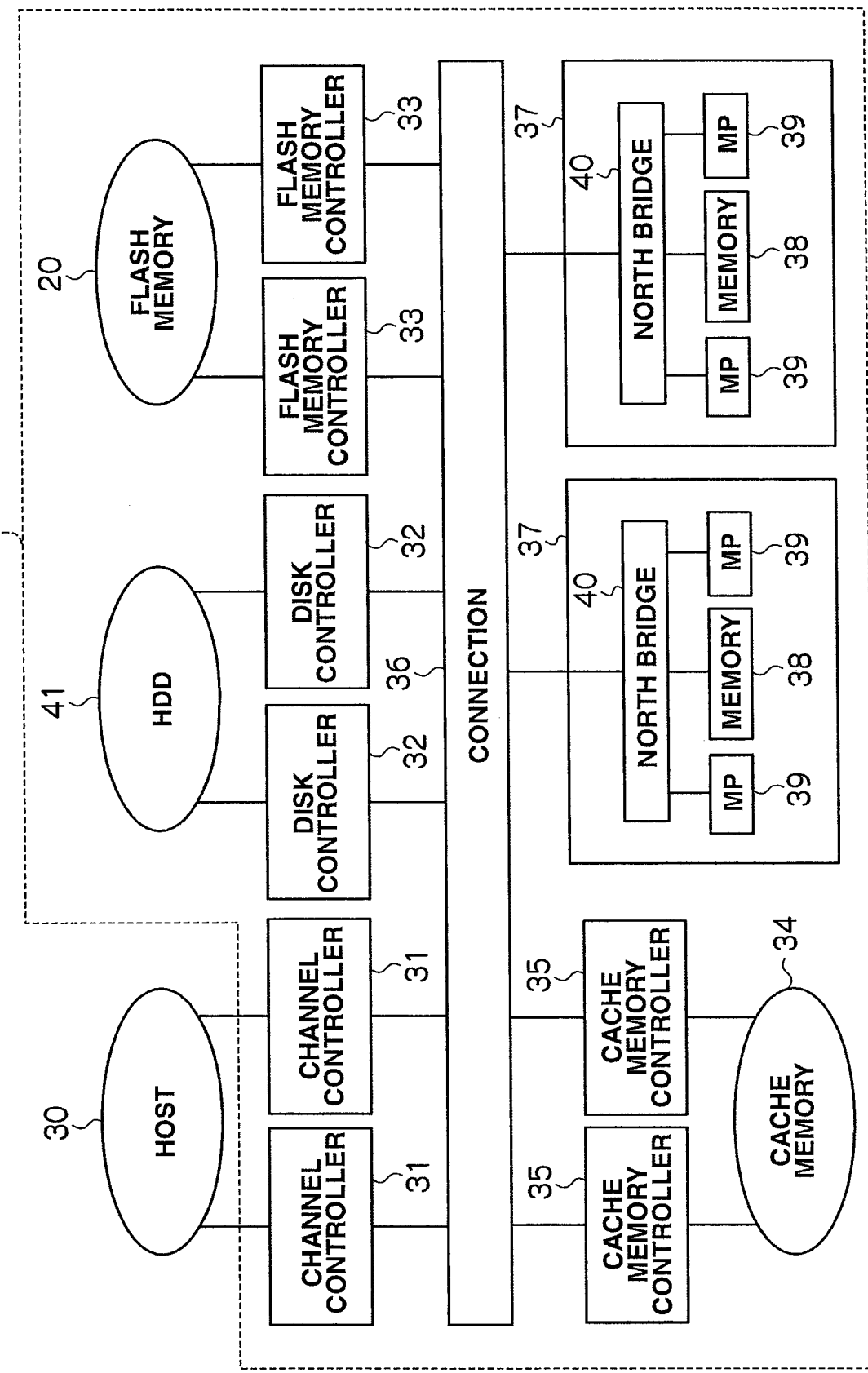
FIG. 3 is a block diagram showing the internal configuration of a storage system according to an embodiment of the present invention.

FIG. 3 shows the internal configuration of the storage system 1 according to the present embodiment. As shown in FIG. 3, the storage system 1 comprises a channel controller 31, a hard disk drive 41, a disk controller 32, a flash memory 20, a flash memory controller 33, a cache memory 34, a cache memory controller 35, a connection 36, and a processor unit 37.

The channel controller 31 functions as an interface to a host 30, and sends and receives various commands and data to and from the host 30.

The hard disk drive 41 is mounted on the storage system 1 in a state of being housed inside the hard disk drive unit 12 as described above, and is operated based on a RAID system by a microprocessor 39. As the hard disk drive 41, for instance, an expensive hard disk drive such as a SCSI (Small Computer System Interface) disk or an inexpensive hard disk such as a SATA (Serial AT Attachment) disk may be used.

The disk controller 32, for instance, is connected to the respective hard disk drives mounted respectively on the storage controller 2 and the storage apparatus 3 via a fiber channel cable. The disk controller 32 functions as an interface to the hard disk drive 41, and controls the input and output of data in and from the hard disk drive 41.

The flash memory 20 is a rewritable nonvolatile semiconductor memory, and is mounted as the flash memory package 13 on the storage system 1 as described above. One parity group is formed from one or more flash memories 20, and one or more logical volumes (hereinafter referred to as logical volumes) are set on a physical storage extent provided by this parity group. Data from the host 30 is read from and written into the logical volume in block units of a prescribed size, which is a data management unit in the flash memory 20.

A unique identification number (LUN: Logical Unit Number) is allocated to each logical volume. The input and output of data is conducted by setting the combination of a LUN and a unique block number allocated to each block as the address, and designating such address.

The flash memory controller 33 is formed inside the flash memory control LSI circuit 23 mounted respectively on each of the flash memory packages 13 as described above. The flash memory controller 33 functions as an interface to the flash memory 20, and controls the input and output of data in and from each flash memory 20 inside the same flash memory package 13.

The cache memory 34, for instance, is configured from a volatile memory such as a SDRAM (Synchronous Dynamic Random Access Memory). Further, the cache memory controller 35 controls the input and output of data in and from the cache memory 34.

The connection 36 is configured, for example, from a mutually connectable switch, bus, or the like. The sending and receiving of data and commands among the channel controller 31, the disk controller 32, the flash memory controller 33, the cache memory controller 35 and the processor unit 37 is conducted via this connection 36.

The processor unit 37 is configured by the memory 38 and two microprocessors 39 being connected to a north bridge 40.

The memory 38 is a semiconductor memory to be shared by the channel controller 31, the disk controller 32, the flash memory controller 33, the cache memory controller 35 and the respective microprocessors 39. The memory 38 is primarily used for storing system configuration information and control information such as various control programs. A data management table 50 described later is retained in this memory 38. Incidentally, a plurality of memories 38 may be provided inside the processor unit 37.

The microprocessor 39 is a processor that governs the operation of the overall storage system 1. Each microprocessor 39 is allocated with a storage extent in the flash memory (a part of the storage extent provided by each flash memory 20) to be handled by the respective microprocessors 39. The microprocessors 39 execute various jobs related to the storage extent allocated to oneself in the cache memory 20 based on various control programs stored in the memory 38.

The north bridge 40 connects the memory 38 and the microprocessors 39, and also connects the memory 38 and the microprocessors 39 to the connection 36.

Incidentally, with the storage system 1 according to the present embodiment, in order to provide redundancy, the channel controller 31, the disk controller 32, the flash memory controller 33, the cache memory controller 34 and the processor unit 37 are respectively provided in duplicate.

(1-3) Data Read/Write Processing in Storage System (1-3-1) Outline of Data Read/Write Processing and Configuration of Data Management Table Outline of the data write processing and data read processing in the storage system 1 is now explained.

In order to improve the characteristics of data reading and writing, the storage system 1 of this embodiment adopts the flash memory as the memory device in substitute for a conventional hard disk drive, and adopts the hard disk drive 41 as a buffer during the writing of data for suppressing the data write count into the flash memory 20.

Figure 4:
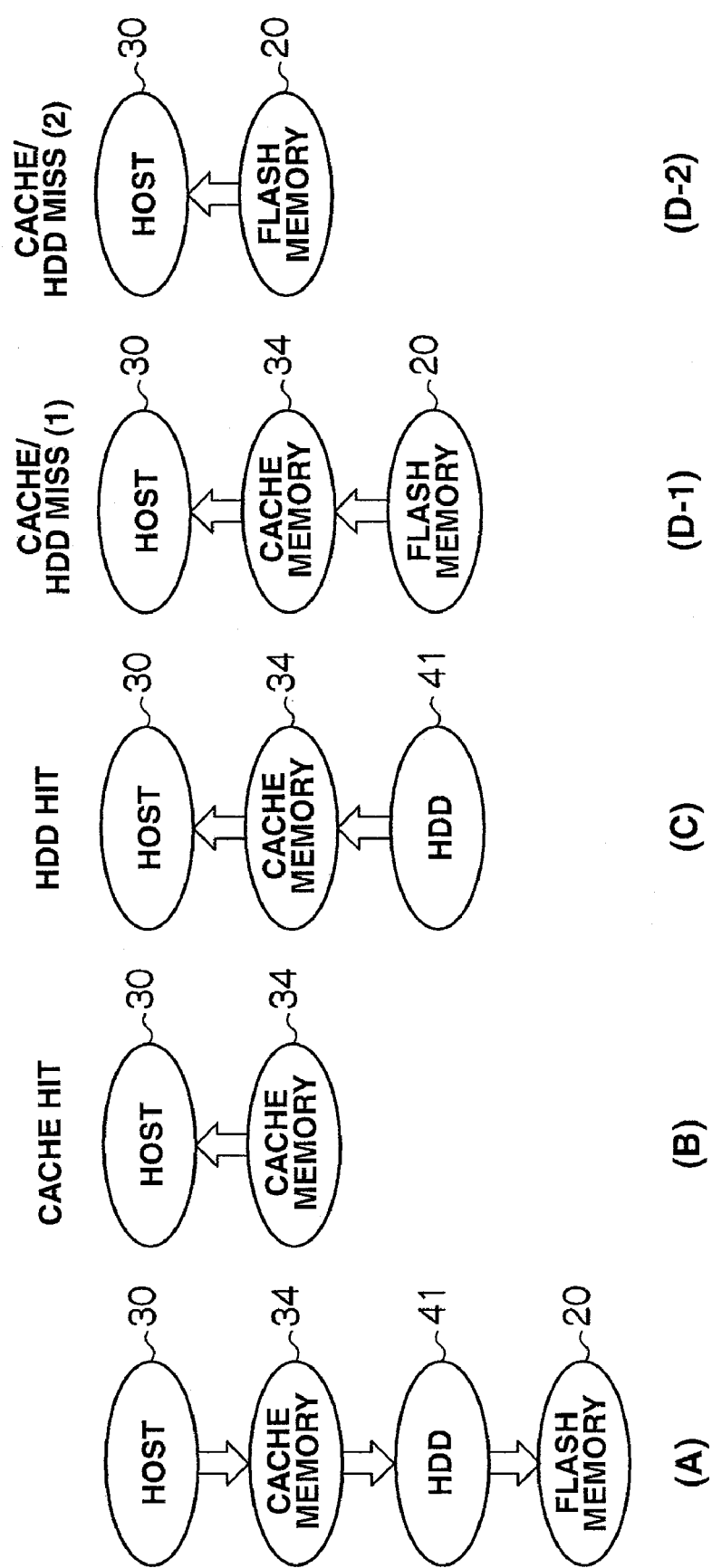

With the storage system 1, when a data write request and data to be written (hereinafter referred to as write-target data as needed) is provided from the host, as shown in FIG. 4A, this write-target data is foremost stored in the cache memory 34.

The write-target data stored in the cache memory 34 is thereafter migrated to the hard disk drive 41, and then migrated to the flash memory 20 at a prescribed timing.

Meanwhile, with the storage system 1, when a data read request is provided from the host 30, it is foremost determined where the data to be read (hereinafter referred to as read-target data as needed) is stored among the cache memory 34, the hard disk drive 41 and the flash memory 20.

When the read-target data is stored in the cache memory 34 (cache hit), as shown in FIG. 4B, the read-target data is read from the cache memory 34 and sent to the host 30. In this case, high-speed data reading is possible.

When the read-target data is not stored in the cache memory 34 (cache miss) and is stored in the hard disk drive 41 (HDD hit), as shown in FIG. 4C, the read-target data is read from the hard disk drive 41 and once stored in the cache memory 34, and thereafter read from the cache memory 34 and sent to the host 30.

Meanwhile, when the read-target data is not stored in either the cache memory 34 or the hard disk drive 41 (cache miss and HDD miss), the first and second data read methods described below may be considered as methods for reading the read-target data stored in the flash memory 20.

Among the above, the first data read method, as shown in FIG. 4D-1, is a method of reading the read-target data from the flash memory 20 and once storing it in the cache memory 34, thereafter reading the read-target data from the cache memory 34 and sending it to the host 30. According to this first data read method, although the latency will increase, when repeatedly reading the same data, there is an advantage in that the reading speed of data can be sped up since the reading of data from the second time onward will be conducted from the cache memory 34.

Further, the second data read method, as shown in FIG. 4D-2, is a method of reading the read-target data from the flash memory 34, and thereafter directly sending it to the host 30. According to the second data read method, there is an advantage in that the latency is low, and the memory resource of the cache memory 34 will not be consumed. In addition, according to the second data read method, when the data reading speed of the flash memory 20 is the same as or faster than the cache memory 34, there is an advantage in that the data reading speed can be sped up since the read-target data will be read without going through the cache memory 34. In the foregoing case, for instance, even when the read-target data is stored in the cache memory 34 or the hard disk drive 41, a configuration where data is migrated to the flash memory 20 and employing the second data read method to read such data may also be adopted (flash memory priority).

Here, as a means for controlling such reading and writing of data, with the storage system 1, as shown in FIG. 5, a data management table 50 is stored in the memory 38 (FIG. 1).

The data management table 50 is a table for managing which one among the cache memory (CM) 34, the hard disk drive (HDD) 12 and the flash memory (FM) 20 the data stored or should be stored in the respective blocks in the flash memory 20 exists.

The data management table 50 is configured from a "FM block number" field 50A, a "CM hit/miss information" field 50B, a "HDD hit/miss information" field 50C, a "CM address" field 50D, a "HDD address" field 50E, a "HDD data in-migration flag" field 50F, and a "FM data migration flag" field 50F.

Among the above, the "FM block number" field 50A stores each block number of all blocks existing in all the flash memories 20.

Further, the "CM hit/miss information" field 50B stores information representing whether data stored in the corresponding block of the flash memory 20 or data to be stored in such block is stored in the cache memory 34 (hereinafter referred to as CM hit/miss information). Specifically, information (i.e., a flag) representing a hit is stored when data exists in the cache memory 34, and information representing a miss is stored when data does not exist in the cache memory 34.

Further, the "HDD hit/miss information" field 50C stores information representing in which hard disk drive 41 data stored in the corresponding block of the flash memory 20 or data to be stored in such block exists (hereinafter referred to as HDD hit/miss information). Specifically, information (i.e., a flag) representing a hit is stored when data exists in the hard disk drive 41, and information representing a miss is stored when data does not exist in the hard disk drive 41.

Further, the "CM address" field 50D stores an address in the cache memory 34 in which data exists when data stored or should be stored in the corresponding block of the flash memory 20 exists in the cache memory 34.

Similarly, the "HDD address" field 50E stores an address in the hard disk drive 41 in which data exists when data stored or should be stored in the corresponding block of the flash memory 20 exists in the hard disk drive 41.

Meanwhile, the "HDD data in-migration flag" field 50F stores a flag while data stored in the cache memory 34 is being migrated to the hard disk drive 41 (hereinafter referred to as a HDD data in-migration flag).

Further, the "FM data in-migration flag" field 50G stores a flag while data stored in the hard disk drive 41 is being migrated to the flash memory 20 (hereinafter referred to as a FM data in-migration flag).

With the storage system 1, the data management table 50 is used to execute the data read/write control described later.

(1-3-2) Details of Data Write Processing

Details of the data write processing according to the present embodiment is now explained.

The storage system 1 of this embodiment includes first to fourth data write modes as operation modes for writing write-target data in the flash memory 20 sequentially via the cache memory 34 and the hard disk drive 41. With the storage system 1, a user is able to freely set a desired mode among the foregoing first to fourth data write modes as the data write mode.

Figure 6:
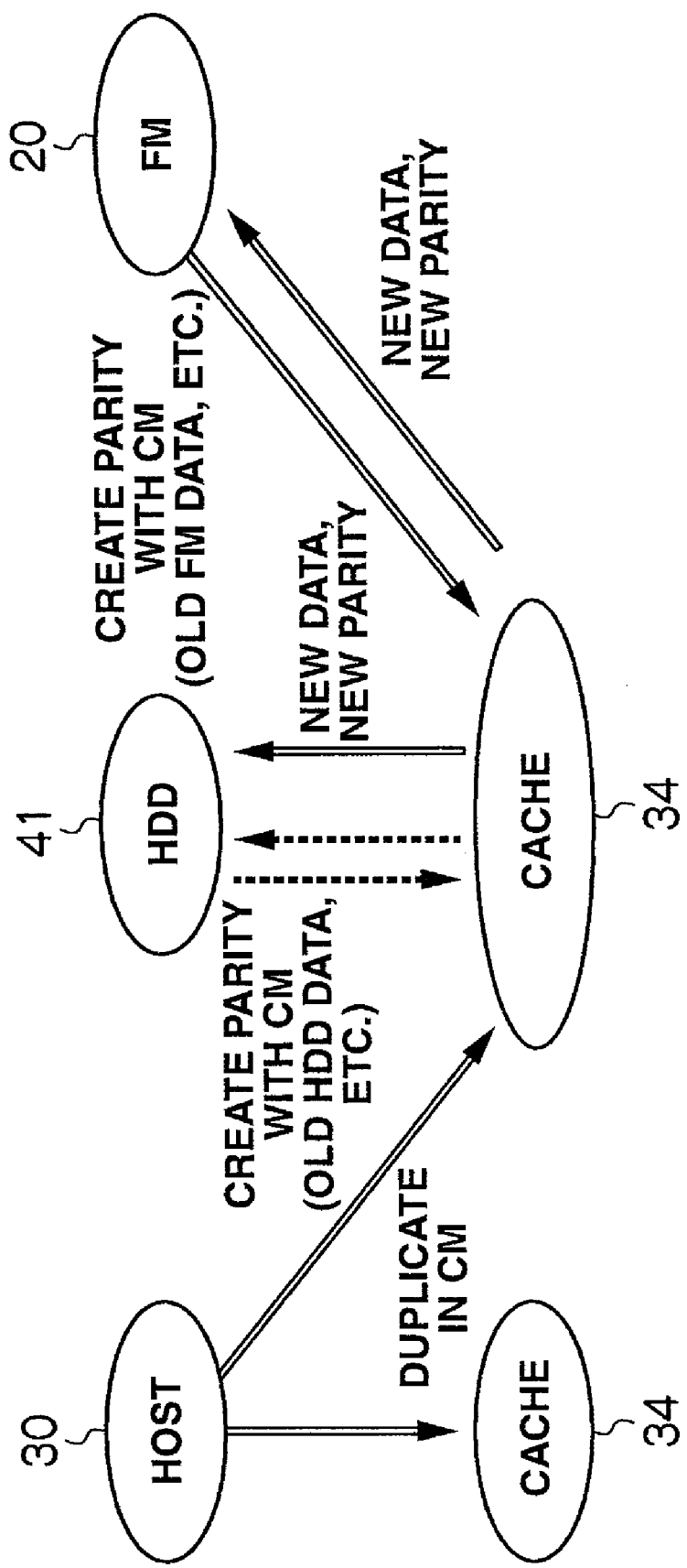
FIG. 6 is a conceptual diagram explaining the outline of a first data write mode according to an embodiment of the present invention.

Among the above, in the first data write mode, as shown in FIG. 6, the write-target data sent from the host 30 is made redundant by duplicating it in the cache memory 34 (to separately write data in two storage extents). Further, in the first data write mode, each time the write-target data is to be migrated to the hard disk drive 41 or the flash memory 20, parity is created in the cache memory 34, and such write-target data and parity are stored in the hard disk drive 41 and the flash memory 20.

According to this first data write mode, since the dual writing of the write-target data is conducted only in the cache memory 34, the usability of the hard disk drive 41 and the flash memory 20 is favorable, and redundancy is realized with parity not only during the writing of data in the hard disk drive 41, but also during the writing of data in the flash memory 20. Thus, there is an advantage in that the parity operation during the writing of data in the hard disk drive 41 can be simplified.

Figure 7:
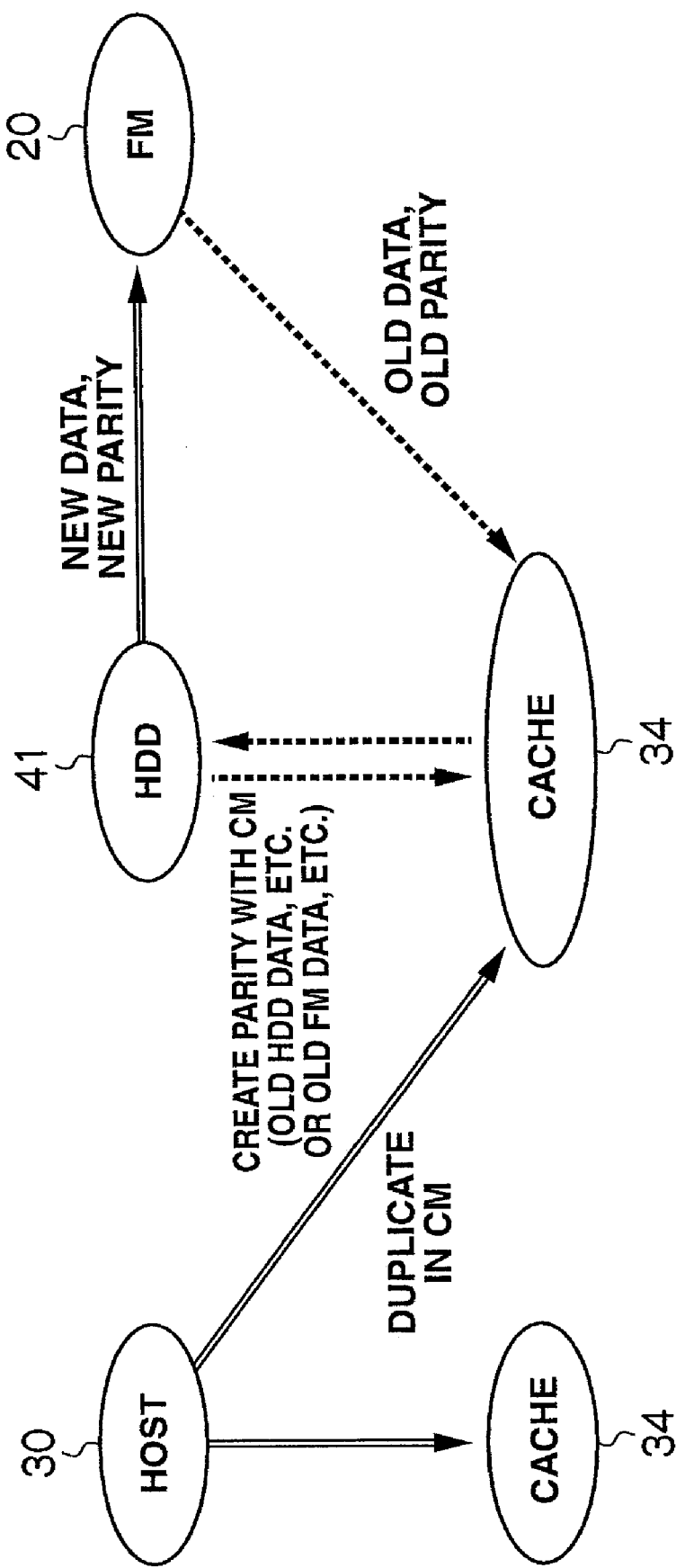
FIG. 7 is a conceptual diagram explaining the outline of a second data write mode according to an embodiment of the present invention.

In the second data write mode, as shown in FIG. 7, while making redundant the write-target data sent from the host 30 by duplicating it in the cache memory 34, parity is created upon migrating the write-target data to the hard disk drive 41, and such parity is stored together with data in the hard disk drive 41. Further, in the second data write mode, upon migrating the write-target data stored in the hard disk drive 41 to the flash memory 20, the parity created when migrating the write-target data to the hard disk drive 41 is used as is to make such data redundant.

According to the second data write mode, similar to the case of the first data write mode, usability of the hard disk drive 41 and the flash memory 20 is favorable, and, since only one operation is performed to the parity, it is possible to reduce the load of the overall storage system 1 regarding the parity operation processing in comparison to the first data write mode.

Figure 8:
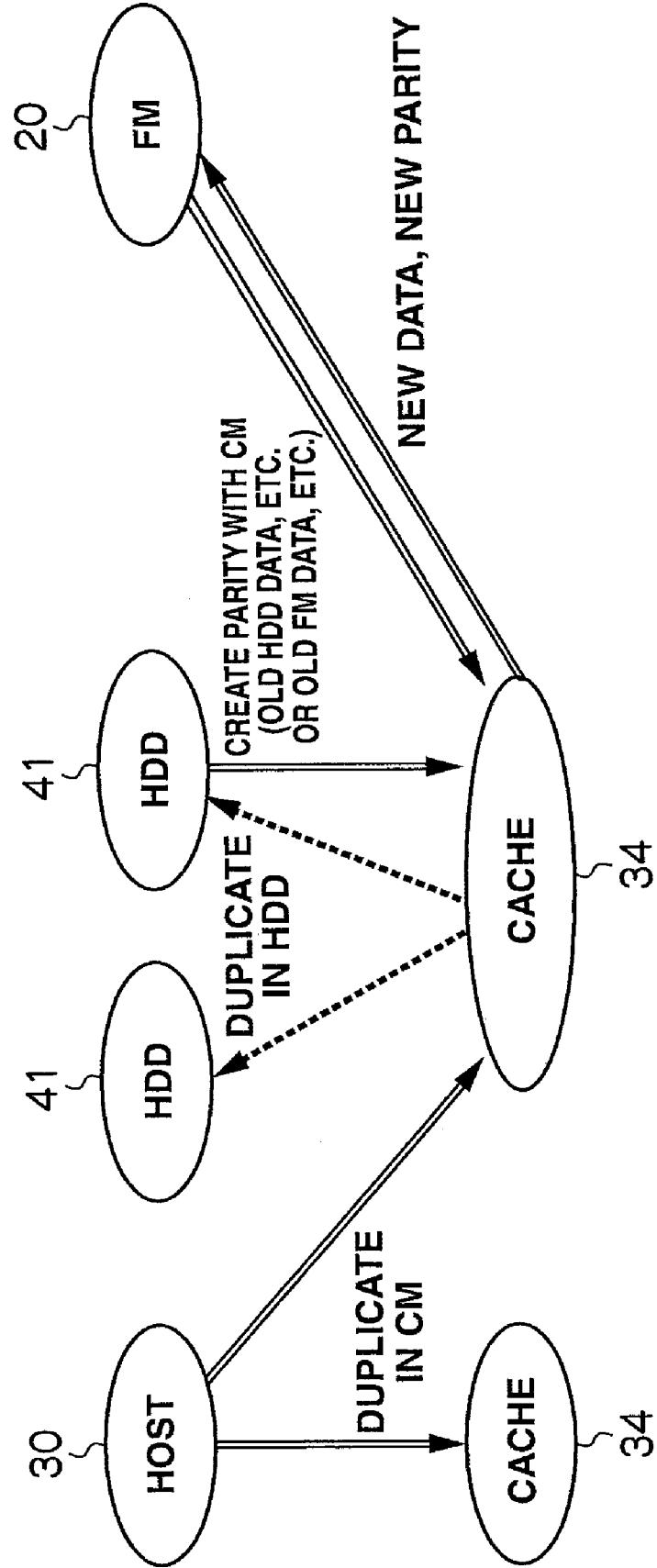
FIG. 8 is a conceptual diagram explaining the outline of a third data write mode according to an embodiment of the present invention.

In the third data write mode, as shown in FIG. 8, upon storing the write-target data sent from the host 30 in the cache memory 34, and upon migrating the write-target data from the cache memory 34 to the hard disk drive 41, while making the write-target data redundant by duplicating it in the cache memory 34 or the hard disk 12, parity is created in the cache memory 34 upon migrating the write-target data from the hard disk drive 41 to the flash memory 20, and this parity is stored together with the write-target data in the flash memory 20.

According to the third data write mode, similar to the case of the second data write mode, it is possible to improve the usability of the flash memory 20 since the write-target data is not duplicated in the flash memory 20. In addition, since the parity operation is only performed once, it is possible to reduce the load of the overall storage system 2 relating to the parity operation processing in comparison to the first and second data write modes.

Figure 9:
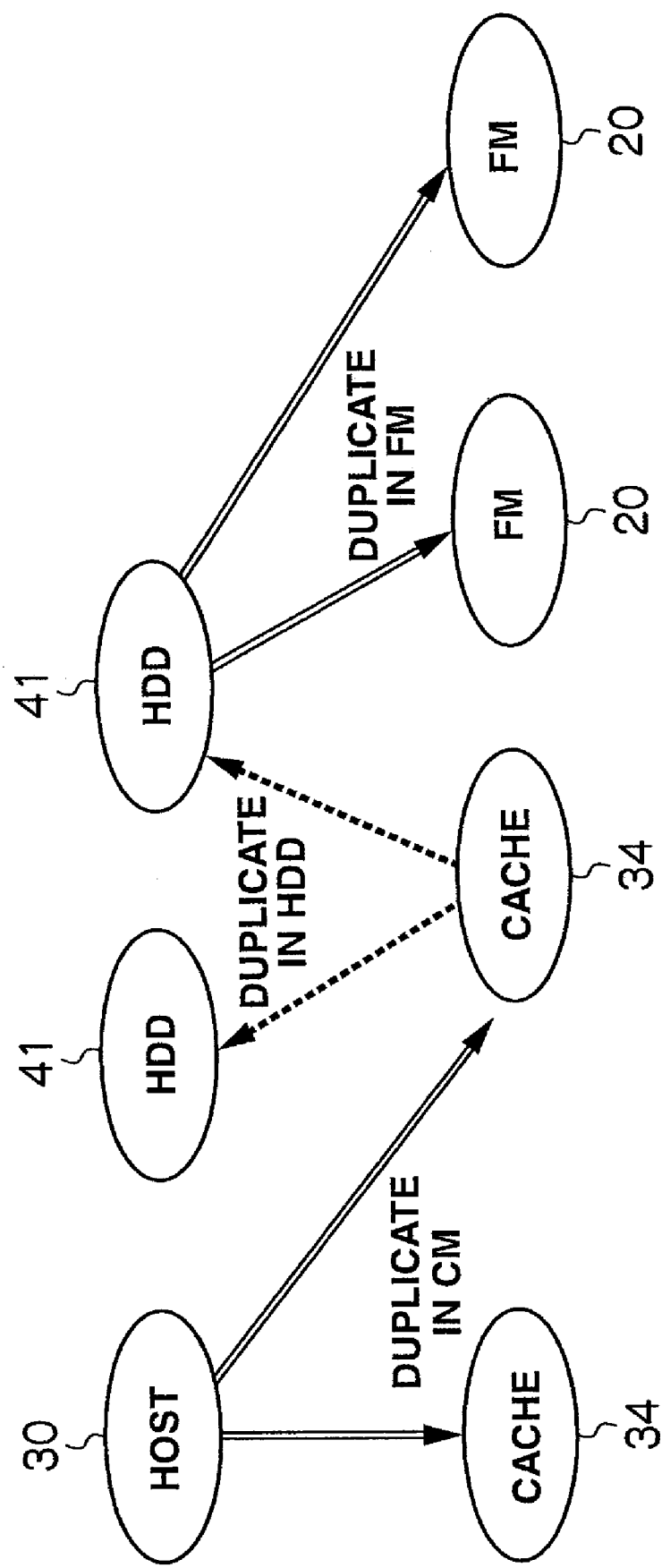
FIG. 9 is a conceptual diagram explaining the outline of a fourth data write mode according to an embodiment of the present invention.

In the fourth data write mode, as shown in FIG. 9, when storing the write-target data sent from the host 30 in the cache memory 34, or migrating it from the cache memory 34 to the hard disk drive 41, or migrating it from the hard disk drive 41 to the flash memory 20, such write-target data is constantly duplicated.

According to the fourth data write mode, since no parity operation is required, it is possible to reduce the load of the overall storage system 1 regarding redundancy the most among the first to fourth data write modes.

A mode among the foregoing first to fourth data write modes is selected and designated by a user or a management computer (not shown) according to the structural specification, purpose of use, or operating status of the storage system 1; type of stored data; access characteristics from the host 30, and so on upon activating the storage system. Further, the microprocessor 39 may also automatically select a mode at an arbitrary opportunity while the storage system 1 is running. For example, when the capacity of the cache memory 34 is greater than the capacity of the hard disk drive 41 and the flash memory 20, and importance is attached on guaranteeing data, the first data write mode is selected. Meanwhile, for instance, when the capacity of the hard disk drive 41 is relatively large, the capacity of the flash memory 20 is relatively small, and importance is attached on the performance of the storage system 1, the third data write mode is selected.

Further, information regarding the selected data write mode is registered in the memory 38, and each microprocessor 39 is able to refer to the data write mode by accessing the memory 38.

Operation of the storage system 1 when the foregoing first to fourth data write modes are respectively set as the data write mode is now explained.

Figure 10:
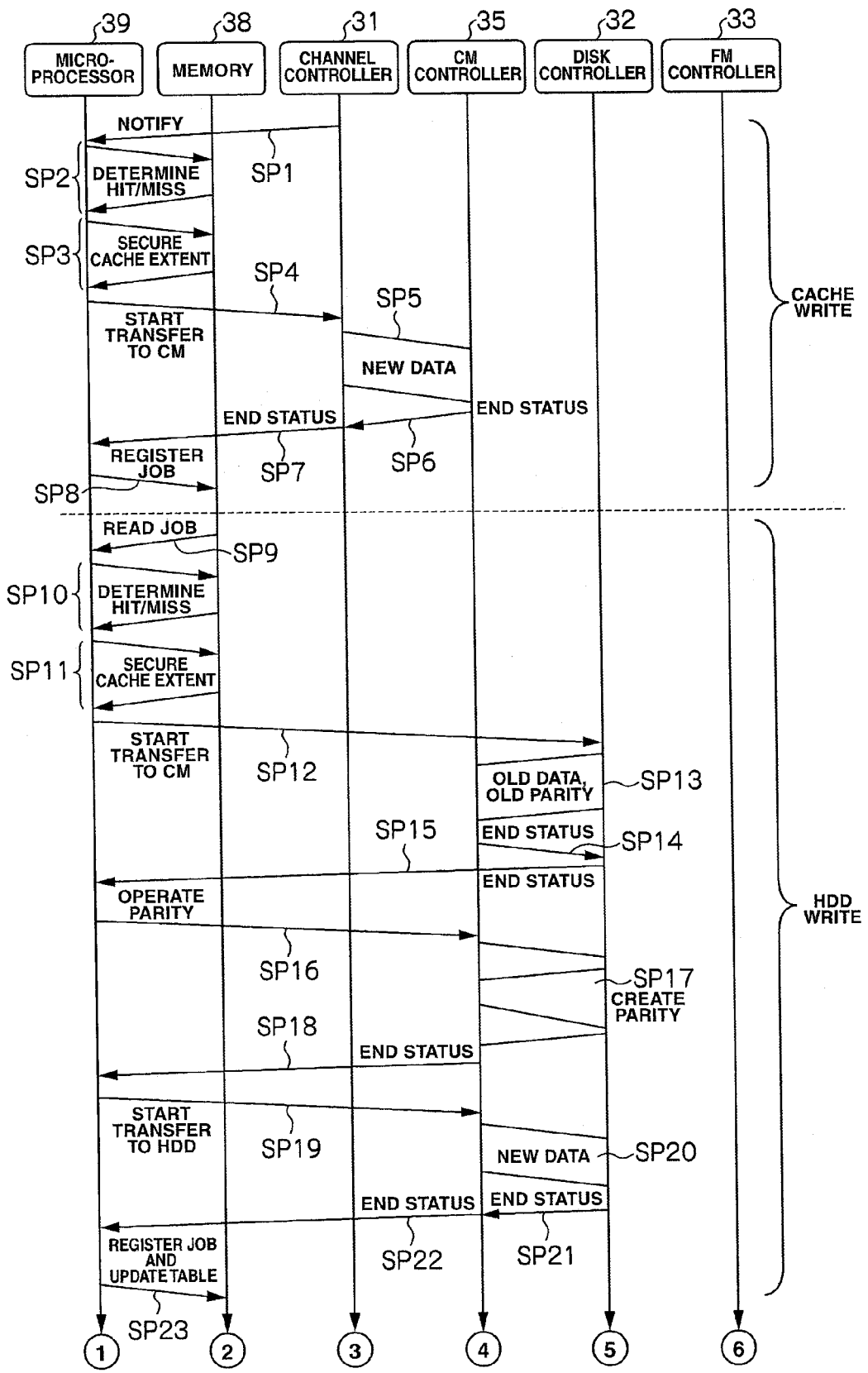
FIG. 10 is a ladder chart explaining the processing flow during the first data write mode according to an embodiment of the present invention.
Figure 11:
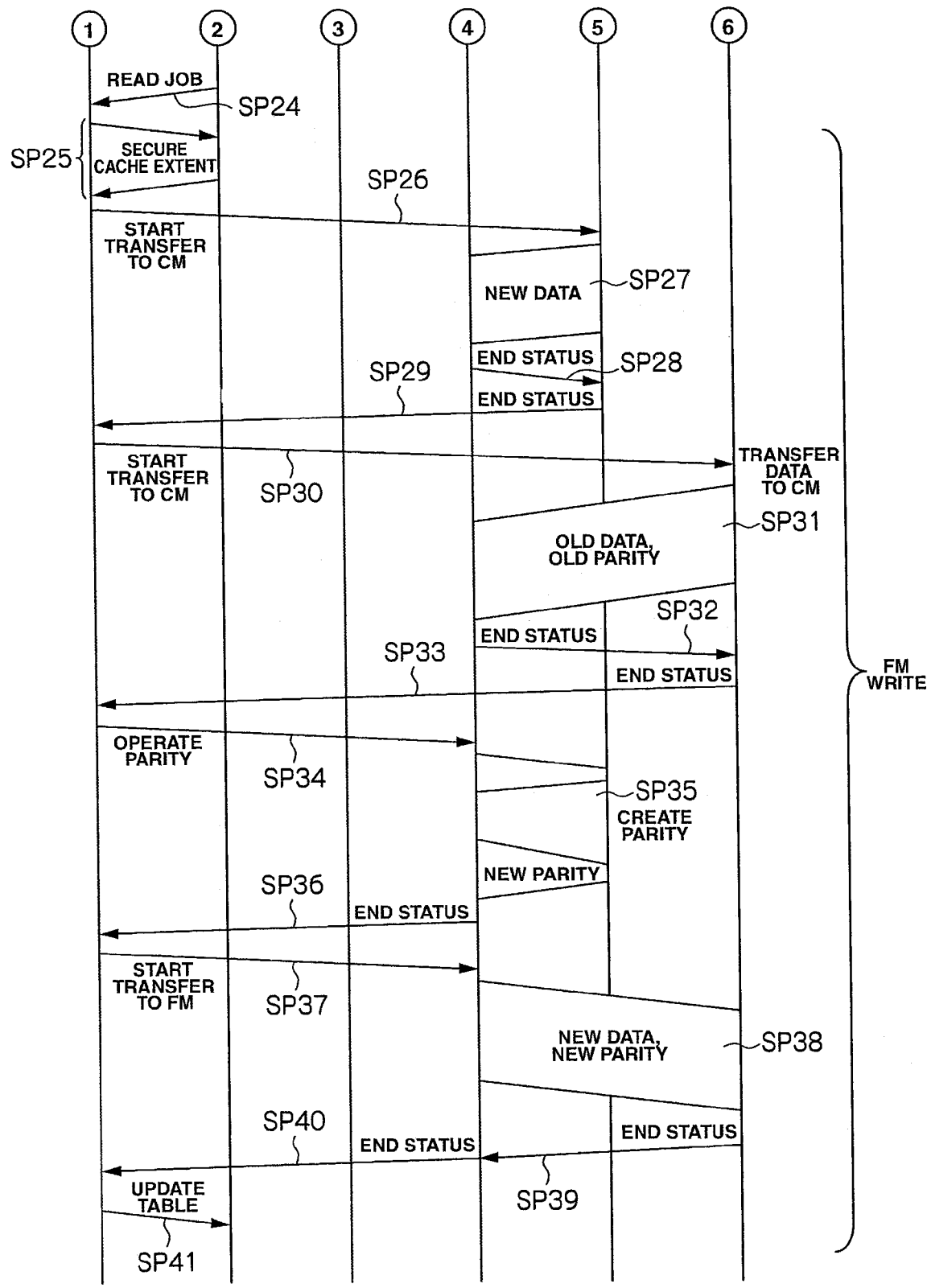
FIG. 11 is a ladder chart explaining the processing flow during the first data write mode according to an embodiment of the present invention.

(1-3-2-1) First Data Write Mode (1-3-2-1-1) Processing Flow During First Data Write Mode With the storage system 1, when the first data write mode is set as the data write mode, the write-target data is written in the flash memory 20 according to the flow shown in FIG. 10 and FIG. 11.

In other words, with the storage system 1, when a data write request and write-target data are sent from the host 30, foremost, a notice indicating the reception of the data write request is sent from the channel controller 31 to the microprocessor 39 (SP1).

When the microprocessor 39 receives this notice, it refers to the corresponding "CM hit/miss information" field 50B of the data management table 50 stored in the memory 38; specifically, the "CM hit/miss information" field 50B corresponding to the block in the flash memory 20 to store the write-target data, and determines whether the original write-target data (hereinafter referred to as an old write-target data) to be updated with the write-target data is stored in the cache memory 34 (SP2).

When the microprocessor 39 determines that the old write-target data is not stored in the cache memory 34, it secures a storage extent for the capacity required in duplicating the write-target data in the cache memory 34 (SP3), and thereafter issues a command to the channel controller 31 for migrating the write-target data to the cache memory 34 (SP4).

When the channel controller 31 receives this command, it transfers the write-target data sent from the host 30 to the cache memory 34. Further, the cache memory controller 35 sequentially duplicates the write-target data sent from the channel controller 31 in the storage extent secured in the cache memory 34 at step SP3 (SP5).

When the cache memory controller 35 eventually completes duplicating all write-target data in the cache memory 34, it sends an end status reporting the completion of writing to the microprocessor 39 via the channel controller 31 (SP6, SP7).

When the microprocessor 39 receives this end status, it sets the CM hit/miss information stored in the corresponding "CM hit/miss information" field 50B of the data management table 50 (FIG. 5) stored in the memory 38 to "hit", and sets the HDD hit/miss information stored in the "HDD hit/miss information" field 50C to "miss". The microprocessor 39 further stores the address in the cache memory 34 storing the write-target data in the corresponding "CM address" field 50D of the data management table 50. Moreover, the microprocessor 39 registers the "job" to be performed thereafter in the memory 38, and then ends the write processing of the write-target data into the cache memory 34 (SP8).

Meanwhile, the microprocessor 39 thereafter reads the foregoing "job" registered in the memory 38 at a suitable timing (SP9). Then, according to this "job", the microprocessor 39 foremost refers to the corresponding "HDD hit/miss information" field 50C of the data management table 50, and determines whether the old write-target data corresponding to the write-target data is stored in the hard disk drive 41 (SP10).

When the microprocessor 39 determines that the old write-target data is stored in the hard disk drive 41, for instance, it secures a storage extent for the capacity required in executing the parity operation (refer to SP16) described later in the cache memory 34 (SP11). The microprocessor 39 thereafter designates an address stored in the corresponding "HDD address" field 50E of the data management table 50, and issues a command to the disk controller 32 for transferring the old write-target data stored in this address position of the hard disk drive 41 and parity of such old write-target data to the cache memory 34 (SP12).

When the disk controller 32 receives this command, it reads the foregoing old write-target data and the parity of such old write-target data from the address position designated in the hard disk drive 41, and sends these to the cache memory controller 35. When the cache memory controller 35 receives the old write-target data and the parity of such old write-target data, it writes these into the cache memory 34 (SP13).

When the cache memory controller 35 eventually completes writing all the old write-target data and the parity of such old write-target data into the cache memory 34, it sends a corresponding end status to the microprocessor 30 via the disk controller 32 (SP14, SP15).

When the microprocessor 39 receives this end status, it sequentially calculates the parity of the write-target data using the storage extent in the cache memory 34 secured at step SP11 based on the write-target data, the old write-target data and the parity of such old write-target data stored in the cache memory 34, and sends the obtained parity to the cache memory controller 35 (SP16). Further, the cache memory controller 35 sequentially sends the parity to the disk controller 32 (SP17). Thereby, parity of the write-target data is stored in the hard disk drive 41.

When the cache memory controller 35 completes transferring the parity of the write-target data calculated with the microprocessor 39 to the disk controller 32, it sends a corresponding end status to the microprocessor 39 (SP18). Further, when the microprocessor 39 receives this end status, it issues a command to the cache memory controller 35 for transferring the write-target data to the hard disk drive 41 (SP19).

When the cache memory controller 35 receives this command, it sequentially reads the write-target data from the cache memory 34 and sends it to the disk controller 32. Further, the disk controller 32 sequentially writes the write-target data sent from the cache memory controller 35 into the hard disk drive 41 (SP20).

When the disk controller 32 eventually completes writing all write-target data sent from the cache memory controller 35 into the hard disk drive 41, it sends a corresponding end status to the microprocessor 39 via the cache memory controller 35 (SP21, SP22).

When the microprocessor 39 receives this end status, it accesses the memory 38, sets the CM hit/miss information stored in the corresponding "CM hit/miss information" field 50B of the data management table 50 to "miss", and sets the HDD hit/miss information stored in the "HDD hit/miss information" field 50C to "hit". The microprocessor 39 further stores the address in the hard disk drive 41 storing the write-target data in the corresponding "HDD address" field 50E of the data management table 50. Moreover, the microprocessor 39 registers the "job" to be performed thereafter in the memory 38 (SP24), and thereafter ends the data migration processing of the write-target data to the hard disk drive 41.

Meanwhile, the microprocessor 39 thereafter accesses the memory 38 at a prescribed timing described later with reference to FIG. 24, and reads the foregoing "job" registered in the memory 38 (SP24). Then, based on this "job", the microprocessor 39 refers to each "CM address" field 50D of the data management table 50, and secures a storage extent for the capacity required in executing the parity operation (SP34) described later in the cache memory 34 (SP25). The microprocessor 39 thereafter designates an address stored in the corresponding "HDD address" field 50E of the data management table 50, and issues a command to the disk controller 32 for transferring the write-target data stored in this address position of the hard disk drive 41 to the cache memory 34 (SP26).

When the disk controller 32 receives this command, it reads the write-target data from the address position designated in the corresponding hard disk drive 41, and sends this to the cache memory controller 35. When the cache memory controller 35 receives the write-target data, it sequentially writes this in the cache memory 34 (SP27).

When the disk controller 32 eventually completes writing all write-target data sent from the disk controller 32 into the cache memory 34, it sends a corresponding end status to the microprocessor 39 via the disk controller 32 (SP28, SP29).

When the microprocessor 39 receives this end status, it issues a command to the flash memory controller 33 for transferring the old write-target data and the parity of such old write-target data stored in the hard disk drive 41 to the cache memory 34 (SP30).

When the flash memory controller 33 receives this command, it reads the old write-target data and the parity of such old write-target data from the flash memory 20, and sends these to the cache memory controller 35. Further, when the cache memory controller 35 receives the old write-target data and the parity of such old write-target data, it writes these into the cache memory 34 (SP31).

When the cache memory controller 35 eventually completes writing all the old write-target data and the parity of such old write-target data sent from the flash memory controller 33 into the cache memory 34, it sends a corresponding end status to the microprocessor 30 via the flash memory controller 33 (SP32, SP33).

When the microprocessor 39 receives this end status, it sequentially creates new parity of the write-target data based on the write-target data, the old write-target data and the parity of such old write-target data stored in the cache memory 34, and sequentially sends the new parity to the cache memory controller 35 (SP34). Further, the cache memory controller 35 sequentially stores the new parity of the write-target data sent from the microprocessor into the cache memory 34.

When the cache memory controller 35 completes writing the new parity calculated with the microprocessor 39 into the cache memory 34, it sends an end status reporting the completion of writing to the microprocessor 39 (SP36). Further, when the microprocessor 39 receives this end status, it issues a command to the cache memory controller 35 for transferring the write-target data to the flash memory 20 (SP37).

When the cache memory controller 35 receives this command, it sequentially reads the write-target data and the new parity from the cache memory 34 and sends these to the flash memory controller 33. Further, the flash memory controller 33 sequentially writes the write-target data and the new parity sent from the cache memory controller 35 into the flash memory 20 (SP38).

When the disk controller 32 eventually completes writing all write-target data and the new parity sent from the cache memory controller 35 into the flash memory 20, it sends a corresponding end status to the microprocessor 39 via the cache memory controller 35 (SP39, SP40).

When the microprocessor 39 receives this end status, it accesses the memory 38, sets the CM hit/miss information stored in the corresponding "CM hit/miss information" field 50B of the data management table 50 to "miss", and also sets the HDD hit/miss information stored in the "HDD hit/miss information" field 50C to "miss". The microprocessor 39 thereafter ends the data write processing according to the first data write mode.

(1-3-2-1-2) Processing of Microprocessor During First Data Write Mode

Figure 12:
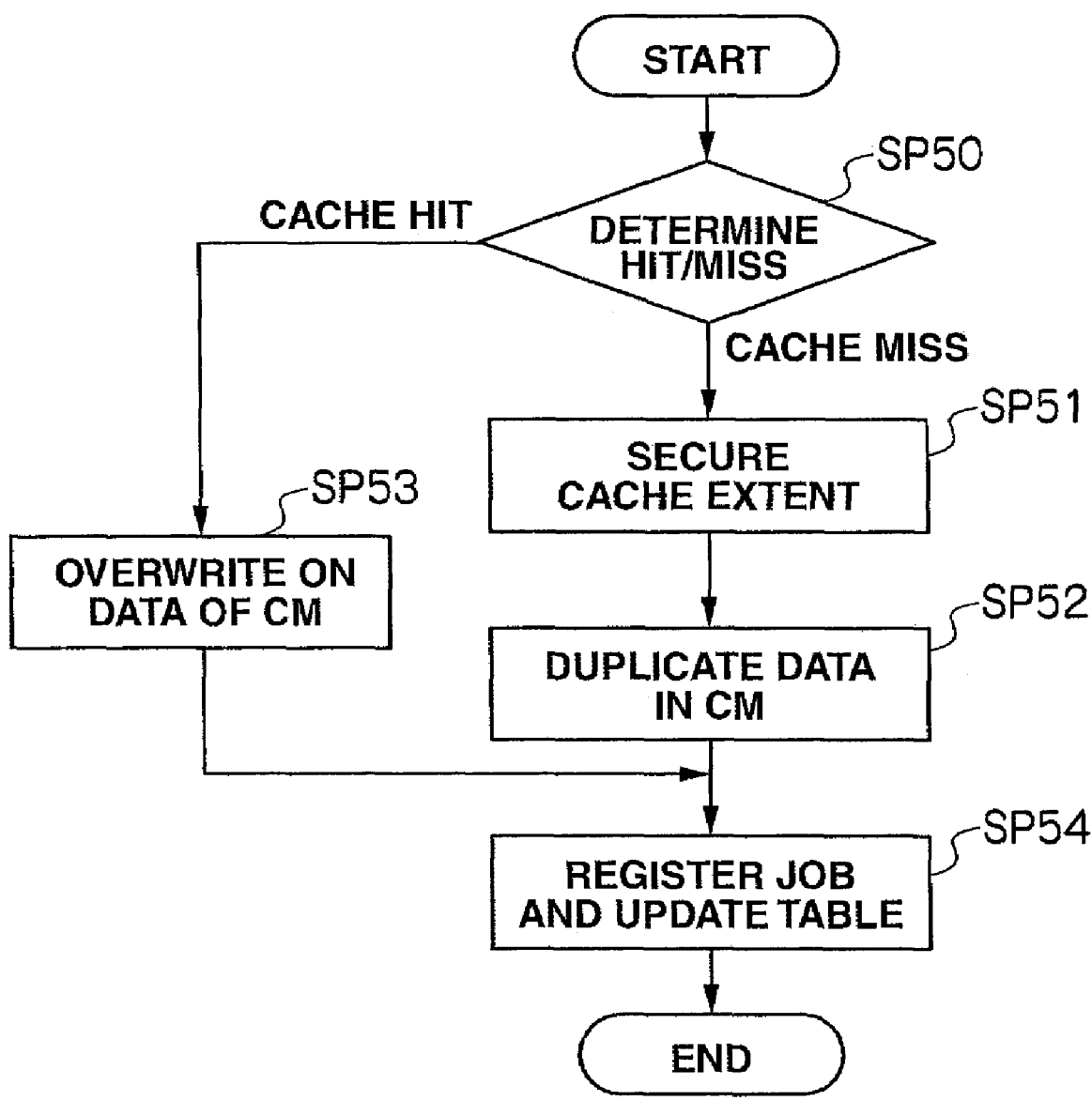
FIG. 12 is a flowchart explaining the processing performed by a microprocessor during the first data write mode according to an embodiment of the present invention.
Figure 13:
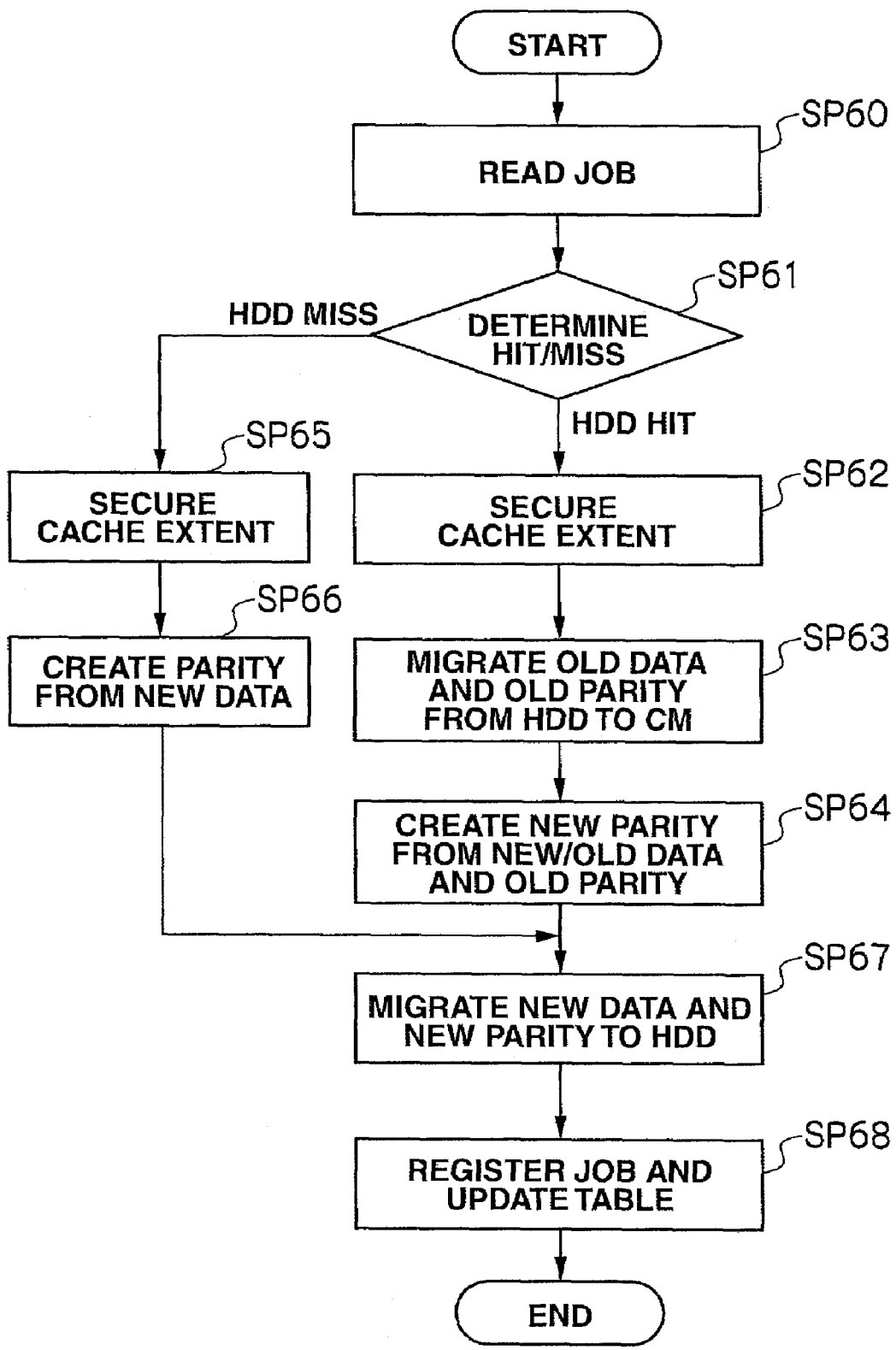
FIG. 13 is a flowchart explaining the processing performed by a microprocessor during the first data write mode according to an embodiment of the present invention.
Figure 14:
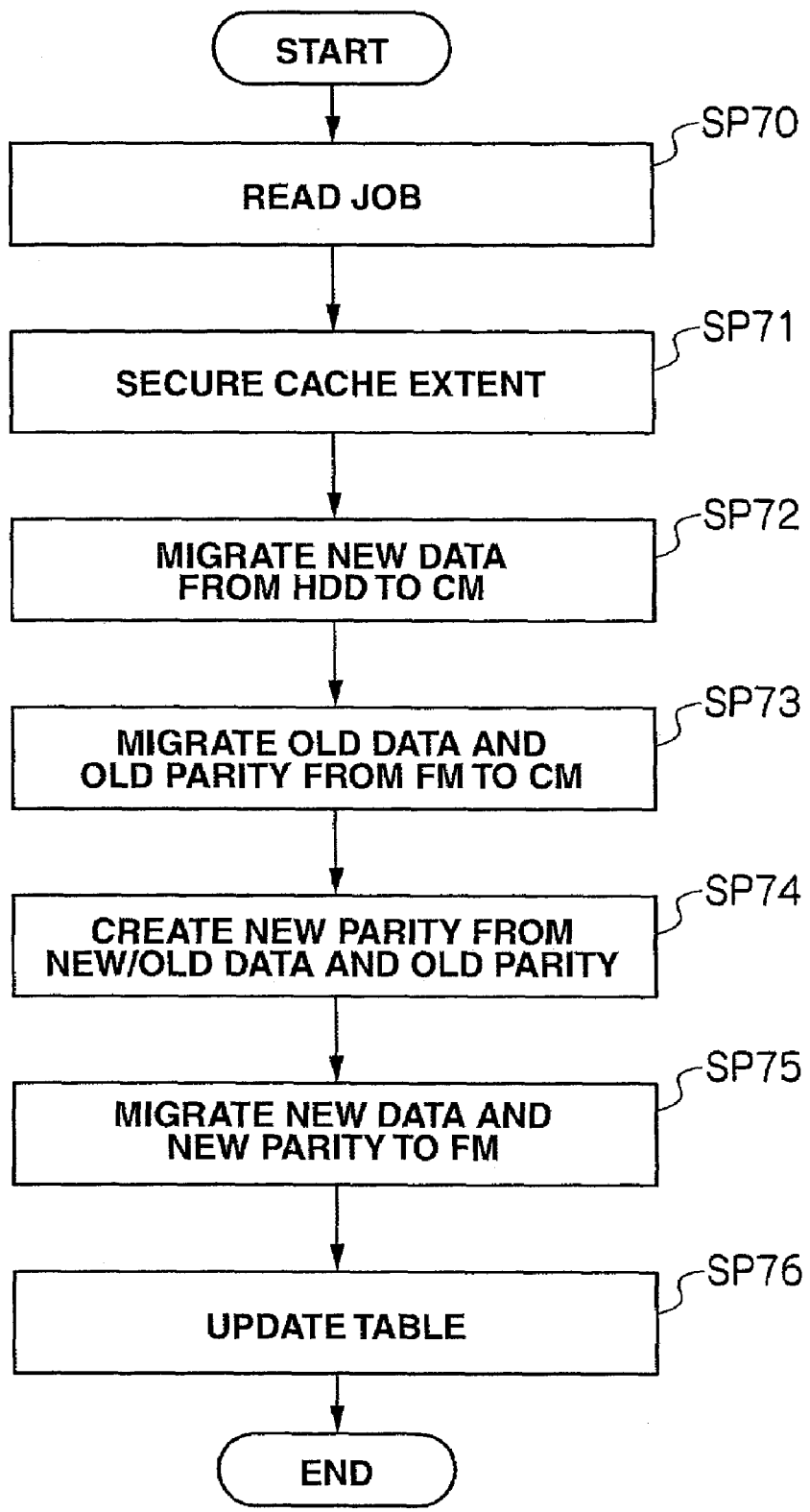
FIG. 14 is a flowchart explaining the processing performed by a microprocessor during the first data write mode according to an embodiment of the present invention.

FIG. 12 to FIG. 14 are flowcharts showing the specific processing contents of the microprocessor 39 during the foregoing first data write mode.

FIG. 12 shows the processing contents upon writing the write-target data sent from the host 30 into the cache memory 34 (step SP1 to step SP8 of FIG. 10), FIG. 13 shows the processing contents upon migrating the write-target data stored in the cache memory 34 to the hard disk drive 41 (step SP9 to step SP23 of FIG. 10), and FIG. 14 shows the processing contents upon migrating the write-target data stored in the hard disk drive 41 to the flash memory 20 (step SP24 to step SP41 of FIG. 10). The microprocessor 39 executes these processing routines based on a corresponding control program stored in the memory 40 (FIG. 2).

In other words, when the microprocessor 39 receives a data write request and write-target data from the host 30, it starts the first mode cache write processing shown in FIG. 12, and foremost determines whether old write-target data corresponding to such write-target data is stored in the cache memory 34 based on the data management table 50 stored in the memory 38 (SP50).

When the microprocessor 39 obtains a determination result (cache miss) in this hit/miss determination indicating that the old write-target data is not stored in the cache memory 34, it secures a required storage extent in the cache memory 34 (SP51), and thereafter controls the channel controller 31 and the cache memory controller 35 to duplicate the write-target data in the cache memory 34 (SP52).

Contrarily, when the microprocessor 39 obtains a determination result (cache hit) in this hit/miss determination indicating that the old write-target data is stored in the cache memory 34, it controls the channel controller 31 and the cache memory controller 34 to duplicate the write-target data in the corresponding old write-target data of the cache memory 34 (SP53).

When the microprocessor 39 thereafter receives an end status indicating the completion of writing of the write-target data into the cache memory 34 from the cache memory controller, it registers a corresponding "job" in the memory 38, updates the data management table 50, and then ends this first mode cache write processing.

Meanwhile, the microprocessor 39 thereafter starts the first mode hard disk write processing shown in FIG. 13 at a suitable timing according to its own load status including other processing routines, and foremost reads the foregoing "job" registered in the memory 38 (SP60).

Subsequently, the microprocessor 39, based on the data management table 50, determines whether old-write target data corresponding to the write-target data and the parity of such old write-target data are stored in the hard disk drive 41 (SP61).

When the microprocessor 39 obtains a determination result (HDD hit) in this hit/miss determination indicating that the old write-target data and the parity of such old write-target data are stored in the hard disk drive 41, it secures a storage extent for the capacity required in the parity operation (SP64) described later in the cache memory 34 (SP62), and thereafter controls the disk controller 32 and the cache memory controller 35 to migrate the old write-target data and the parity of such old write-target data from the hard disk drive 41 to the cache memory 34 (SP63).

The microprocessor 39 thereafter creates new parity of the write-target data based on the write-target data, the old write-target data, and the parity of such old write-target data stored in the cache memory 34 (SP64).

Contrarily, when the microprocessor 39 obtains a determination result (HDD miss) in the hit/miss determination at step SP61 indicating that the corresponding old write-target data and the parity of such old write-target data are not stored in the hard disk drive 41, it secures a storage extent for the capacity required in the parity operation (SP66) described later in the cache memory 34 (SP65), and thereafter creates new parity of the write-target data stored in the cache memory 34 (SP66).

When the microprocessor 39 completes creating the new parity of the write-target data as described above, it controls the cache memory controller 35 and the disk controller 32 to migrate the new parity created at step SP64 or step SP66, and the write-target data to the hard disk drive 41 (SP67).

When the microprocessor 39 thereafter receives an end status indicating the completion of writing of the write-target data and the new parity of such write-target data from the cache memory controller 35, it performs job registration and updates the data management table 50 accordingly (SP68), and then ends this first mode hard disk write processing.

Meanwhile, the microprocessor 39 thereafter starts the first mode flash memory write processing shown in FIG. 14 at a prescribed timing described later with reference to FIG. 24, and foremost reads the foregoing "job" registered in the memory 38 (SP70).

The microprocessor 39 thereafter secures a storage extent for the capacity required in the parity operation (SP74) described later in the cache memory 34 (SP71), and thereafter controls the disk controller 32 and the cache memory controller 35 to migrate the old write-target data from the hard disk drive 41 to the cache memory 34 (SP72).

The microprocessor 39 controls the flash memory controller 33 and the cache memory controller 35 to migrate the corresponding old write-target data and the parity of such old write-target data from the flash memory 20 to the cache memory 34 (SP73), and thereafter creates new parity of the write-target data based on the write-target data, the old write-target data and the parity of such old write-target data stored in the cache memory 20 (SP74).

Subsequently, the microprocessor 39 controls the cache memory controller 35 and the flash memory controller 33 to migrate the write-target data and the parity of such write-target data from the cache memory 34 to the flash memory 20 (SP75), thereafter updates the data management table 50 accordingly (SP76), and then ends this first mode flash memory write processing.

Figure 15:
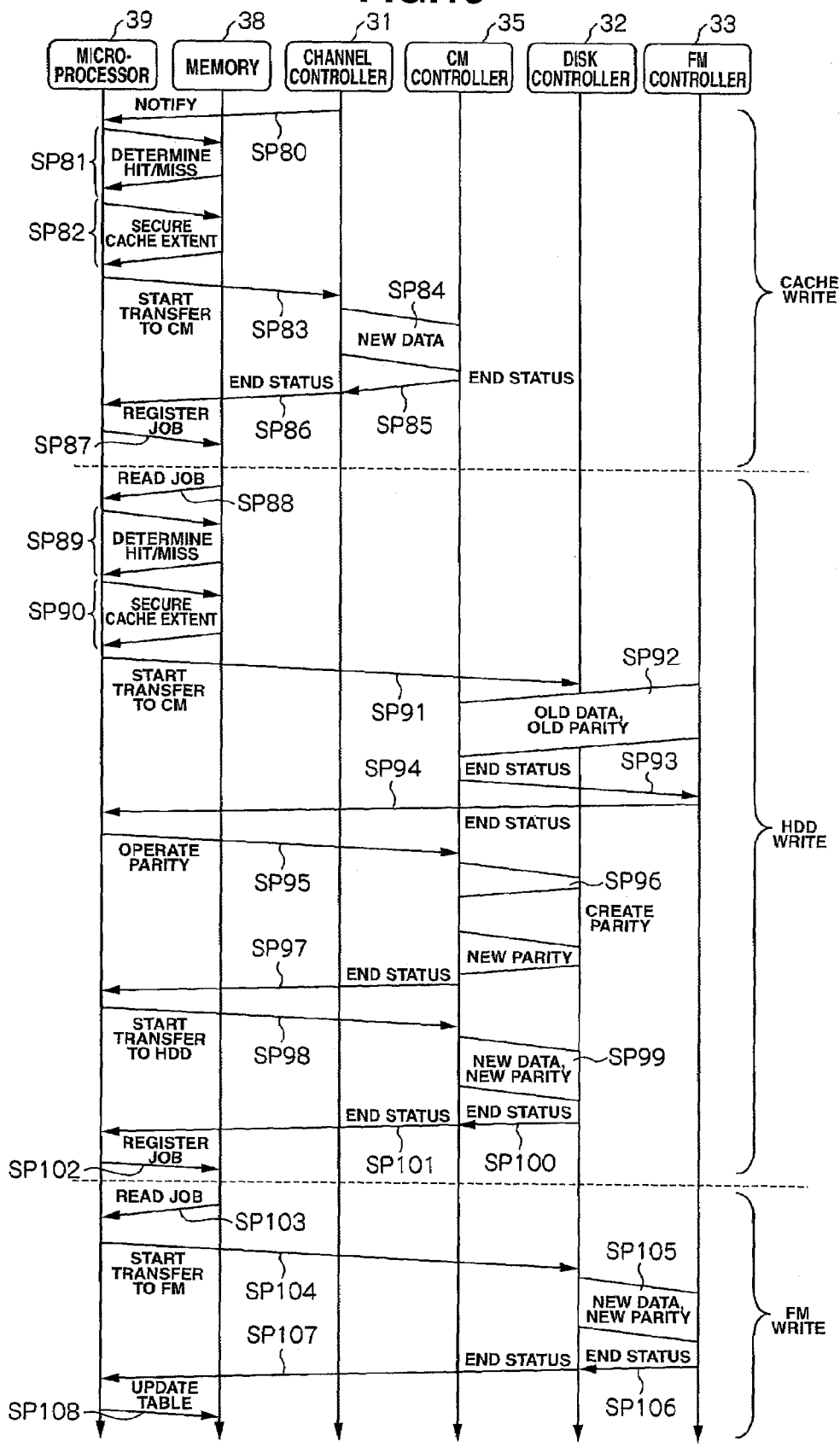
FIG. 15 is a ladder chart explaining the processing flow during the second data write mode according to an embodiment of the present invention.

(1-3-2-2) Second Data Write Mode (1-3-2-2-1) Processing Flow During Second Data Write Mode Meanwhile, with the storage system 1, when the second data write mode is set as the data write mode, the write-target data is written in the flash memory 20 according to the flow shown in FIG. 15.

In other words, when a data write request and write-target data are sent from the host 30, the storage system 1 starts the second data write processing shown in FIG. 15, and, foremost, the channel controller 31 that received the data write request sends a notice indicating such reception to the microprocessor 39 (SP80). With the storage system 1, according to this notice, the write-target data is duplicated in the cache memory 34, and job registration is performed and the data management table 50 is updated accordingly as in step SP2 to step SP8 of the first data write mode processing described above with reference to FIG. 10 and FIG. 11 (SP81 to SP87).

The microprocessor 39 thereafter reads the foregoing "job" registered in the memory 38 at a suitable timing (SP88). Then, according to this "job", the microprocessor 39 foremost refers to the corresponding "HDD hit/miss information" field 50C of the data management table 50, and determines whether the old write-target data corresponding to the write-target data is stored in either the hard disk drive 41 or the flash memory 20 (SP89).

When the microprocessor 39 determines that the old write-target data is stored in the hard disk drive 41 or the flash memory 20, for instance, it secures a storage extent for the capacity required in executing the parity operation (SP95) described later in the cache memory 34 (SP90). The microprocessor 39 thereafter issues a command to the disk controller 32 or the flash memory controller 33 for migrating the old write-target data or the parity of such old write-target data to the cache memory 34 (SP91). Incidentally, FIG. 15 shows a case of determining that the old write-target data is stored in the flash memory 20.

When the disk controller 32 or the flash memory controller 33 receives this command, it reads the old write-target data and the parity of such old write-target data from the hard disk drive 41 or the flash memory 20, and sends these to the cache memory controller 35. Further, when the cache memory controller 35 receives the old write-target data and the parity of such old write-target data, it writes these into the cache memory 34 (SP92).

When the cache memory controller 35 eventually completes writing all the old write-target data and the parity of such old write-target data into the cache memory 34, it sends a corresponding end status to the disk controller 32 or the flash memory controller 33 (SP93). Further, when the disk controller 32 or the flash memory controller 33 receives this end status, it sends a corresponding end status to the microprocessor 39 (SP94).

When the microprocessor 39 receives this end status, it sequentially calculates the new parity of the write-target data based on the write-target data, the old write-target data and the parity of such old write-target data stored in the cache memory 34, and sends the obtained new parity to the cache memory controller 35 (SP95). Further, the cache memory controller 35 sequentially sends the new parity of the write-target data sent from the microprocessor 39 to the disk controller 32 (SP96). Thereby, new parity of the write-target data is sequentially stored in the hard disk drive 41.

When the cache memory controller 35 completes transferring the new parity of the write-target data calculated with the microprocessor 39 to the disk controller 32, it sends a corresponding end status to the microprocessor 39 (SP97). Further, when the microprocessor 39 receives this end status, it issues a command to the cache memory controller 35 for transferring the write-target data to the hard disk drive 41 (SP98).

With the storage system 1, as in step SP20 to step SP23 of the first data write mode (FIG. 10 and FIG. 11), the write-target data and the new parity of such write-target data stored in the cache memory 34 are migrated to the hard disk drive 41, and job registration is performed and the data management table 50 is updated accordingly (SP99 to SP102).

Meanwhile, the microprocessor 39 thereafter accesses the memory 38 at a prescribed timing described later with reference to FIG. 24, and reads the foregoing "job" registered in the memory 38 (SP103). Then, based on this "job", the microprocessor 39 issues a command to the disk controller 32 and the flash memory controller 33 for migrating the write-target data and the new parity of such write-target data stored in the hard disk drive 41 to the flash memory 20 (SP104).

When the disk controller 32 receives this command, it reads the write-target data and the new parity of such write-target data from the hard disk drive 41, and sends these to the flash memory controller 33. When the flash memory controller 33 receives the write-target data and the new parity of such write-target data, it sequentially writes these in the flash memory 20 (SP105).

When the flash memory controller 33 eventually completes writing all write-target data and the new parity of such write-target data into the flash memory 20, it sends a corresponding end status to the microprocessor 39 via the disk controller 32 (SP106, SP107).

When the microprocessor 39 receives this end status, it accesses the memory 38, sets the CM hit/miss information stored in the corresponding "CM hit/miss information" field 50B of the data management table 50 to "miss", and also sets the HDD hit/miss information stored in the "HDD hit/miss information" field 50C to "miss". The microprocessor 39 thereafter ends the data write processing according to the second data write mode.

(1-3-2-2-2) Processing of Microprocessor During Second Data Write Mode

Figure 16:
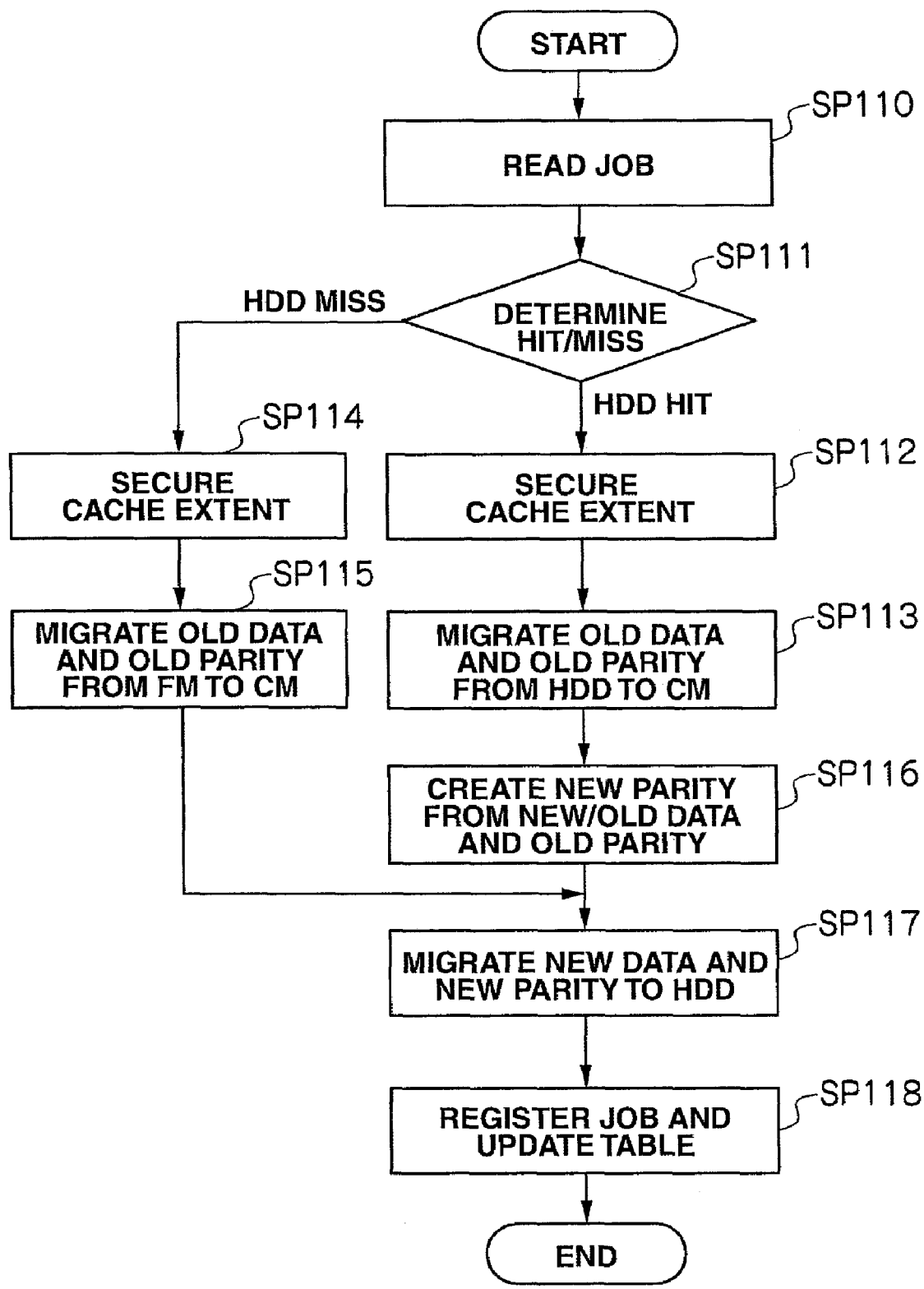
FIG. 16 is a flowchart explaining the processing performed by a microprocessor during the second data write mode according to an embodiment of the present invention.
Figure 17:
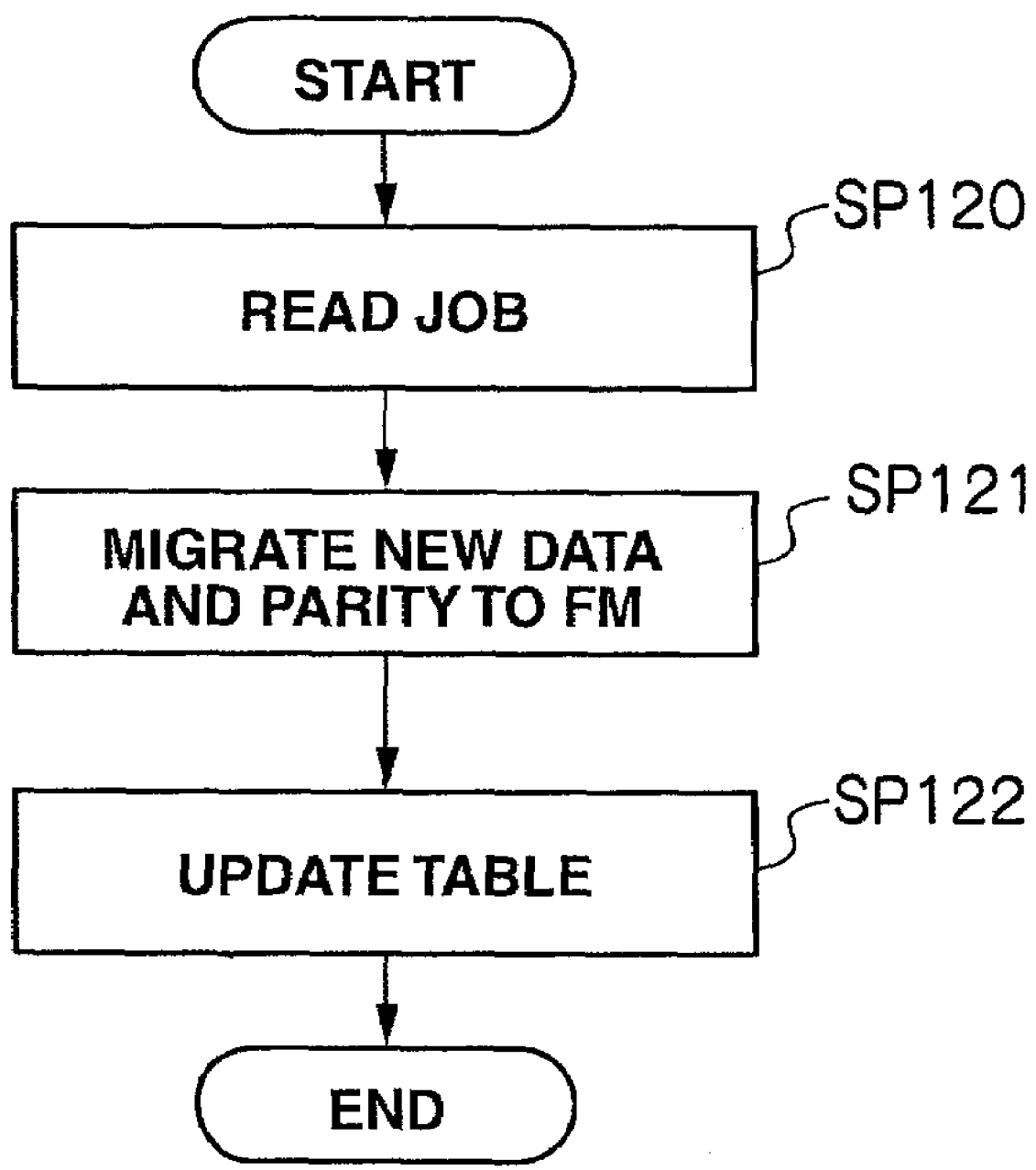
FIG. 17 is a flowchart explaining the processing performed by a microprocessor during the second data write mode according to an embodiment of the present invention.

FIG. 16 and FIG. 17 are flowcharts showing the specific processing contents of the microprocessor 39 during the foregoing second data write mode.

FIG. 16 shows the processing contents upon migrating the write-target data stored in the cache memory 34 to the hard disk drive 41 (step SP88 to step SP102 of FIG. 15), and FIG.

17 shows the processing contents upon migrating the write-target data stored in the hard disk drive 41 to the flash memory 20 (step SP103 to step SP108 of FIG. 15), respectively. Incidentally, explanation regarding the processing contents upon writing the write-target data sent from the host 30 into the cache memory 34 (step SP80 to step SP87 of FIG. 15) is omitted since the processing is the same as the first mode cache write processing explained with reference to FIG. 12. The microprocessor 39 executes these processing routines based on a corresponding control program stored in the memory 40 (FIG. 2).

In other words, after the microprocessor 39 executes the first mode cache write processing shown in FIG. 12, it starts the second mode hard disk write processing shown in FIG. 16 at a suitable timing according to its own load status including other processing routines, and foremost reads the "job" registered in the memory 38 (SP110).

Subsequently, the microprocessor 39, based on the data management table 50, determines whether old-write target data corresponding to the write-target data and the parity of such old write-target data are stored in the hard disk drive 41 (SP111).

When the microprocessor 39 obtains a determination result (HDD hit) in this hit/miss determination indicating that the old write-target data and the parity of such old write-target data are stored in the hard disk drive 41, it secures a storage extent for the capacity required in the parity operation (SP116) described later in the cache memory 34 (SP112), and thereafter controls the disk controller 32 and the cache memory controller 35 to migrate the old write-target data and the parity of such old write-target data from the hard disk drive 41 to the cache memory 34 (SP113).

Contrarily, when the microprocessor 39 obtains a determination result (HDD miss) in the hit/miss determination at step SP111 indicating that the corresponding old write-target data and the parity of such old write-target data are not stored in the hard disk drive 41, it secures a storage extent for the capacity required in the parity operation (SP116) described later in the cache memory 34 (SP114), and thereafter controls the flash memory controller 33 and the cache memory controller 35 to migrate the old write-target data and the parity of such old write-target data from the flash memory 20 to the cache memory 34 (SP115).

Incidentally, for instance, when the old write-target data and the parity of such old write-target data are not stored in either the hard disk drive 41 and the flash memory 20; that is, when the write-target data is not the update data of the data that is already stored in the flash memory 20 and such write-target data is data to be newly written into the flash memory 20, so-called zero data is read from the flash memory 20 and migrated to the cache memory 34 as the old write-target data and the parity of such old write-target data.

The microprocessor 39 thereafter creates new parity of the write-target data based on the write-target data, the old write-target data, and the parity of such old write-target data migrated to the cache memory 34 (SP116). Further, the microprocessor 39 controls the cache memory controller 35 and the disk controller 32 to migrate the new parity created at step SP116, and the write-target data to the hard disk drive 41 (SP117).

When the microprocessor 39 thereafter receives an end status indicating the completion of writing of the write-target data and the new parity of such write-target data into the hard disk drive 41 from the cache memory controller 35, it performs job registration and updates the data management table 50 accordingly (SP118), and then ends this second mode hard disk write processing.

Meanwhile, the microprocessor 39 thereafter starts the second mode flash memory write processing shown in FIG. 17 at a prescribed timing described later with reference to FIG. 24, and foremost reads the foregoing "job" registered in the memory 38 (SP120).

Subsequently, the microprocessor 39 controls the disk controller 32 and the flash memory controller 33 to migrate the write-target data and the parity of such write-target data from the hard disk drive 41 to the flash memory 20 (SP121), thereafter updates the data management table 50 accordingly to the processing at step SP120 and step SP121 (SP122), and then ends this second mode flash memory write processing.

Figure 18:
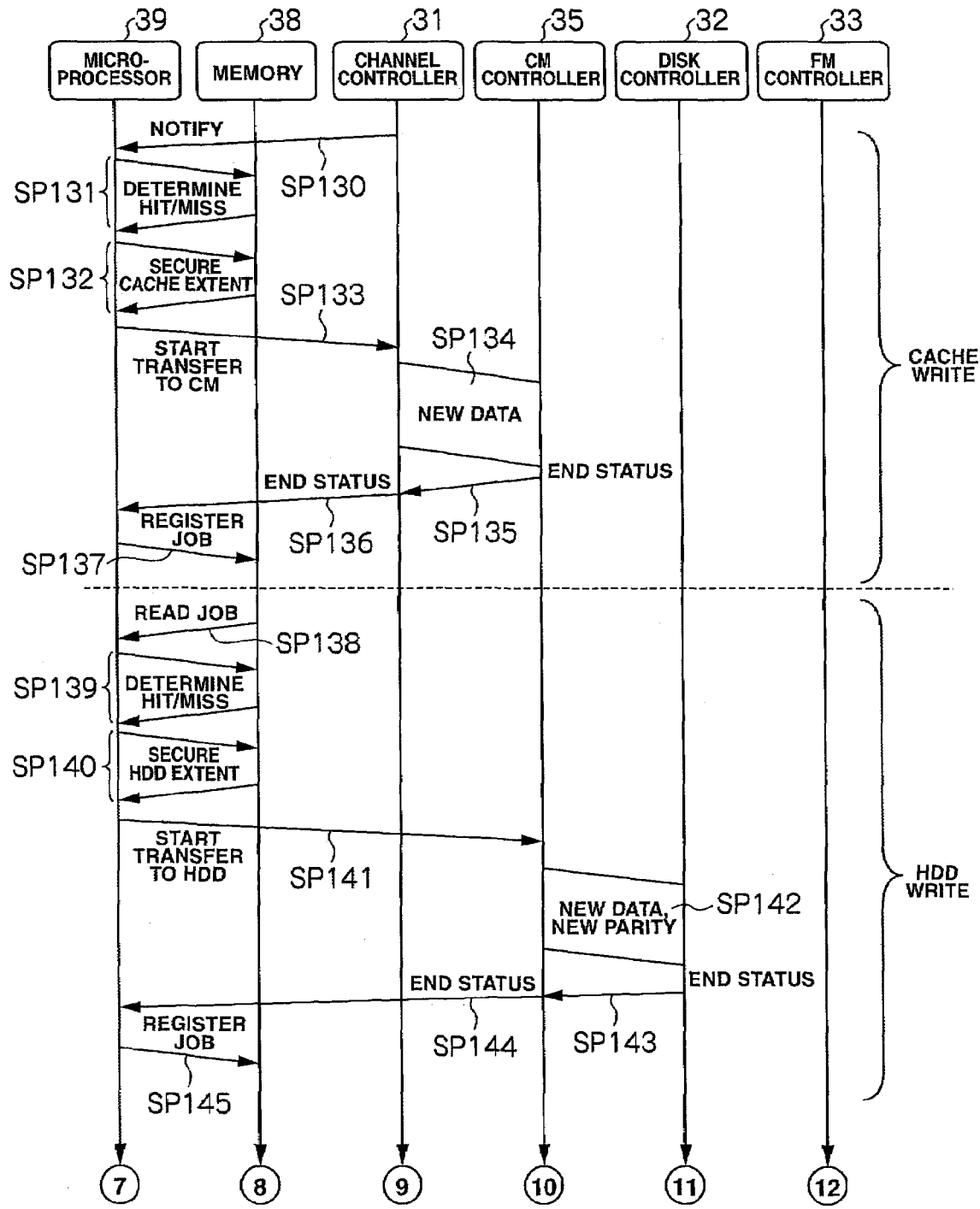
FIG. 18 is a ladder chart explaining the processing flow during the third data write mode according to an embodiment of the present invention.
Figure 19:
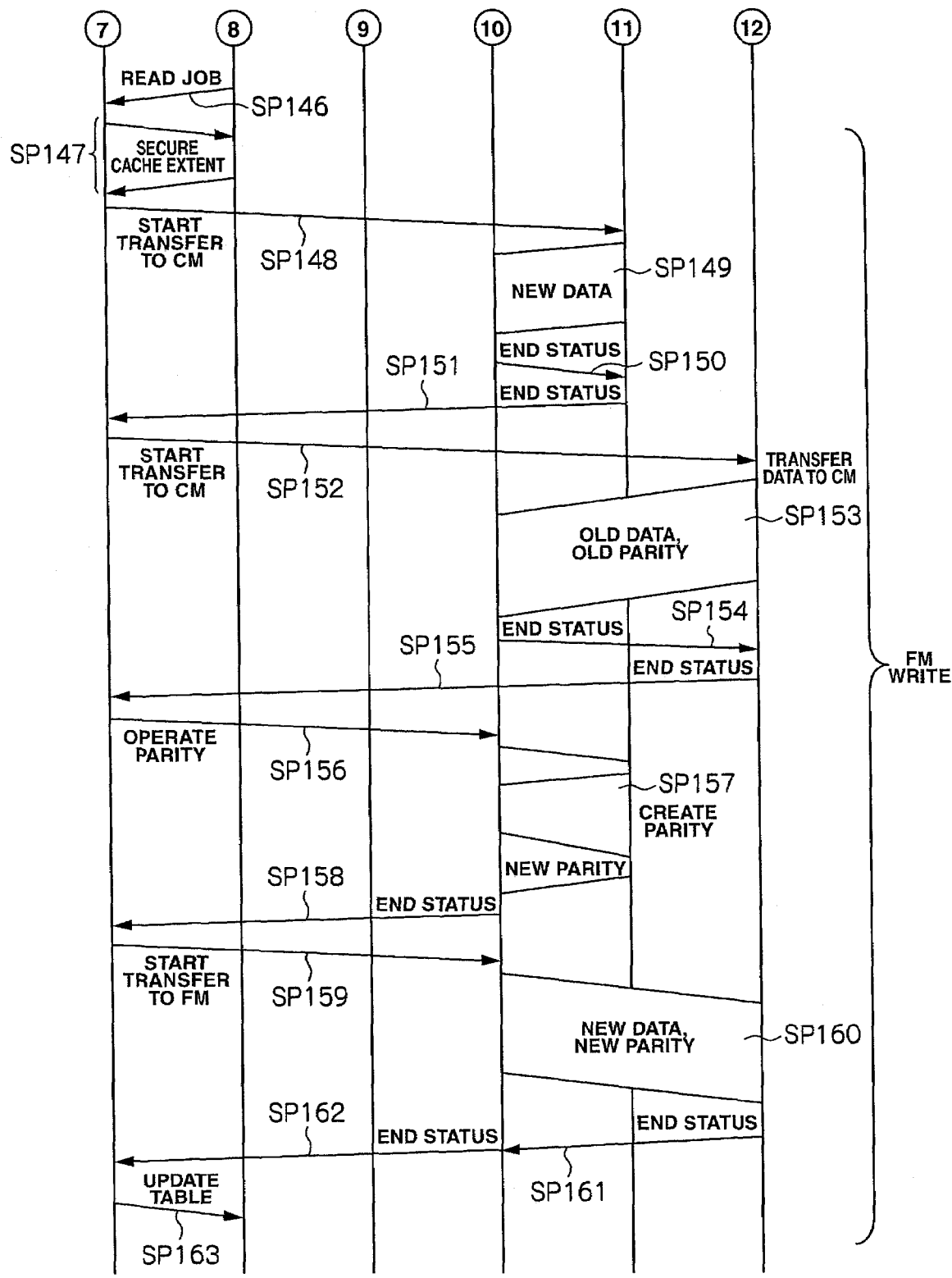
FIG. 19 is a ladder chart explaining the processing flow during the third data write mode according to an embodiment of the present invention.

(1-3-2-3) Third Data Write Mode (1-3-2-3-1) Processing Flow During Third Data Write Mode Meanwhile, with the storage system 1, when the third data write mode is set as the data write mode, the write-target data is written in the flash memory 20 according to the flow shown in FIG. 18 and FIG. 19.

In other words, when a data write request and write-target data are sent from the host 30, the storage system 1 starts the third data write processing shown in FIG. 18 and FIG. 19, and, foremost, the channel controller 31 that received the data write request sends a notice indicating such reception to the microprocessor 39 (SP130). With the storage system 1, according to this notice, the write-target data is duplicated in the cache memory 34, and job registration is performed and the data management table 50 is updated accordingly as in step SP2 to step SP8 of the first data write mode processing described above with reference to FIG. 10 and FIG. 11 (SP131 to SP137).

The microprocessor 39 thereafter reads the foregoing "job" registered in the memory 38 at a suitable timing (SP138). Then, according to this "job", the microprocessor 39 foremost refers to the corresponding "HDD hit/miss information" field 50C of the data management table 50, and determines whether the old write-target data corresponding to the write-target data is stored in the hard disk drive 41 (SP139).

When the microprocessor 39 determines that the old write-target data is not stored in the hard disk drive 41, for instance, it secures a storage extent for the capacity required in duplicating the write-target data in the hard disk drive 41 (SP140), and thereafter issues a command to the cache memory controller 35 for transferring the write-target data to the hard disk 12 (SP141).

When the cache memory controller 35 receives this command, it sequentially reads the write-target data from the cache memory 34, and sends this to the disk controller 32. Further, the disk controller 32 duplicates this write-target data in the storage extent in the hard disk drive 41 secured at step SP140 (SP142).

With the storage system 1, as in step SP21 to step SP23 of the first data write mode, an end status is sent to the microprocessor 39, and, based on this end status, job registration is performed and the data management table 50 is updated accordingly (SP143 to SP145).

Further, with the storage system 1, as in step SP24 to step SP41 of the first data write processing described with reference to FIG. 10 and FIG. 11, new parity of the write-target data stored in the hard disk drive 41 is created, the write-target data and the new parity of such write-target data are migrated to the flash memory 20, and the data management table 50 is thereafter updated accordingly (SP146 to SP163).

(1-3-2-3-2) Processing of Microprocessor During Third Data Write Mode

Figure 20:
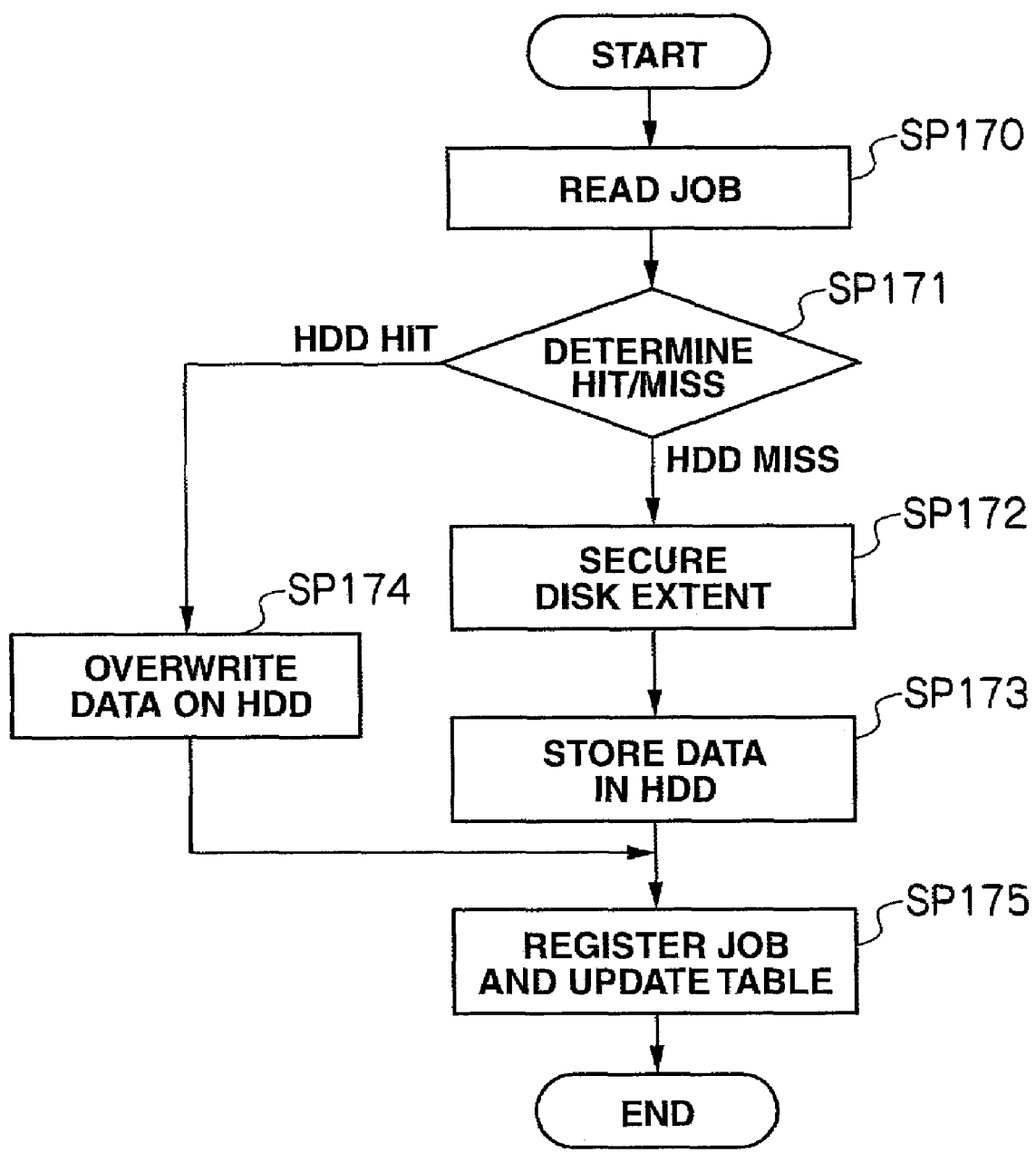
FIG. 20 is a flowchart explaining the processing performed by a microprocessor during the third data write mode according to an embodiment of the present invention.

FIG. 20 is a flowchart showing the specific processing contents of the microprocessor 39 during the foregoing third data write mode.

In fact, FIG. 20 shows the processing contents upon migrating the write-target data stored in the cache memory 34 to the hard disk drive 41 (step SP138 to step SP145 of FIG. 18). Incidentally, explanation regarding the processing contents upon writing the write-target data sent from the host 30 into the cache memory 34 (step SP131 to step SP137 of FIG. 18) is omitted since the processing is the same as the first mode cache write processing explained with reference to FIG. 12, and explanation regarding the processing contents upon storing the write-target data stored in the hard disk drive 41 into the flash memory 20 (step SP146 to step SP163 of FIG. 19) is omitted since the processing is the same as the first mode flash memory write processing explained with reference to FIG. 14. The microprocessor 39 executes the processing of FIG. 20 based on a corresponding control program stored in the memory 40 (FIG. 2).

In other words, after the microprocessor 39 executes the first mode cache write processing shown in FIG. 12, it starts the third mode hard disk write processing shown in FIG. 20 at a suitable timing according to its own load status including other processing routines, and foremost reads the "job" registered in the memory 38 (SP170).

Subsequently, the microprocessor 39, based on the data management table 50, determines whether old-write target data corresponding to the write-target data is stored in the hard disk drive 41 (SP171).

When the microprocessor 39 obtains a determination result (HDD miss) in this hit/miss determination indicating that the old write-target data is not stored in the hard disk drive 41, it secures a storage extent for duplicating the write-target data in the hard disk drive 41 (SP172), and thereafter controls the cache memory controller 35 and the disk controller 32 to read the write-target data from the cache memory 34, and duplicate such write-target data in the storage extent in the hard disk drive 41 secured at step SP172 (SP173).

Contrarily, when the microprocessor 39 obtains a determination result (HDD hit) in this hit/miss determination indicating that the old write-target data is stored in the hard disk drive 41 it controls the cache memory controller 35 and the disk controller 32 to read the write-target data from the cache memory 34, and overwrites this on the old write-target data in the hard disk drive 41 (SP174).

When the microprocessor 39 thereafter receives an end status indicating the completion of writing of the write-target data into the hard disk drive 41 from the cache memory controller 35, it performs job registration and updates the data management table 50 accordingly, and then ends this third mode hard disk write processing.

(1-3-2-4) Fourth Data Write Mode

Figure 21:
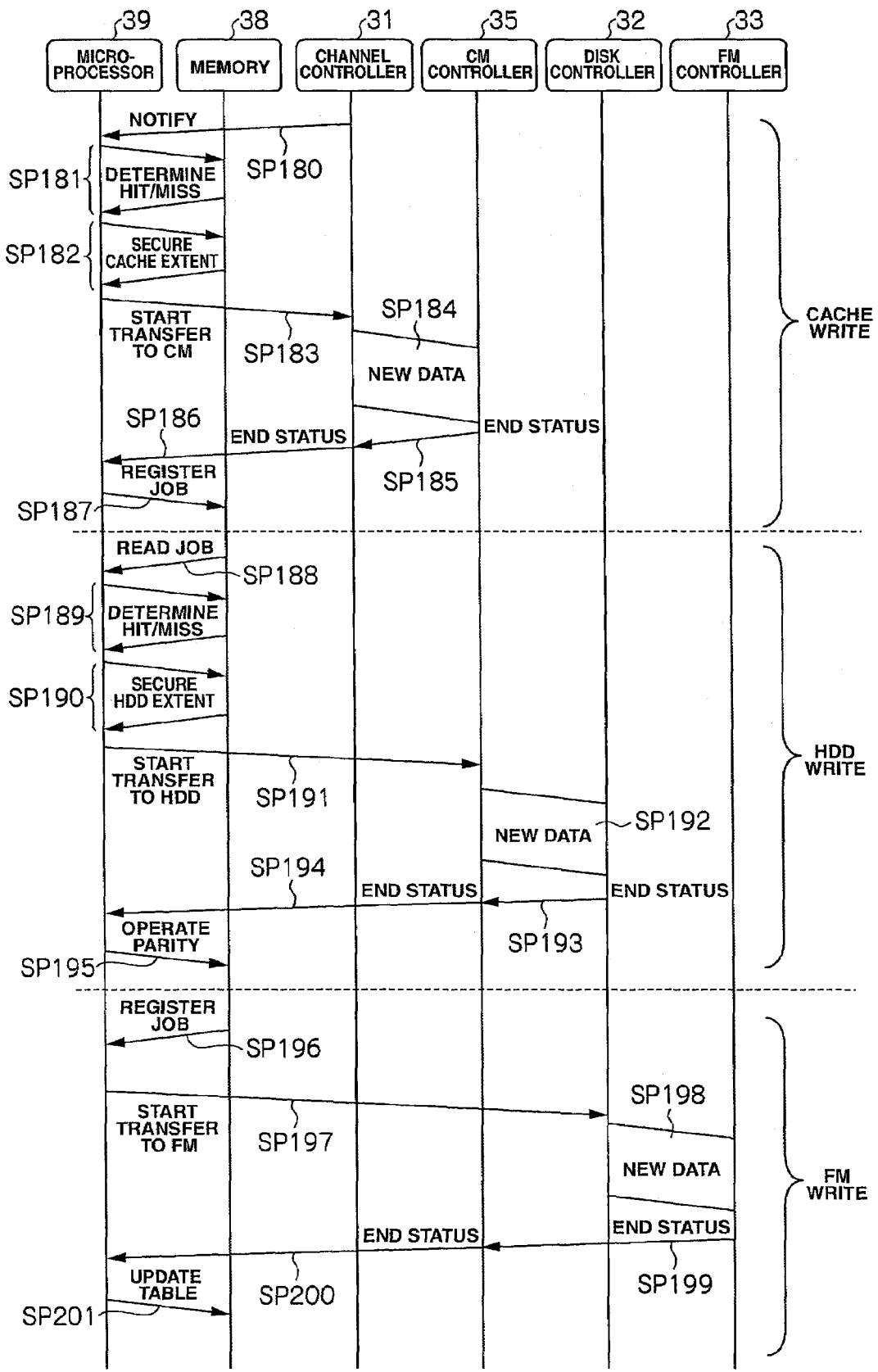
FIG. 21 is a ladder chart explaining the processing flow during the fourth data write mode according to an embodiment of the present invention.

FIG. 21 shows the processing flow in the storage system 1 when the fourth data write mode is set as the data write mode.

In this fourth data write mode, the write-target data sent from the host 30 is sequentially duplicated in the cache memory 34 and the hard disk drive 41 as in step SP130 to step SP145 of the foregoing third data write mode explained with reference to FIG. 18 and FIG. 19 (SP180 to SP195).

Further, with the storage system 1, the write-target data duplicated in the hard disk drive 41 is read from the hard disk drive 41 and duplicated in the flash memory 20 as in step SP103 to step SP108 of the foregoing second data write mode explained with reference to FIG. 15 (SP196 to SP201).

Incidentally, with respect to the specific processing contents of the microprocessor 39 during the fourth data write mode, explanation regarding the processing contents upon writing the write-target data sent from the host 30 into the cache memory 34 (step SP180 to step SP187 of FIG. 21) is omitted since the processing is the same as the first mode cache write processing explained with reference to FIG. 12, explanation regarding the processing contents upon migrating the write-target data stored in the cache memory 34 to the hard disk drive 41 (step SP188 to step SP195 of FIG. 21) is omitted since the processing is the same as the third mode flash memory write processing explained with reference to FIG. 20, and explanation regarding the processing contents upon migrating the write-target data stored in the hard disk drive 41 to the flash memory 20 (step SP196 to step SP201 of FIG. 21) is omitted since the processing is the same as the second mode flash memory write processing explained with reference to FIG. 17.

(1-3-2-5) Data Migration Processing

Incidentally, with the storage system 1, when the write-target data stored in the cache memory 34 is migrated to the hard disk drive 41 as described above, the CM hit/miss information stored in the corresponding "CM hit/miss information" field 50B of the data management table 50 is set to "miss", and the HDD hit/miss information stored in the corresponding "HDD hit/miss information" field 50C is set to "hit". The microprocessor 39 thereafter determines that the write-target data is stored in the hard disk drive 41 based on the foregoing CM hit/miss information and the HDD hit/miss information.

Nevertheless, for instance, while the write-target data stored in the cache memory 34 is being migrated to the hard disk drive 41, if latest write-target data that is newer than the write-target data is sent from the host 30 and stored in the cache memory 34 and no measures are taken, the latest write-target data will be set as though it exists in the hard disk drive 41 even though the latest write-target data actually exists in the cache memory 34.

During this kind of situation, when a data read request of such write-target data is sent from the host 30, a problem will arise in that the write-target data of the previous version will be read from the hard disk drive 41 and sent to the host 30 even though the latest write-target data exists in the cache memory 34.

The same phenomenon will occur when the write-target data stored in the hard disk drive 41 is migrated to the flash memory 20.

Thus, in this embodiment, the "HDD data in-migration flag" field 50F and the "FM data in-migration flag" field 50G are provided to the data management table 50 as described with reference to FIG. 5, and, while the write-target data is being migrated from the cache memory 34 to the hard disk drive 41, "1" is stored as a HDD data in-migration flag into the corresponding "HDD data in-migration flag" field 50F (this is hereinafter referred to raising a flag).

With the storage system 1, while the write-target data is being migrated from the cache memory 34 to the hard disk drive 41, if write-target data that is newer than this write-target data is sent from the host 30 and this write-target data is to be written into the cache memory 34, the HDD data in-migration flag inside the "HDD data in-migration flag" field 50F is changed to "0" (this is hereinafter referred to as clearing a flag).

In this case, even when the migration of the write-target data is complete, the CM hit/miss information stored in the corresponding "cache hit/miss information" field 50G of the data management table 50 is not updated, and is left as is.

Similarly, with the storage system 1, while the write-target data is being migrated from the hard disk drive 41 to the flash memory 20, the FM data in-migration flag is raised in the corresponding "FM data in-migration flag" field 50G.

Further, with the storage system 1, while the write-target data is being migrated from the hard disk drive 41 to the flash memory 20, if write-target data that is newer than the write-target data is to be migrated from the cache memory 34 to the hard disk drive 41, the FM data in-migration flag inside the "FM data in-migration flag" field 50G is cleared.

In this case, even when the migration of the write-target data is complete, the HDD hit/miss information stored in the corresponding "HDD hit/miss information" field 50F of the data management table 50 is not updated, and is left as is.

With the storage system 1, by performing this kind of control, it is possible to effectively prevent a problem where, even though the latest write-target data exists in the cache memory 34 or the hard disk drive 41, write-target data of a previous version is read from the hard disk drive 41 or the flash memory 20 and sent to the host 30.

Figure 22:
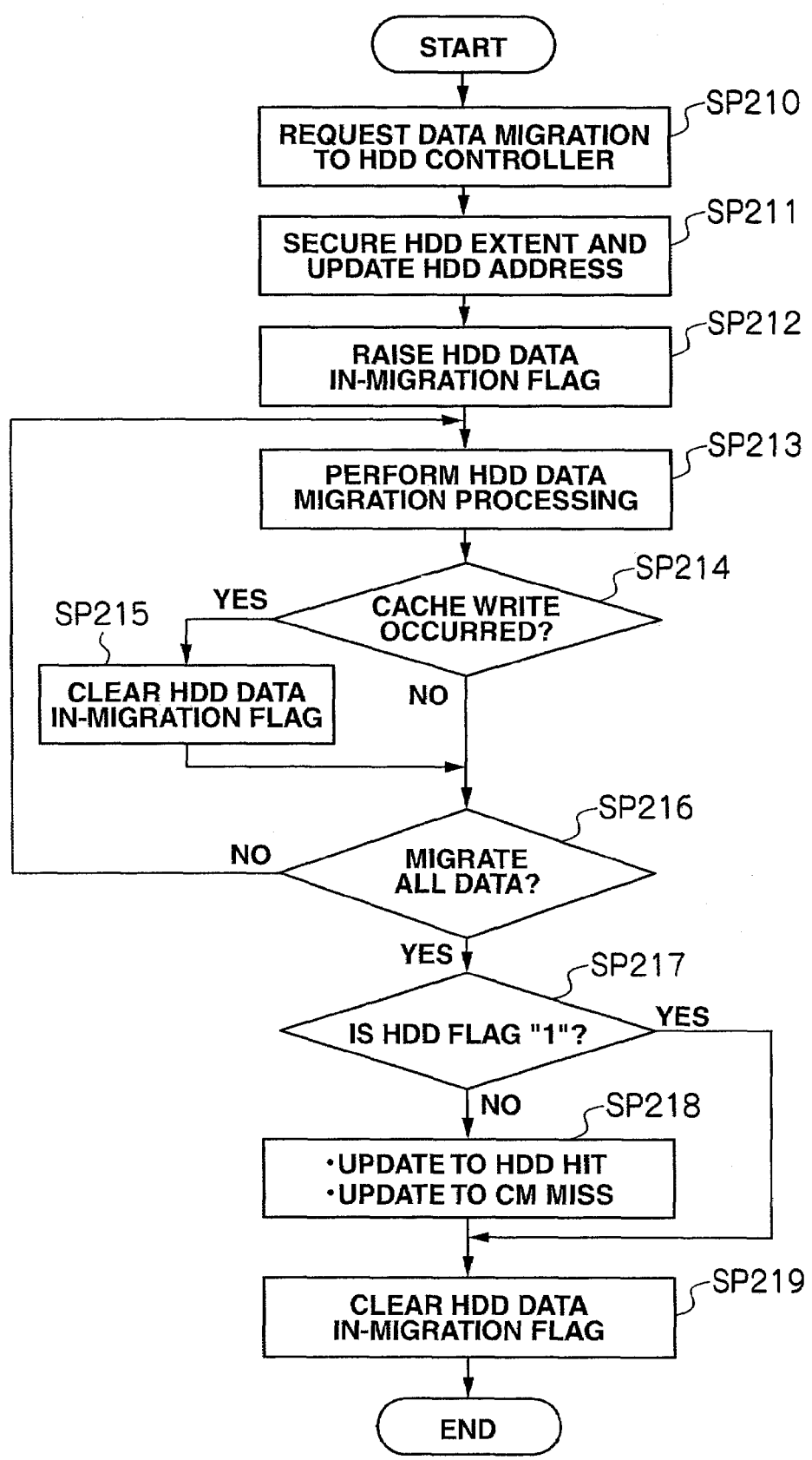
FIG. 22 is a flowchart explaining HDD data migration processing.

FIG. 22 is a flowchart showing the processing contents of the microprocessor 39 upon migrating the write-target data from the cache memory 34 to the hard disk drive 41 among this kind of migration processing (data migration processing) of write-target data.

When the microprocessor 39 is to migrate the write-target data stored in the cache memory 34 to the hard disk drive 41, it starts the HDD data migration processing shown in FIG. 22, and foremost sends a data migration request designating the subject write-target data to the disk controller 32 (SP210).

Subsequently, the microprocessor 39 secures a storage extent in the hard disk drive 41 for migrating the write-target data, and stores the address of the storage extent secured in the hard disk drive 41 into the corresponding "HDD address" field 50E of the data management table 50 (SP211).

The microprocessor 39 thereafter raises the HDD data in-migration flag in the corresponding "HDD data in-migration flag" field 50F of the data management table 50 (SP212), and then controls the cache memory controller 35 and the disk controller 32 to migrate the write-target data from the cache memory 34 to the storage extent secured in the hard disk drive 41 at step SP213 (SP213).

When the microprocessor 39 completes migrating the write-target data of a prescribed data volume from the cache memory 34 to the hard disk drive 41, it determines whether the host 30 sent a data write request for storing the cache memory 34 a new write-target data in which an address that is the same as the address of the storage destination of the write-target data in the flash memory 20 is used as the storage destination (SP214).

When the microprocessor 39 obtains a negative result in this determination, it proceeds to step SP216. Contrarily, when the microprocessor 39 obtains a positive result, it clears the HDD data in-migration flag stored in the corresponding "HDD data in-migration flag" field 50F of the data management table 50 (SP215).

The microprocessor 39 thereafter determines whether the migration of the write-target data from the flash memory 34 to the hard disk drive 41 is complete (SP216). When the microprocessor 39 obtains a negative result is this determination, it returns to step SP213, and thereafter repeats similar processing until it obtains a positive result at step SP216 (SP213 to SP216-SP213).

When the microprocessor 39 eventually obtains a positive result at step SP213 as a result of the migration of the write-target data from the flash memory 34 to the hard disk drive 41 becoming complete, it determines whether the HDD data in-migration flag is raised in the "HDD data in-migration flag" field 50F (whether "1" is stored) (SP217).

When the microprocessor 39 obtains a positive result in this determination, it proceeds to step SP219. Contrarily, when the microprocessor 39 obtains a negative result, it updates the hit/miss information stored in the corresponding "HDD hit/miss information" field 50C of the data management table 50 to "hit", and updates the hit/miss information stored in the corresponding "CM hit/miss information" field 50B of the data management table 50 to "miss" (SP218).

Subsequently, the microprocessor 39 clears the HDD data in-migration flag stored in the corresponding "HDD data in-migration flag" field 50F of the data management table 50 (SP219), and thereafter ends this HDD data migration processing.

Figure 23:
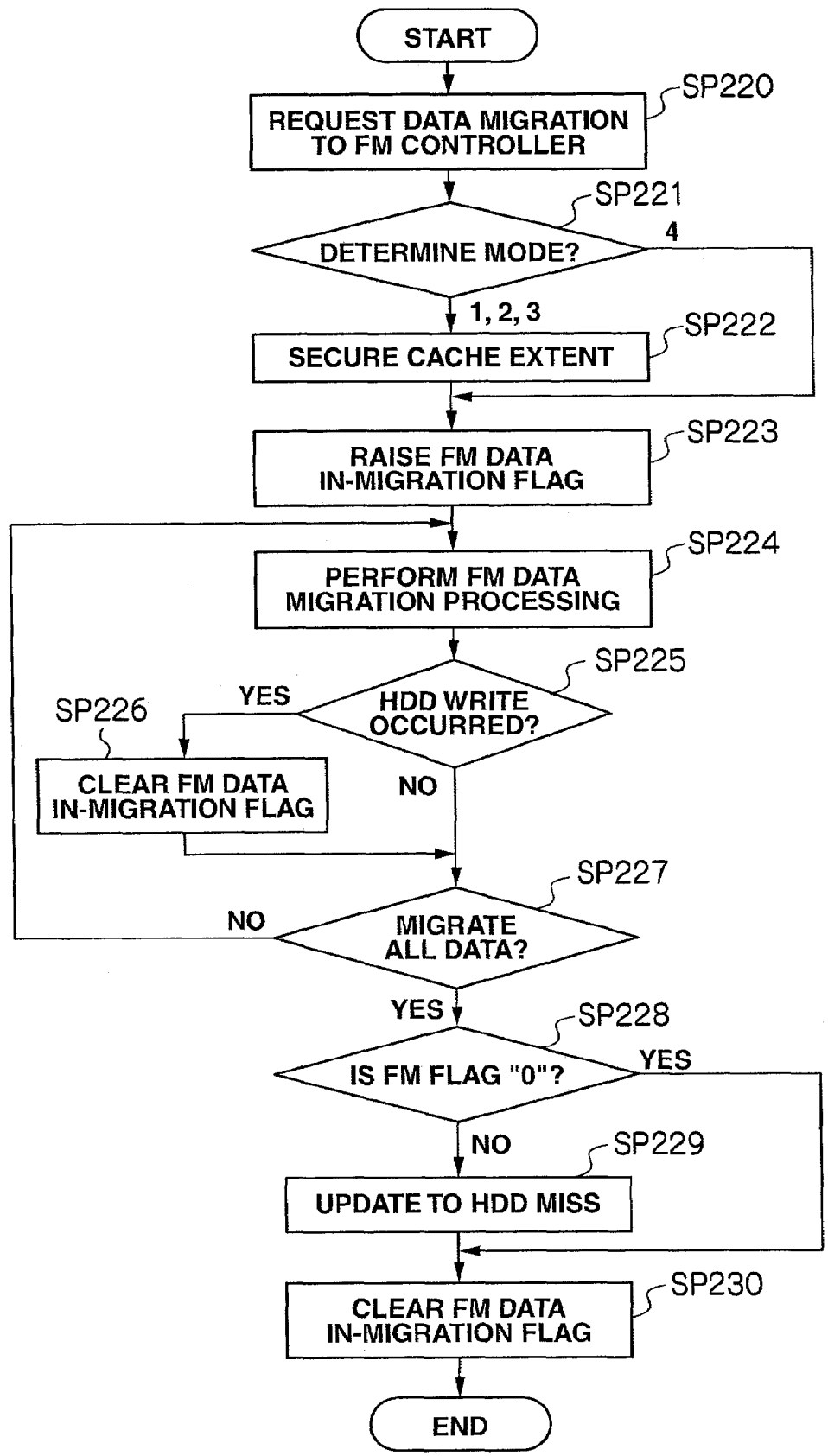
FIG. 23 is a flowchart explaining FM data migration processing.

Meanwhile, FIG. 23 is a flowchart showing the processing contents of the microprocessor 39 upon migrating the write-target data from the hard disk drive 41 to the flash memory 20.

When the microprocessor 39 is to migrate the write-target data stored in the hard disk drive 41 to the flash memory 20, it starts the FM data migration processing shown in FIG. 23, and foremost sends a data migration request designating the subject write-target data to the flash memory controller 33 (SP220).

Subsequently, the microprocessor 39 determines which mode among the foregoing first to fourth data write modes is set as the data write mode (SP221). When the fourth data write mode is set as the data write mode, the microprocessor 39 proceeds to step SP223. Contrarily, when any mode among the first to third data write modes is set, the microprocessor 39 secures a storage extent to be used during the parity operation in the cache memory 34 (SP222).

The microprocessor 39 thereafter raises the HDD data in-migration flag in the corresponding "FM data in-migration flag" field 50G of the data management table 50 (SP223), and then controls the disk controller 32 and the flash memory controller 33 to migrate the write-target data from the hard disk drive 41 to a block designated by the host 30 in the flash memory 20 (SP224).

When the microprocessor 39 completes migrating the write-target data of a prescribed data volume from the hard disk drive 41 to the flash memory 20, it determines whether the execution of processing for storing in the hard disk drive 41 new write-target data having as its storage destination an address that is the same as the address of the storage destination of the write-target data in the flash memory 20 has started (SP225).

When the microprocessor 39 obtains a negative result in this determination, it proceeds to step SP227. Contrarily, when the microprocessor 39 obtains a positive result, it clears the FM data in-migration flag stored in the corresponding "FM data in-migration flag" field 50G of the data management table 50 (SP226).

The microprocessor 39 thereafter determines whether the migration of the write-target data from the hard disk drive 41 to the flash memory 20 is complete (SP227). When the microprocessor 39 obtains a negative result in this determination, it returns to step SP224, and thereafter repeats similar processing until it obtains a positive result at step SP227 (SP224 to SP227-SP224).

Further, when the microprocessor 39 obtains a positive result at step SP227 as a result of the migration of the write-target data from the hard disk drive 41 to the flash memory 20 being complete, it determines whether the FM data in-migration flag is raised in the "FM data in-migration flag" field 50G (SP228).

When the microprocessor 39 obtains a positive result in this determination, it proceeds to step SP230. Contrarily, when the microprocessor 39 obtains a negative result, it updates the hit/miss information stored in the corresponding "HDD hit/miss information" field 50C of the data management table 50 to "miss" (SP229).

Subsequently, the microprocessor 39 clears the FM data in-migration flag stored in the corresponding "FM data migration flag" field 50G of the data management table 50 (SP230), and thereafter ends this FM data migration processing.

(1-3-2-6) FM Write Timing Detection Processing

The timing of migrating the write-target data stored in the hard disk drive 41 in the first to fourth data write modes to the flash memory 20 is now explained.

With the storage system 1 according to the present embodiment, there is a problem in that the write count into the flash memory 20 will increase if the timing of migrating the write-target data stored in the hard disk drive 41 to the flash memory 20 is too fast. Meanwhile, with the storage system 1, if this timing is too slow, problems will arise in that it will not be possible to leverage the characteristics of the flash memory 20 with favorable data read performance, or the data volume migrated from the cache memory 34 to the hard disk drive 41 could exceed the data volume to be migrated from the hard disk drive 41 to the flash memory 20, thereby causing an overflow in the hard disk drive 41. Accordingly, it would be ideal to make the timing of migrating the write-target data stored in the hard disk drive 41 to the flash memory 20 as soon as possible in consideration of the cost performance of the flash memory 20 and other factors.

In the foregoing case, as methods of deciding the timing of migrating the write-target data from the hard disk drive 41 to the flash memory 20, a first method of migrating the write-target data from the hard disk drive 41 to the flash memory 20 for each predetermined period of time (hereinafter referred to as a first timing determination method), and a second method of performing such migration when the total data volume of the write-target data stored in the respective hard disk drives 41 exceeds a predetermined threshold value (hereinafter referred to as a second timing determination method) may be considered.

Among the above, in the first timing determination method, there is an advantage in that it is easy to limit the write count into the flash memory 20 and inhibit variations in the timing of migrating such write-target data. Nevertheless, for instance, if the capacity of the hard disk drive 41 is small and the data volume of the write-target data is large, there is a possibility that the hard disk drive 41 will overflow. Thus, when adopting the first timing determination method, it is necessary to mount additional hard disk drives 41 on the storage system 1 to secure sufficient capacity.

Meanwhile, in the second timing determination method, there is an advantage in that the hard disk drive 41 will not overflow and the number of hard disk drive to be mounted can be inhibited. Nevertheless, when there are only few data write requests from the host 30, there is a problem in that the data read performance will deteriorate since the write-target data will be stored in the hard disk drive 41 for a long period of time.

Thus, with the storage system 1 of this embodiment, in consideration of the advantages and disadvantages of the first and second timing determination methods, the timing of migrating the write-target data from the hard disk drive 41 to the flash memory 20 is subject to the condition of both the elapsed time from the previous migration of the write-target data from the hard disk drive 41 to the flash memory 20, and the data volume of the write-target data existing in the hard disk drive 41.

In parallel with the foregoing first to fourth data write processing routines, the microprocessor 39 constantly monitors both the elapsed time and the data volume of the write-target data in the hard disk drive 41 as described above, and controls the disk controller 32 and the flash memory controller 33 to migrate the write-target data stored in the hard disk drive 41 to the flash memory 20 when either condition is satisfied.

Figure 24:
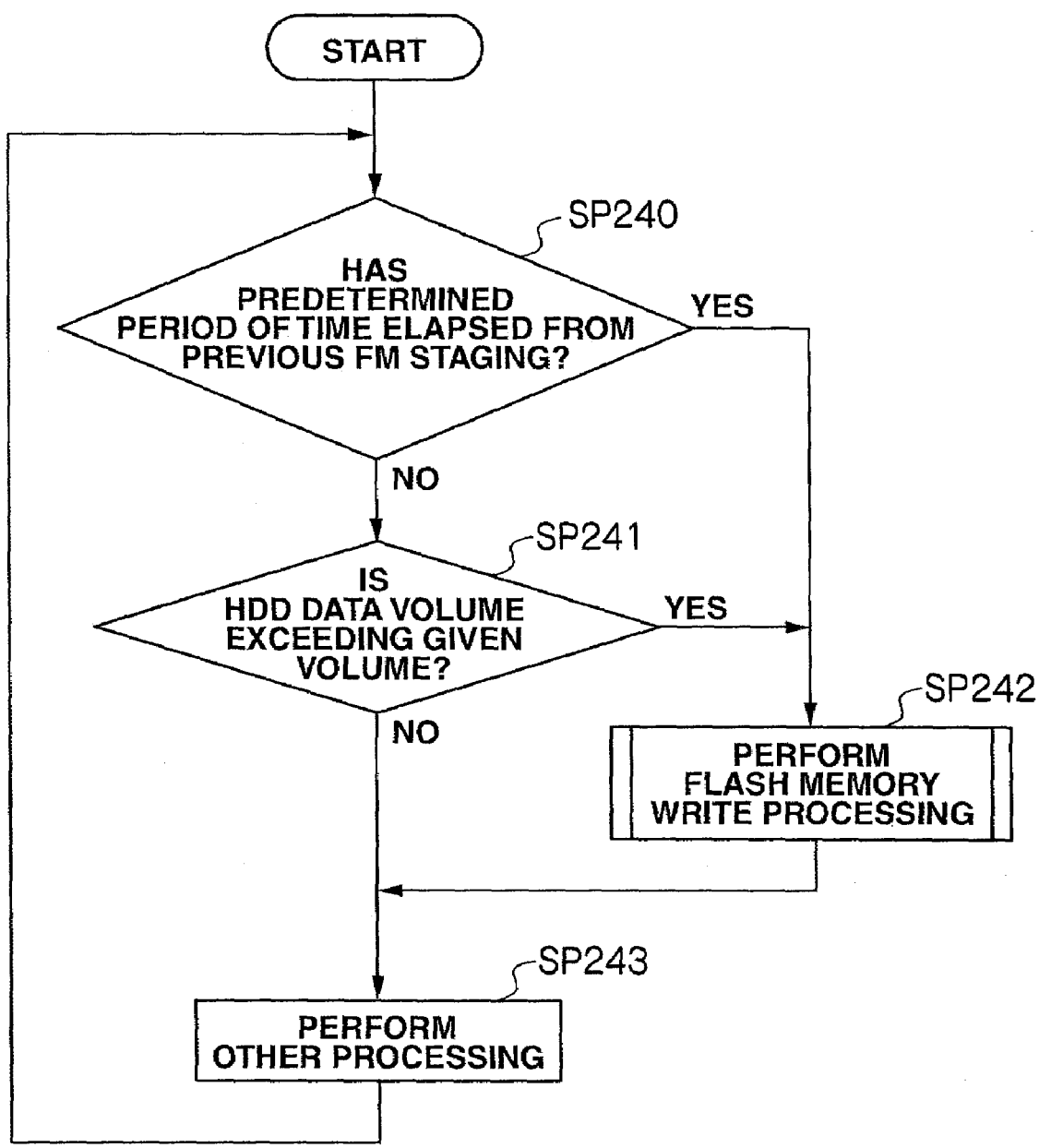
FIG. 24 is a flowchart explaining FM write timing detection processing.

FIG. 24 is a flowchart showing the specific processing contents of the microprocessor 39 relating to the processing for detecting the timing for migrating the write-target data from the hard disk drive 41 to the flash memory 20 (hereinafter referred to as FM write timing detection processing).

During the first to fourth data write processing modes, when microprocessor 39 completes migrating the write-target data from the cache memory 34 to the hard disk drive 41 as well as performing job registration and updating the data management table 50 accordingly (step SP23 of FIG. 10, step SP102 of FIG. 15, step SP145 of FIG. 18 or step SP195 of FIG. 21), it starts the FM write timing detection processing shown in FIG. 24.

The microprocessor 39 foremost determines whether a predetermined period of time set in advance has elapsed from the last time it migrated the write-target data in the hard disk drive 41 to the flash memory 20 (SP240).

When the microprocessor 39 obtains a negative result in this determination, it determines whether the data volume of the write-target data stored in the hard disk drive 41 has exceeded a prescribed data volume set in advance (SP241).

When the microprocessor 39 obtains a negative result in this determination, it executes other processing (SP243) and thereafter returns to step SP240, and then repeats similar processing until it obtains a positive result at step SP240 or step SP241 (SP240-SP241-SP243-SP240).

When the microprocessor 39 eventually obtains a positive result in the determination at step SP240 or step SP241, it migrates the write-target data stored in the hard disk drive 41 to the flash memory 20 by executing the data write mode that is current set between the first mode flash memory write processing explained with reference to FIG. 14 and the second mode flash memory write processing explained with reference to FIG. 17 (SP242).

Subsequently, the microprocessor 39 executes other processing (SP243), and then repeats similar processing (SP240 to SP243-SP240). Incidentally, although a case of using the lapse of a predetermined period of time and the data volume of the write-target data as the opportunity was explained above, in addition, for instance, the migration may be executed at a timing of a sensor or the like detecting a failure in the structural component of the storage system 1 (hard disk drive 41, respective controllers) as the opportunity.

(1-3-3) Details of Data Read Processing

Details regarding the data read processing in the storage system 1 according to the present embodiment are now explained.

With the storage system 1 of this embodiment, during the data read mode, the read-target data stored in the flash memory 20 is sent to the corresponding host 30 by being read according to the first and second data read methods explained with reference to FIG. 4D-1 and FIG. 4D-2.

Figure 25:
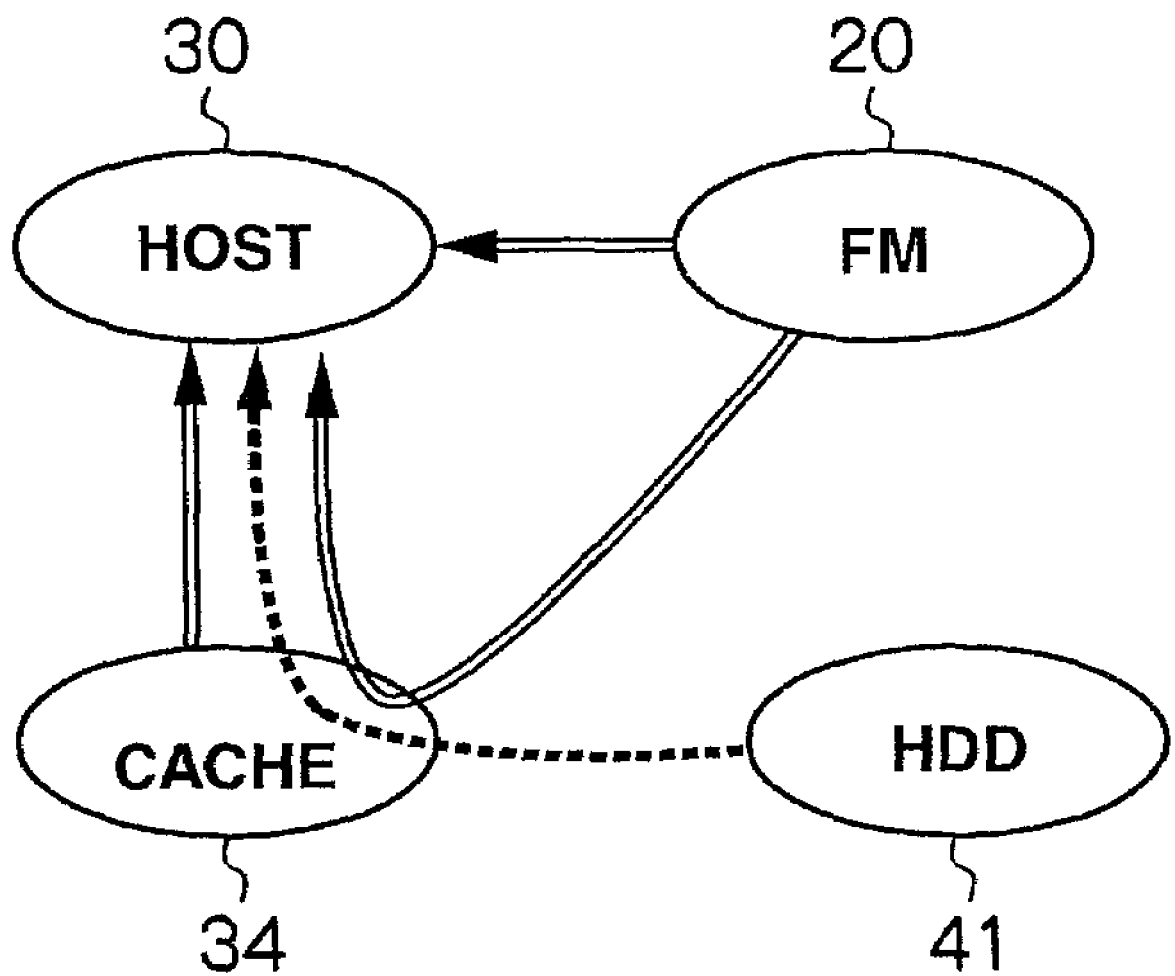
FIG. 25 is a conceptual diagram showing the flow of data read during the data read mode according to an embodiment of the present invention.

As shown in FIG. 25, in the case of the second data read method, the read-target data is read from the flash memory 20 and sent directly to the host 30.

Further, in the case of the first data read method, when read-target data exists in the cache memory 34, such read-target data is read from the cache memory 34 and sent to the host 30. Further, when read-target data does not exist in the cache memory 34 and exists in the hard disk drive 41 or the flash memory 20, such read-target data is read from the hard disk drive 41 or the flash memory 20 and thereafter sent to the host 30 via the cache memory 34.

A mode between the first and second data read modes is selected and designated by a user or a management computer (not shown) according to the structural specification, purpose of use, or operating status of the storage system 1; type of stored data; access characteristics from the host 30, and so on upon activating the storage system. Further, the microprocessor 39 may also automatically select a mode at an arbitrary opportunity while the storage system 1 is running. For example, when the read performance of the cache memory 34 is better than the read performance of the flash memory 20, or the data stored in the flash memory 20 is random access data, the first data read mode is selected. Meanwhile, for instance, when the connection 36 of the storage system is a crossbar switch, the second data read method is selected.

Incidentally, information on the selected data read method is registered in the memory 38, and each microprocessor 39 is able to refer to the data read method by accessing the memory 38.

Figure 26:
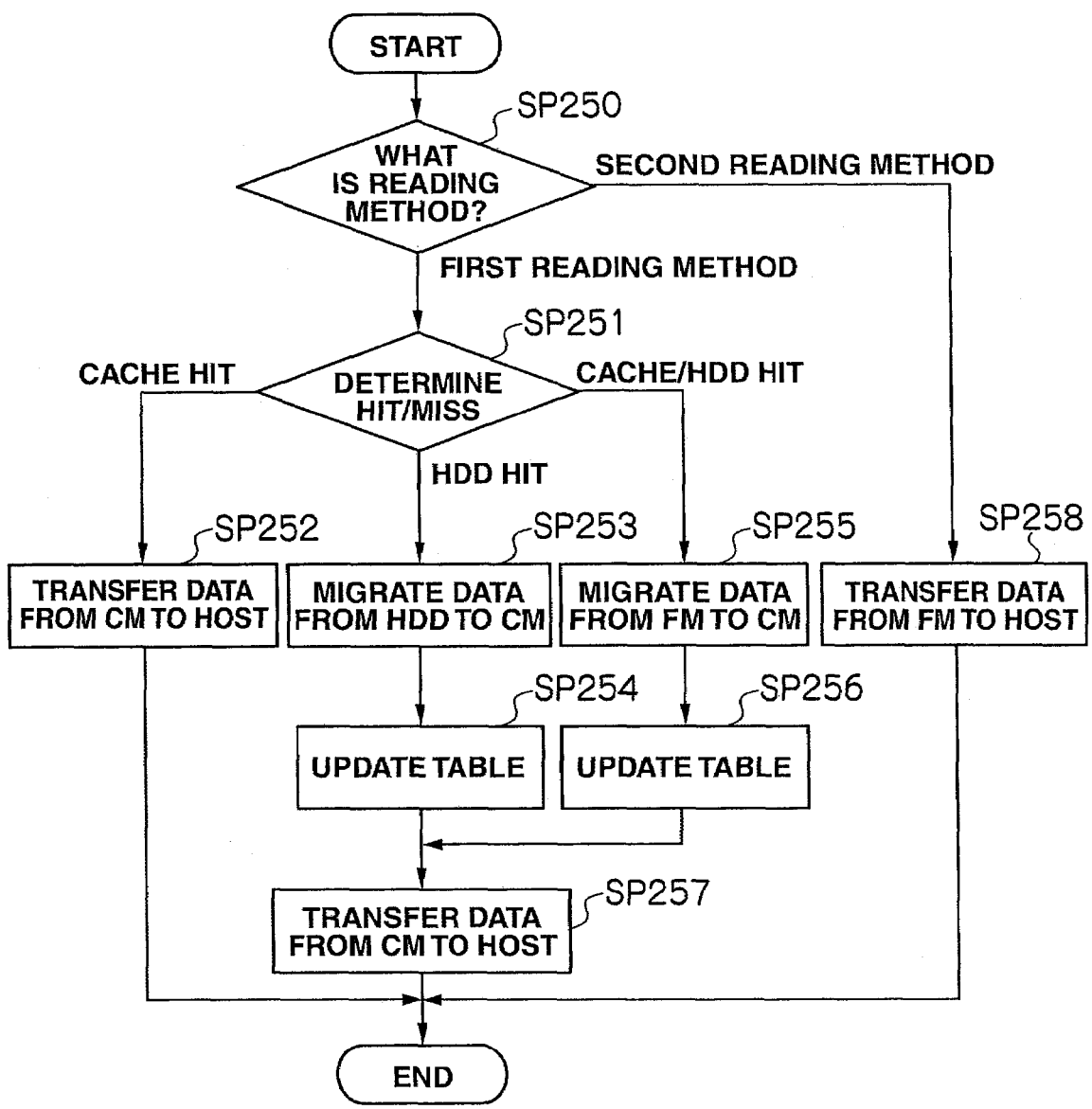
FIG. 26 is a flowchart showing the processing flow in the storage system during the data read mode according to an embodiment of the present invention.

FIG. 26 shows the processing flow of the storage system 1 during the foregoing data read mode.

In other words, with the storage system 1, when a data read request is sent from the host 30, the data read request is transferred from the channel controller 31 to the microprocessor 39.

When the microprocessor 39 receives the data read request, it foremost determines whether the first or the second data read method is currently set as the data read method (SP250).

When the microprocessor 39 determines that the first data read method has been set as the data read method, it refers to the corresponding "CM hit/miss information" field 50B and the "HDD hit/miss information" field 50C of the data management table 50 (FIG. 5) stored in the memory 38, and determines whether the read-target data exists in either the cache memory 34 or the hard disk drive 41 (SP251).

When the microprocessor 39 determines that the read-target data exists in the cache memory 34 (cache hit), it controls the cache memory controller 35 and the channel controller 31 accordingly. Thereby, the cache memory controller 35 reads the read-target data from the cache memory 34 and sends it to the channel controller 31 on the one hand, and the channel controller 31 sequentially transfers such read-target data sent from the cache memory controller 35 to the corresponding host 30 on the other hand (SP252).

Meanwhile, when the microprocessor 39 determines at step SP251 that the read-target data exists in the hard disk drive 41 (HDD hit), it controls the disk controller 32 and the cache memory controller 35 to migrate such read-target data from the hard disk drive 41 to the cache memory 34 (SP253).

Further, the microprocessor 39 accesses the memory 38, and sets the CM hit/miss information stored in the corresponding "CM hit/miss information" field 50B of the data management table 50 to "hit", and sets the HDD hit/miss information stored in the corresponding "HDD hit/miss information" field 50C to "miss", respectively (SP254).

The microprocessor 39 also controls the cache memory controller 35 and the channel controller 31 as at step SP252. Thereby, the read-target data migrated to the cache memory 34 is transferred to the corresponding host 30 via the channel controller 31 (SP257).

Meanwhile, when the microprocessor 39 determines at step SP251 that the read-target data does not exist in either the cache memory 34 or the hard disk drive 41 (cache miss and HDD miss), it controls the flash memory controller 33 and the cache memory controller 35 to migrate such read-target data from the flash memory 20 to the cache memory 34 (SP255).

Further, the microprocessor 39 accesses the memory 38, and sets the CM hit/miss information stored in the corresponding "CM hit/miss information" field 50B of the data management table 50 to "hit", and sets the HDD hit/miss information stored in the corresponding "HDD hit/miss information" field 50C to "miss", respectively (SP256).

With the storage system 1, the read-target data stored in the cache memory 34 is thereafter read and transferred to the corresponding host 30 via the channel controller 31 (SP257).

Contrarily, when the microprocessor 39 determines at step SP250 that the second data read method is currently set as the data read method, it controls the flash memory controller 33 and the channel controller 31 to transfer the read-target data stored in the flash memory 20 to the corresponding host 30 via the channel controller 31 (SP258).

(1-3-4) Data Protection in Storage System

The data protection method in the storage system 1 is now explained.

Since the flash memory 20 is a semiconductor memory, there is a possibility that one flash memory chip 20 will malfunction frequently in the memory module 21 (FIG. 2).

Figure 27:
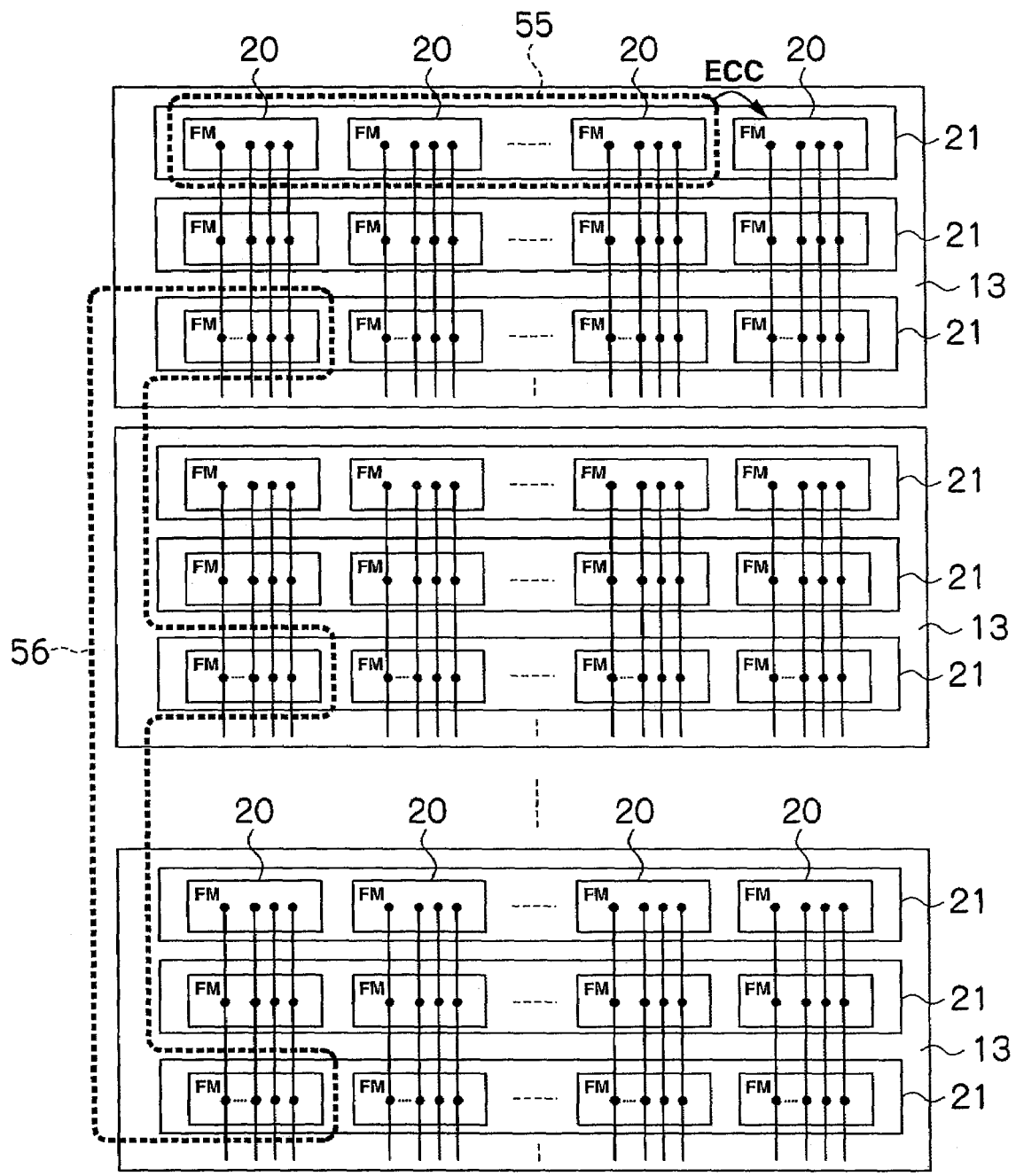
FIG. 27 is a conceptual diagram explaining data protection in the storage system.

Thus, in this embodiment, as shown in FIG. 27, an ECC (Error Correcting Code) group 55 is formed for each memory module 21 or for each of the several ten flash memory chips 20, and data protection by such ECC is performed inside the ECC group 55. Here, the ECC calculation is performed by the flash memory controller 33 in the flash memory package 13 as with such ECC group 55.

Further, in this embodiment, a parity group 56 is formed with the corresponding flash memory chip 20 in the respective flash memory packages 13 among the plurality of flash memory packages 13, and data protection is performed with the parity inside such parity group 56. The parity operation in the foregoing case is performed by the microprocessor 39 as described above.

(1-4) EFFECT OF PRESENT EMBODIMENT

As described above, with the storage system 1 according to the present embodiment, since the flash memory 20 is used as the memory device, and the hard disk drive 41 with a greater data write cycle than the flash memory 20 is preliminarily arranged as a buffer, it is possible to reduce the data write count into the flash memory 20, and the duration of the flash memory 20 can be prolonged and problems arising in connection with malfunctions in the flash memory 20 can be dramatically reduced. Thereby, it is possible to realize a highly reliable storage apparatus with high access speed and low power consumption.

Further, with the storage system 1, since the cache memory is further disposed preliminarily before the hard disk drive 41, it is possible to prevent the deterioration of data performance when using the hard disk drive 41 as a buffer.

Figure 28:
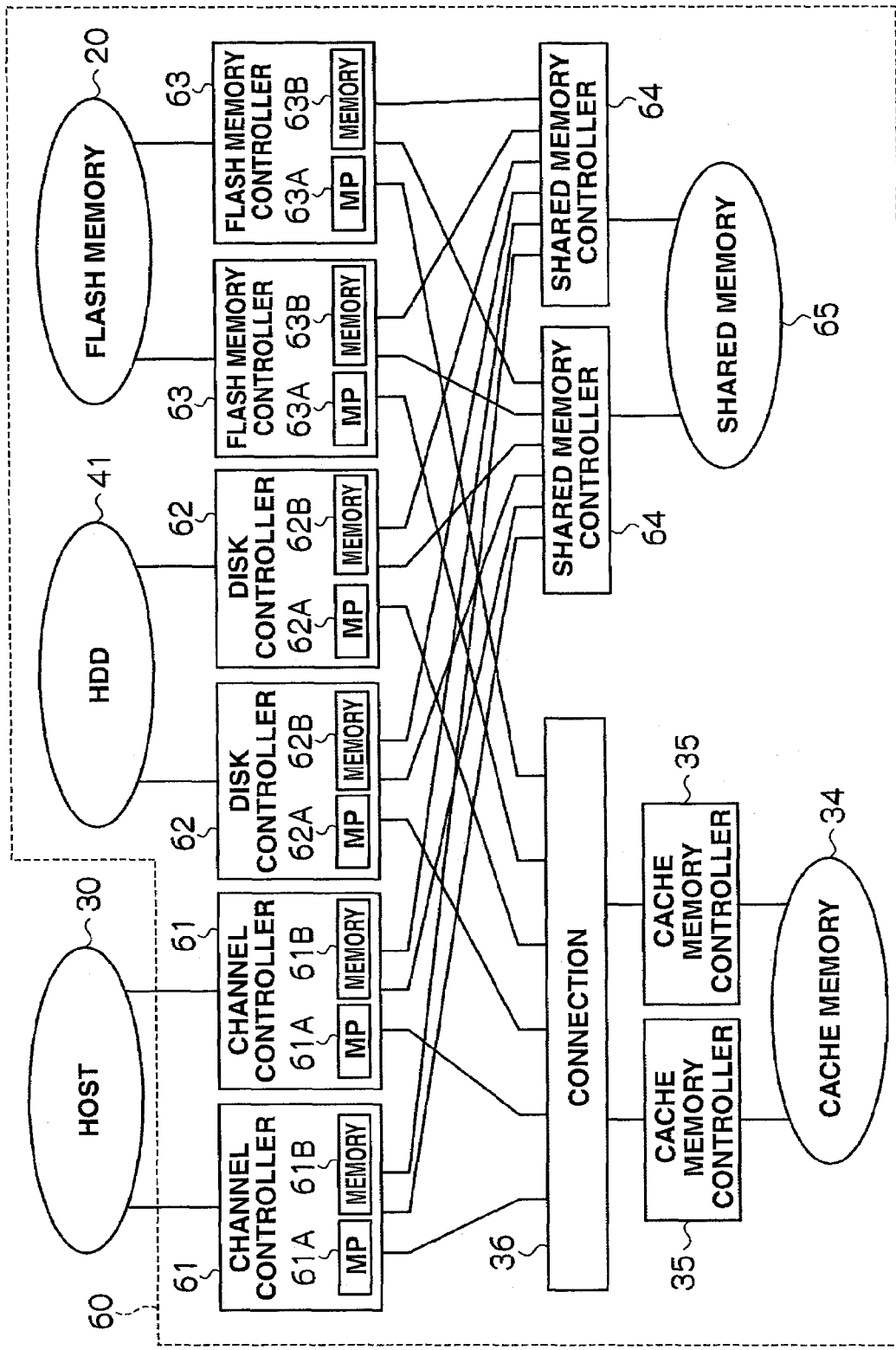
FIG. 28 is a block diagram showing the internal configuration of a storage system according to another embodiment of the present invention.

(2) SECOND EMBODIMENT (2-1) Configuration of Storage System in Present Embodiment FIG. 28, which is given the same reference numerals for the components corresponding to those illustrated in FIG. 3, shows a storage system 60 according to the second embodiment. In the storage system 60, microprocessors 61A to 63A and memories 61B to 63B are mounted on the respective channel controllers 61, the respective disk controllers 62 and the respective flash memory controllers 63. Each of the memories 61 B to 63B stores various control programs, and, by these control programs being executed by the microprocessors 61A to 63A, the channel controller 61, the disk controller 72 and the flash memory controller 63 execute the various processing routines described later as a whole.

With each channel controller 61, each disk controller 62 and each flash memory controller 63, the data line is connected to the connection 36, and, thereby, as with the storage system 1 of the first embodiment, the channel controller 61, disk controller 62 and flash memory controller 63, and the cache memory controller 35 are able to transfer data via the connection 36.

Further, each channel controller 61, each disk controller 62 and each flash memory controller 63 is connected to a shared memory 65 via a shared memory controller 64. The shared memory 65 is primarily used for storing control information such as system configuration information and various control programs. Thereby, with the storage system 60, the channel controller 61, disk controller 62 and flash memory controller 63 respectively access the shared memory 65 via the shared memory controller 64 in order to read and write necessary control information from and into the shared memory 65.

(2-2) Data Read/Write Processing in Storage System (2-2-1) Details of Data Write Processing The processing contents of data read/write processing in the storage system 60 are now explained. The storage system 60 has the same first to fourth data write modes as the first to fourth data write modes explained with reference to FIG. 10 to FIG. 24.

Here, in the first embodiment, based on the control of a plurality of microprocessors 39 (FIG. 3) for uniformly managing the storage system 1, the channel controller 31 (FIG. 3), the disk controller 32 (FIG. 3) and the flash memory controller 33 (FIG. 3) performed the reading and writing of data from and into the cache memory 34, the hard disk drive 41 and the flash memory 20.

Contrarily, with the storage system 60 of this embodiment, the respective microprocessors 61 A to 63A in the channel controller 61, the disk controller 62 and the flash memory controller 63 execute necessary processing based on control information such as the control programs stored in the memories 61B to 63B, and the channel controller 61, the disk controller 62 and the flash memory controller 63 autonomously and sequentially take over the jobs respectively in order to perform the reading and writing of data from and into the cache memory 34, the hard disk drive 41 and the flash memory 20.

The first to fourth data write modes in the storage system 60 according to the second embodiment are now explained.

(2-2-1-1) First Data Write Mode

Figure 29:
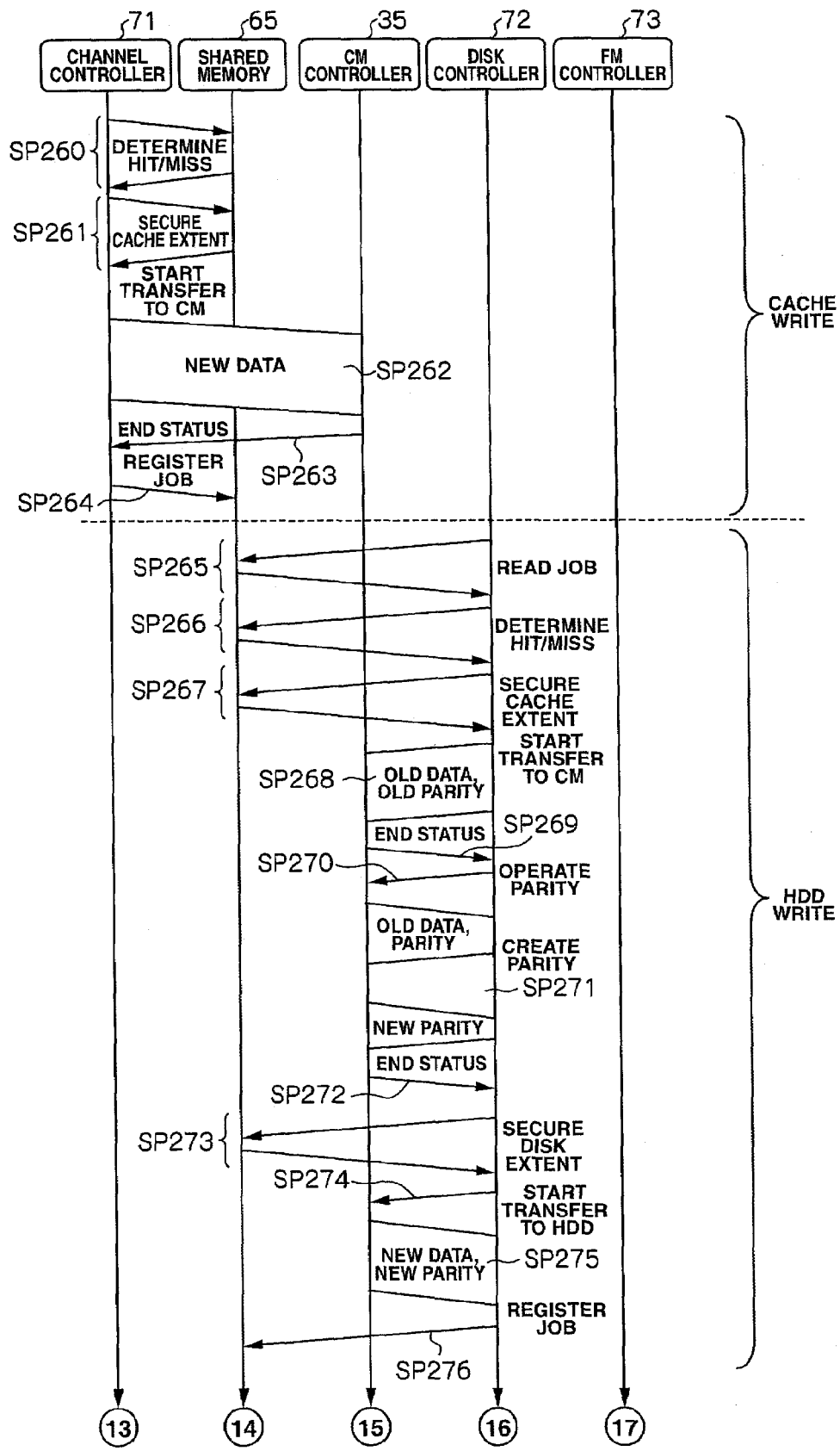
FIG. 29 is a ladder chart explaining the processing flow during a first data write mode according to another embodiment of the present invention.
Figure 30:
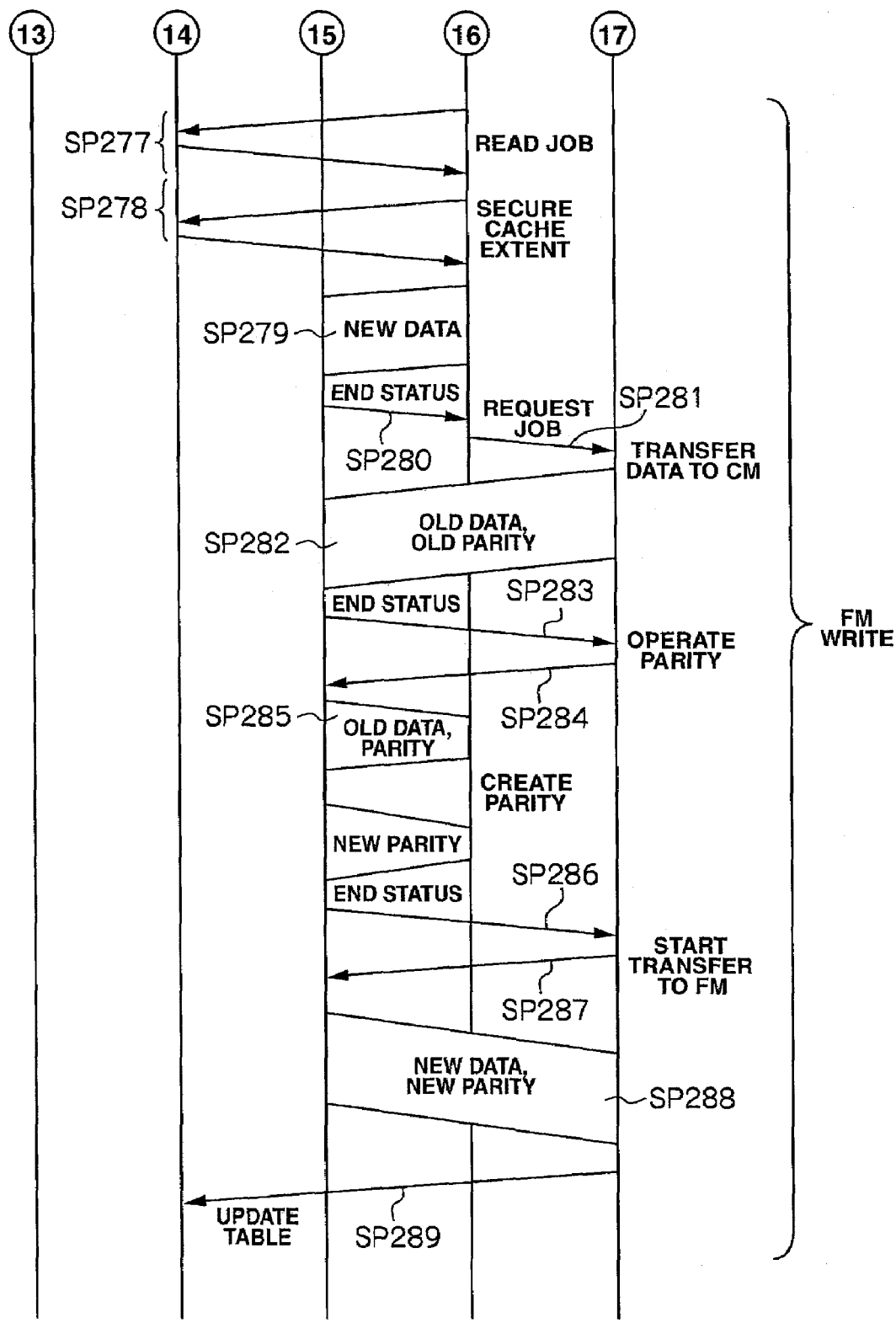
FIG. 30 is a ladder chart explaining the processing flow during a first data write mode according to another embodiment of the present invention.

FIG. 29 and FIG. 30 show the processing flow during the first data write mode in the storage system 60.

With the storage system 60, in a case where the first data write mode is set as the data write mode, when a data write request and write-target data are sent from the host 30, the channel controller 61 that received this data write request executes roughly the same processing as the processing explained with reference to step SP2 to step SP7 of FIG. 10 so as to duplicate such write-target data in the cache memory 34 (SP260 to SP263). The channel controller 61 thereafter registers the corresponding "job" in the shared memory 65 and updates the data management table 50 (FIG. 5) as in step SP8 of FIG. 10 (SP264).

Meanwhile, the disk controller 62 is periodically monitoring the shared memory 65, and, when it detects that the "job" has been registered in the shared memory 65, it executes the same processing as the processing at step SP9 to step SP20 of FIG. 10 in order to create parity (new parity) of the write-target data stored in the cache memory 34, and stores such write-target data and new parity in the hard disk drive 41 (SP265 to SP275). The disk controller 62 thereafter registers the corresponding "job" in the shared memory 65 and updates the data management table 50 as in step SP23 of FIG. 10 (SP276).

Subsequently, when the disk controller 62 detects that the "job" has been registered in the shared memory 65, it executes the same processing as the processing explained with reference to step SP24 to step SP28 of FIG. 11 while controlling the cache memory controller 35 so as to migrate the write-target data stored in the hard disk drive 41 to the cache memory 34 (SP277 to SP280). The disk controller 62 thereafter requests the flash memory controller 63 to execute the subsequent "job" (SP281).

When the flash memory controller 63 receives the foregoing "job" request, it executes the processing that is roughly the same as the processing explained with reference to step SP31 to step SP40 of FIG. 11 so as to create parity (new parity) of the write-target data migrated to the hard disk drive 41 at step SP279 and migrate the write-target data and new parity to the flash memory 20 (SP282 to SP288). The flash memory controller 73 thereafter updates the data management table 50 as in step SP41 of FIG. 11 (SP289).

Figure 31:
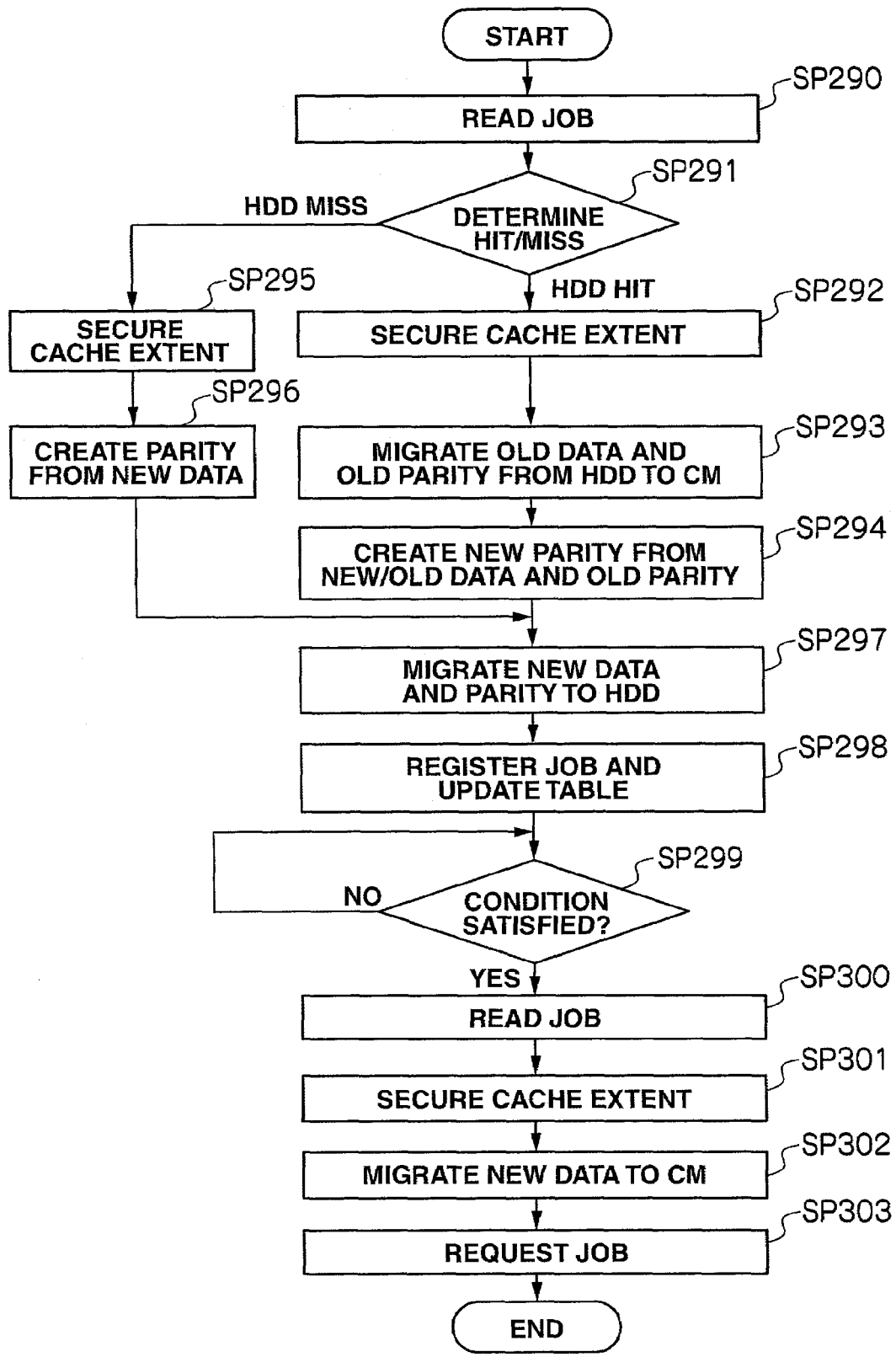
FIG. 31 is a flowchart explaining the processing contents of a microprocessor of a disk controller during the first data write mode according to another embodiment of the present invention.
Figure 32:
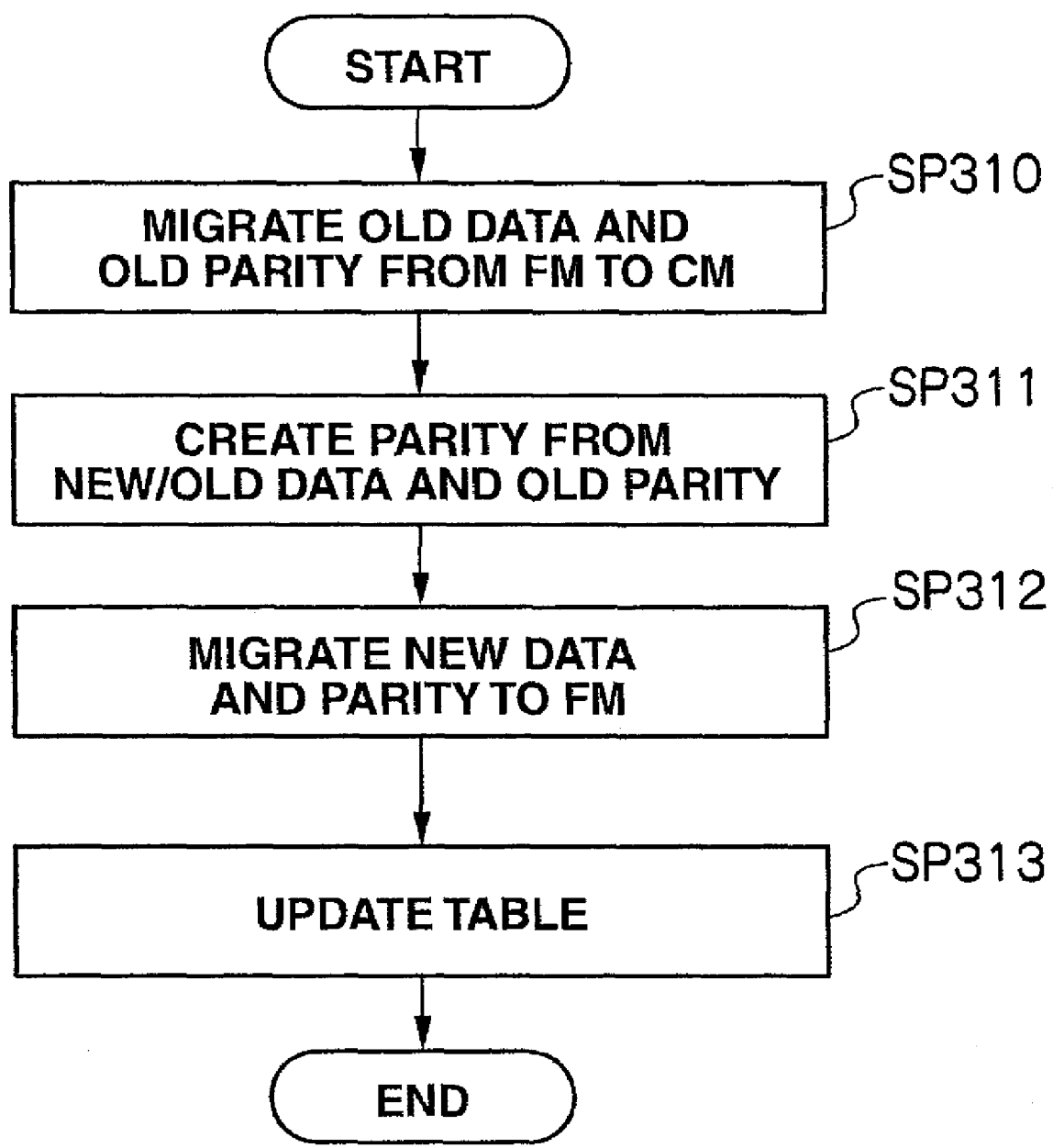
FIG. 32 is a flowchart explaining the processing contents of a flash memory controller during the first data write mode according to another embodiment of the present invention.

Here, FIG. 31 and FIG. 32 are flowcharts respectively showing the specific processing contents of the microprocessor 62A of the disk controller 62 (FIG. 31) and the specific processing contents of the microprocessor 63A of the flash memory controller 73 (FIG. 32) during the first data write mode. Incidentally, explanation of the specific processing contents of the microprocessor 61A of the channel controller 61 during the first data write mode is omitted since it is the same as the processing contents of the first mode cache write processing explained with reference to FIG. 12.

When the microprocessor 62A of the disk controller 62 detects that the corresponding "job" is stored in the shared memory 65, it starts the first mode hard disk write processing shown in FIG. 31, foremost reads the foregoing "job" from the shared memory 65 (SP290), and thereafter refers to the data management table 50 to determine whether the old write-target data is stored in the hard disk drive 41 (SP291).

When the microprocessor 62A determines that the old write-target data is stored in the hard disk drive 41 (HDD hit), as in step SP62 to step SP64-step SP67 of the first mode hard disk write processing explained with reference to FIG. 13, it creates parity (new parity) of the write-target data, and migrates such write-target data and new parity to the hard disk drive 41 (SP290 to SP297).

Contrarily, when the microprocessor 62A determines that the old write-target data is not stored in the hard disk drive 41 (HDD miss), as in step SP65-step SP66-step SP67 of FIG. 13, it creates parity (new parity) of the write-target data, and migrates such write-target data and new parity to the hard disk drive 41 (SP295-step SP296-step SP297).

The microprocessor 62A thereafter registers the "job" in the shared memory 65 and updates the data management table 50 as in step SP68 of FIG. 13 (SP298).

Subsequently, as in the FM write timing detection processing explained with reference to FIG. 24, the microprocessor 62A waits for a predetermined period of time set in advance to elapse from the last time the write-target data in the hard disk drive 41 was migrated to the flash memory 20 (first condition), or the data volume of the write-target data stored in the hard disk drive 41 to exceed a predetermined data volume set in advance (second condition) (SP299).

When one of the foregoing two conditions is eventually satisfied, the microprocessor 62A, as in step SP70 to step SP72 of the first mode flash memory write processing explained with reference to FIG. 14, migrates the write-target data stored in the hard disk drive 41 to the cache memory 34 (SP300 to SP302). Further, the microprocessor 62A requests the subsequent "job" to the flash memory controller 63 (SP303), and then ends this first mode hard disk write processing.

Meanwhile, when the microprocessor 63A of the flash memory controller 63 is given the foregoing job request from the disk controller 62, it starts the first mode flash memory write processing shown in FIG. 32 and, thereafter, as in step SP73 to step SP75 of the first mode flash memory write processing explained with reference to FIG. 14, creates parity (new parity) of the write-target data, and migrates such write-target data and new parity to the flash memory 20 (SP310 to SP312). The microprocessor 73A thereafter updates the data management table 50 as in step SP76 of FIG. 14 (SP313), and then ends this first mode hard disk write processing.

(2-2-1-2) Second Data Write Mode

Figure 33:
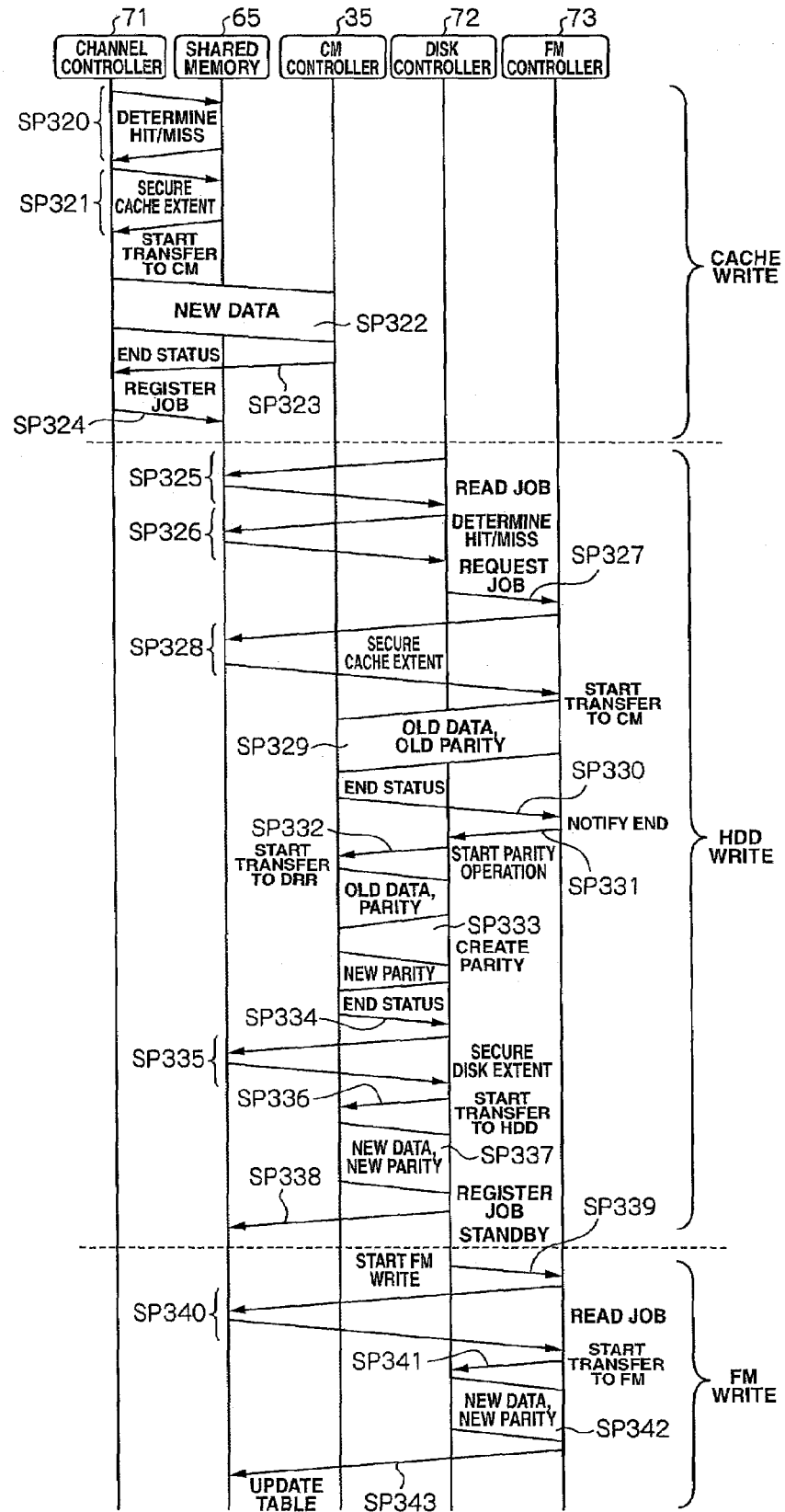
FIG. 33 is a ladder chart explaining the processing flow during a second data write mode according to another embodiment of the present invention.

FIG. 33 shows the processing flow during the second data write mode of the storage system 60.

With the storage system 60, in a case where the second data write mode is set as the data write mode, when a data write request and write-target data are sent from the host 30, the channel controller 61 that received this data write request executes processing that is roughly the same as the processing explained with reference to step SP81 to step SP86 of FIG. 15 so as to duplicate such data in the cache memory 34 (SP320 to SP323). The channel controller 61 thereafter registers the corresponding "job" in the shared memory 65 and updates the data management table 50 as in step SP87 of FIG. 15 (SP324).

Meanwhile, the disk controller 62 is periodically monitoring the shared memory 65, and, when it detects that the "job" has been registered in the shared memory 65, it executes the same processing as the processing at step SP88 to step SP101 of FIG. 15 while requesting a "job" to the flash memory controller 63 as needed in order to create parity (new parity) of the write-target data stored in the cache memory 34, and stores such write-target data and new parity in the hard disk drive 41 (SP325 to SP337). The disk controller 62 thereafter registers the corresponding "job" in the shared memory 65 and updates the data management table 50 as in step SP102 of FIG. 15 (SP338).

Subsequently, when a predetermined period of time has elapsed from the last time the write-target data and new parity were migrated to the flash memory 20, or when the write-target data and new parity of a prescribed volume are accumulated in the hard disk drive 41, the disk controller 62 starts reading the write-target data and the new parity from the hard disk drive 41 (SP339), and, by executing the same processing as the processing at step SP104 to step SP105 of FIG. 15, sequentially stores the write-target data and new parity read from the hard disk drive 41 into the flash memory 20 (SP340 to SP342). The disk controller 62 thereafter updates the data management table 50 as in step SP108 of FIG. 15 (SP343).

Figure 34:
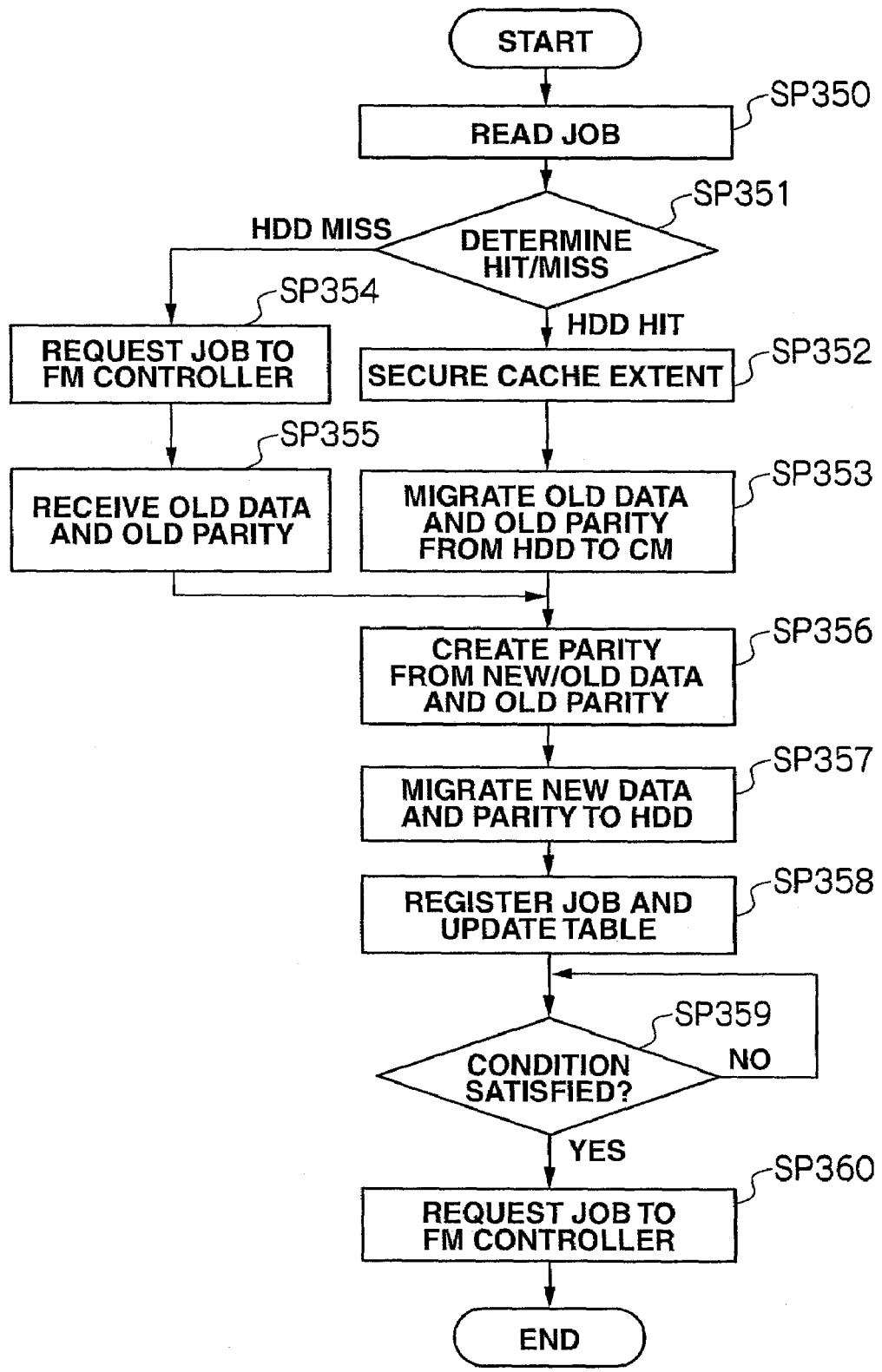
FIG. 34 is a flowchart explaining the processing contents of a disk controller during the second data write mode according to another embodiment of the present invention.
Figure 35:
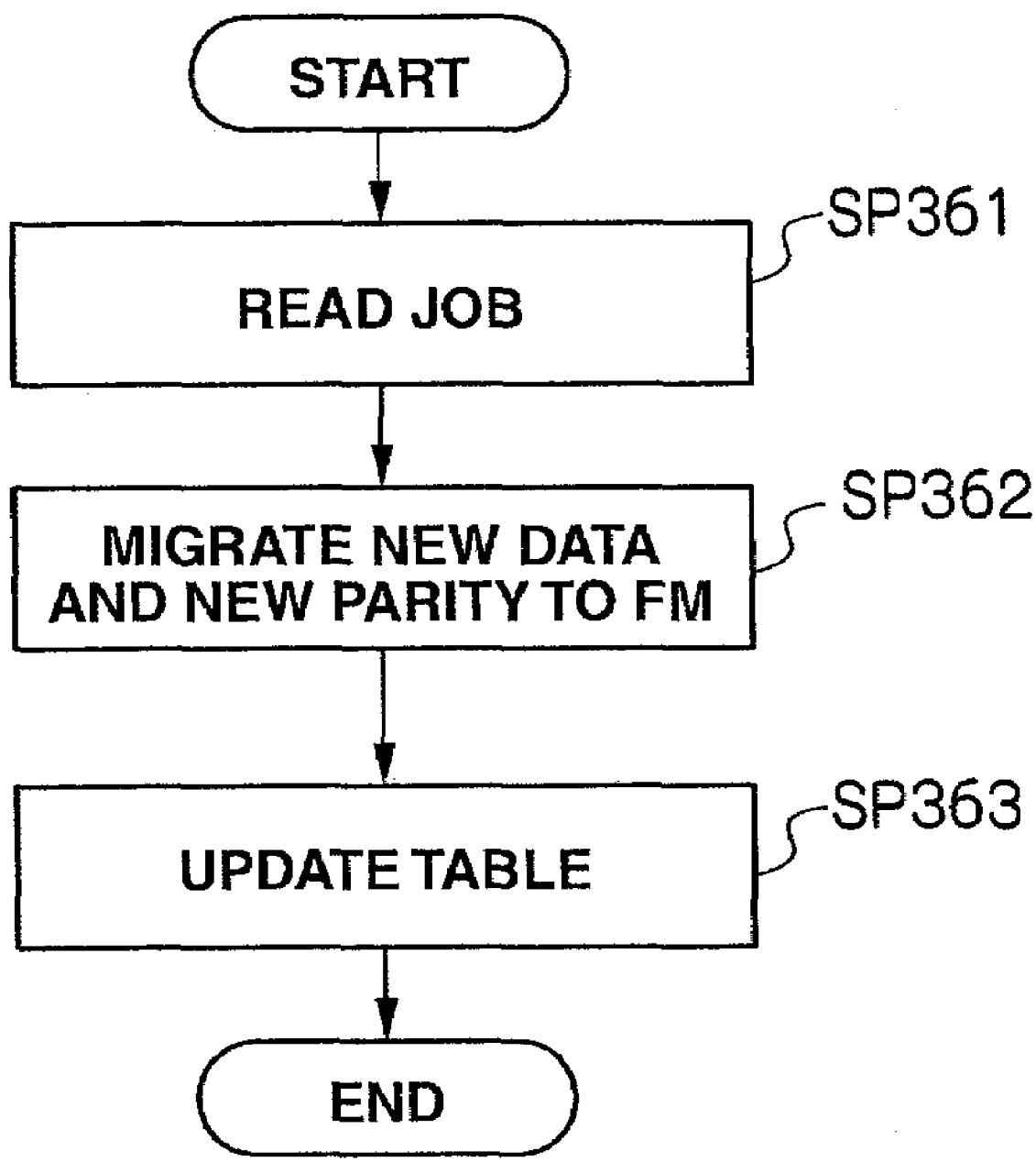
FIG. 35 is a flowchart explaining the processing performed by a microprocessor during the second data write mode according to another embodiment of the present invention.

FIG. 34 and FIG. 35 are flowcharts respectively showing the specific processing contents of the microprocessor 62A of the disk controller 62 (FIG. 34) and the specific processing contents of the microprocessor 63A of the flash memory controller 63 (FIG. 35) during the second data write mode. Incidentally, explanation of the specific processing contents of the microprocessor 61A of the channel controller 61 during the second data write mode is omitted since it is the same as the processing contents of the first mode cache write processing explained with reference to FIG. 12.

When the microprocessor 62A of the disk controller 62 detects that the corresponding "job" is stored in the shared memory 65 at step SP325 of FIG. 33, it starts the second mode hard disk write processing shown in FIG. 34, and reads this "job" from the shared memory 65.

Subsequently, the microprocessor 62A determines whether the corresponding old write-target data and its parity (old parity) are stored in the hard disk drive 41 (SP351). If the old write-target data and old parity are stored in the hard disk drive 41, as in step SPI 12-step SP113-step SP116-SP117 of the second mode hard disk write processing explained with reference to FIG. 16, the microprocessor 62A creates parity (new parity) of the write-target data based on such new/old write-target data and old parity, and stores the write-target data and new parity in the hard disk drive 41 (SP352-SP353-SP356-SP357).

Contrarily, when the corresponding old write-target data and old parity are not stored in the hard disk drive 41, the microprocessor 62A requests the flash memory controller 63 to migrates the old write-target data and old parity from the flash memory 20 to the hard disk drive 41 (SP354), and thereafter receives the old write-target data and old parity from the flash memory 20 (SP355).

The microprocessor 62A thereafter creates parity (new parity) of the write-target data based on the old write-target data and its old parity, and the write-target data read from the flash memory 20, and stores such write-target data and new parity in the hard disk drive 41 (SP356, SP357).

The microprocessor 62A thereafter registers the corresponding "job" in the shared memory 65 and updates the data management table 50 as in step SP118 of FIG. 16 (SP358).

Subsequently, as in the FM write timing detection processing explained with reference to FIG. 24, the microprocessor 62A waits for a predetermined period of time set in advance to elapse from the last time the write-target data in the hard disk drive 41 was migrated to the flash memory 20 (first condition), or the data volume of the write-target data stored in the hard disk drive 41 to exceed a predetermined data volume set in advance (second condition) (SP359).

When one of the foregoing two conditions is eventually satisfied, the microprocessor 62A, as in step SP70 to step SP72 of the first mode flash memory write processing explained with reference to FIG. 14, registers a job commanding the flash memory controller 63 to write the write-target data and new parity stored in the hard disk drive 41 in the shared memory 65 (SP360), and then ends this second mode hard disk write processing.

Meanwhile, when the microprocessor 63A of the flash memory controller 63 is sent the write-target data and new parity from the disk controller 62, it starts the second mode flash memory write processing shown in FIG. 35 and, thereafter, as in step SP120 to step SP122 of the second mode flash memory write processing explained with reference to FIG. 17, sequentially stores the write-target data and new parity given from the disk controller 62 in the flash memory 20 (SP361 to SP363).

When the microprocessor 63A completes storing the write-target data and new parity in the flash memory 20, it ends this second mode flash memory write processing.

In the foregoing processing, migration of data from the hard disk drive 41 to the flash memory 20 may also be performed by sending the write-target data and new parity from the disk controller 62 to the flash memory controller 63.

Further, the microprocessor 62A in the disk controller 62 may also store the write-target data and new parity in the flash memory 20.

(2-2-1-3) Third Data Write Mode

Figure 36:
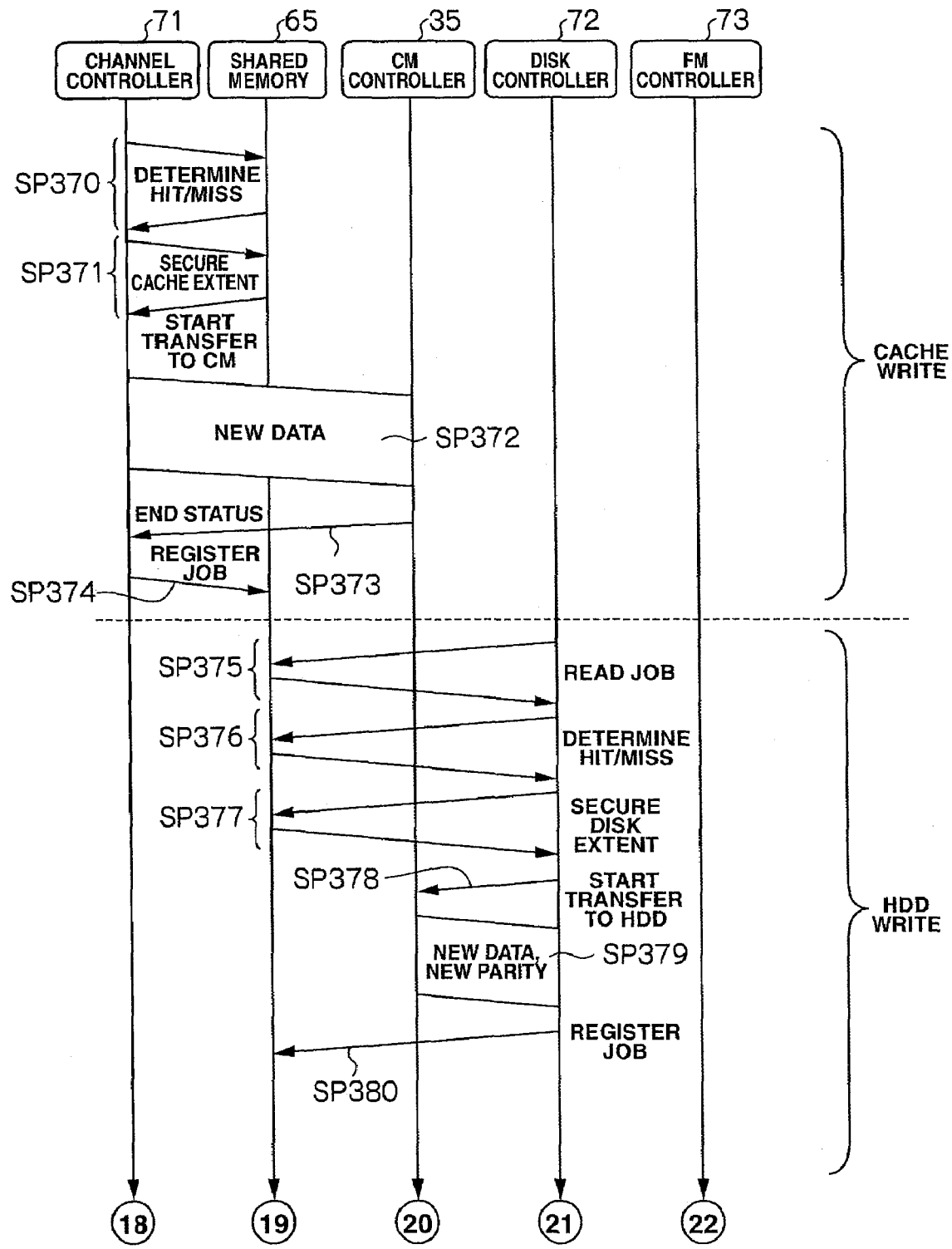
FIG. 36 is a ladder chart explaining the processing flow during a third data write mode according to another embodiment of the present invention.
Figure 37:
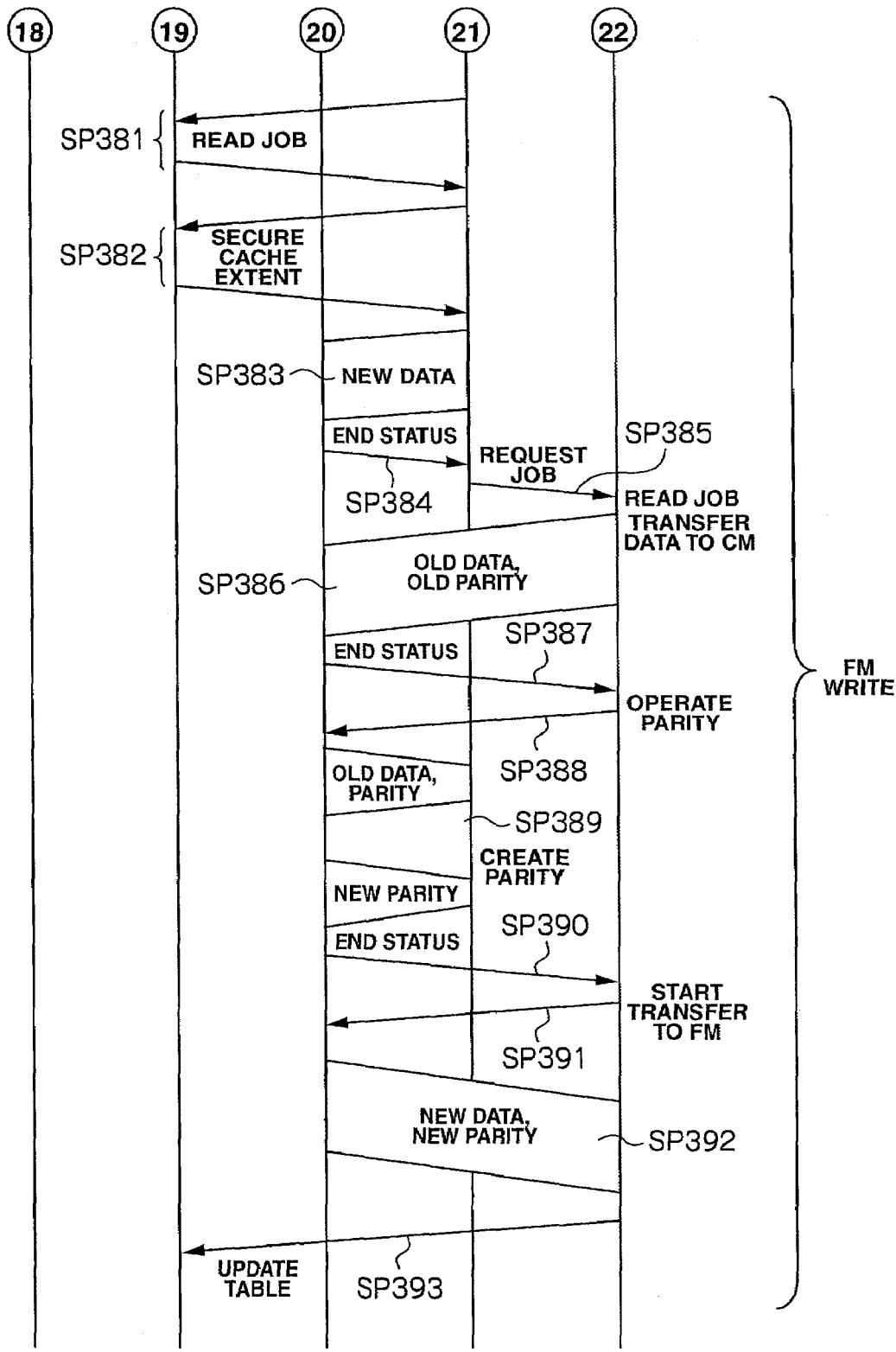
FIG. 37 is a ladder chart explaining the processing flow during a third data write mode according to another embodiment of the present invention.

FIG. 36 and FIG. 37 show the processing flow during the third data write mode in the storage system 60.

With the storage system 60, in a case where the third data write mode is set as the data write mode, when a data write request and write-target data are sent from the host 30, the channel controller 61 that received this data write request executes processing that is roughly the same as the processing explained with reference to step SP131 to step SP134 of FIG. 18 so as to duplicate such write-target data in the cache memory 34 (SP370 to SP372). The channel controller 61 thereafter registers the corresponding "job" in the shared memory 65 and updates the data management table 50 as in step SP137 of FIG. 18 (SP374).

Meanwhile, the disk controller 62 is periodically monitoring the shared memory 65, and, when it detects that the "job" has been registered in the shared memory 65, it executes processing that is roughly that same as the processing at step SP138 to step SP142 of FIG. 18 to duplicate such write-target data stored in the cache memory 34 in the hard disk drive 41 (SP375 to SP379).

The disk controller 62 thereafter registers the corresponding "job" in the shared memory 65 and updates the data management table 50 as in step SP145 of FIG. 18 (SP380).

Subsequently, when a predetermined period of time has elapsed from the last time the write-target data and new parity were migrated to the flash memory 20, or when the write-target data and new parity of a prescribed volume are accumulated in the hard disk drive 41, the disk controller 62 migrates the write-target data stored in the hard disk drive 41 to the cache memory 34 (SP381 to SP383), and thereafter requests (sends a job request to) the flash memory controller 63 to perform the subsequent processing (SP385).

Meanwhile, when the flash memory controller 63 receives this job request, it thereafter executes processing that is roughly the same as the processing at step SP153 to step SP160 of FIG. 19 so as to create parity (new parity) of the write-target data and store such write-target data and new parity in the flash memory 20 (SP386 to SP392). The flash memory controller 63 updates the data management table 50 as in step SP163 of FIG. 19 (SP393).

Figure 38:
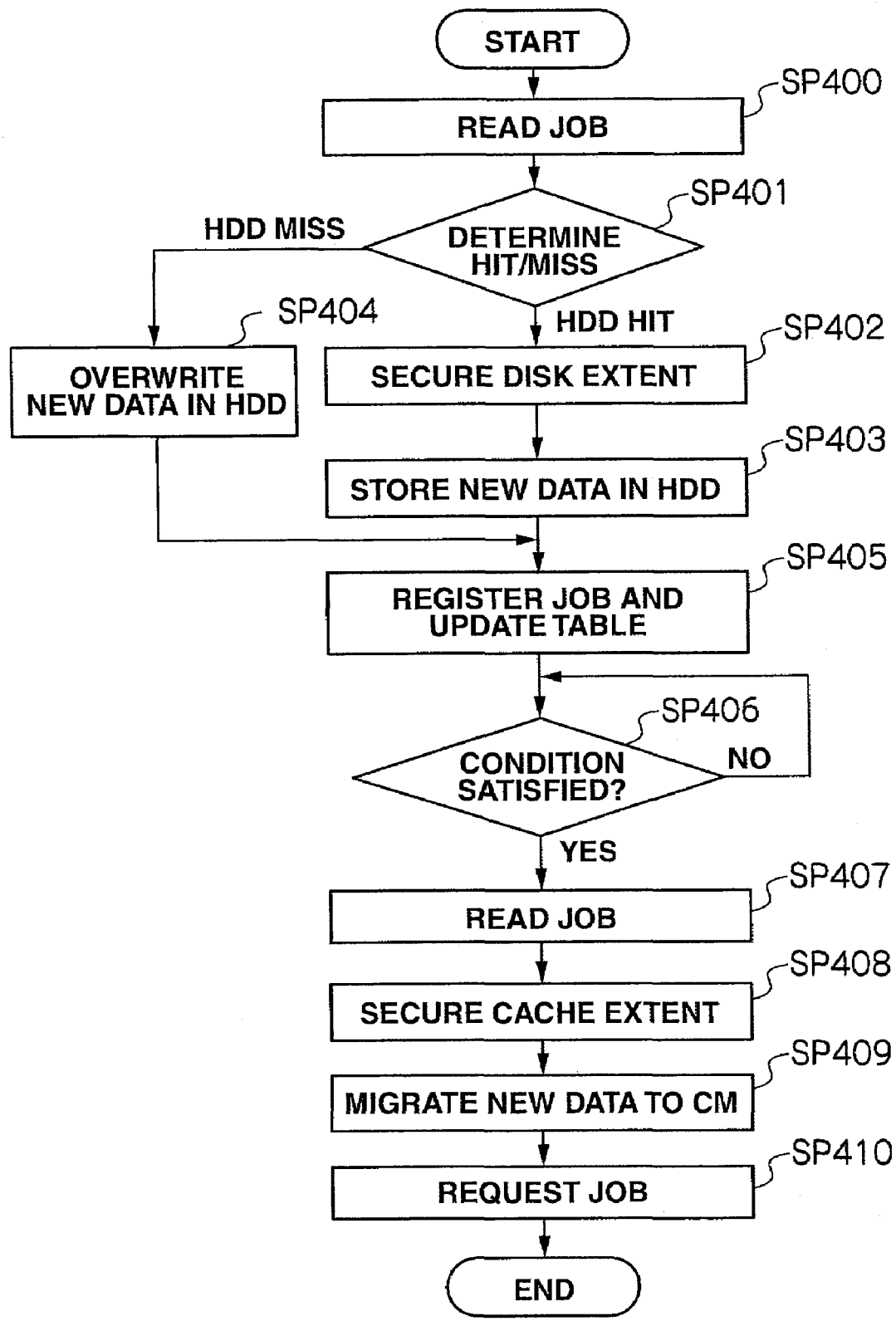
FIG. 38 is a flowchart explaining the processing contents of a disk controller during the third data write mode according to another embodiment of the present invention.

Here, FIG. 38 is a flowchart showing the specific processing contents of the microprocessor 62A of the disk controller 62 during the third data write mode. Incidentally, explanation of the specific processing contents of the microprocessor 61A of the channel controller 61 during the third data write mode is omitted since it is the same as the processing contents of the first mode cache write processing explained with reference to FIG. 12, and explanation of the specific processing contents of the microprocessor 63A of the flash memory controller 63 during the third data write mode is omitted since it is the same as the processing contents of the first mode flash memory write processing explained with reference to FIG. 32.

When the microprocessor 62A of the disk controller 62 detects that the corresponding "job" is stored in the shared memory 65, it starts the third mode hard disk write processing shown in FIG. 38, foremost reads the foregoing "job" from the shared memory 65 (SP400), and thereafter refers to the data management table 50 to determine whether the old write-target data is stored in the hard disk drive 41 (SP351).

When the microprocessor 62A determines that old write-target data is stored in the hard disk drive 41 (HDD hit), as in step SP172 and SP173 of the third mode hard disk write processing explained with reference to FIG. 20, it duplicates the write-target data stored in the cache memory 34 in the hard disk drive 41 (SP402, SP403).

Contrarily, when the microprocessor 62A determines that the old write-target data is not stored in the hard disk drive 41 (HDD miss), it overwrites the write-target data on the old write-target data in the hard disk drive 41 as in step SP174 of FIG. 20 (SP404).

The microprocessor 62A thereafter registers the corresponding "job" in the shared memory 65 and updates the data management table 50 as in step SP175 of FIG. 20 (SP405).

Subsequently, as in the FM write timing detection processing explained with reference to FIG. 24, the microprocessor 62A waits for a predetermined period of time set in advance to elapse from the last time the write-target data in the hard disk drive 41 was migrated to the flash memory 20 (first condition), or the data volume of the write-target data stored in the hard disk drive 41 to exceed a predetermined data volume set in advance (second condition) (SP406).

When one of the foregoing two conditions is eventually satisfied, the microprocessor 62A, as in step SP70 to step SP72 of the first mode flash memory write processing explained with reference to FIG. 14, migrates the write-target data stored in the hard disk drive 41 to the cache memory 20 (SP407 to SP409), thereafter requests the flash memory controller 73 to execute the subsequent "job" (SP410), and then ends this third mode hard disk write processing.

(2-2-1-4) Fourth Data Write Mode

Figure 39:
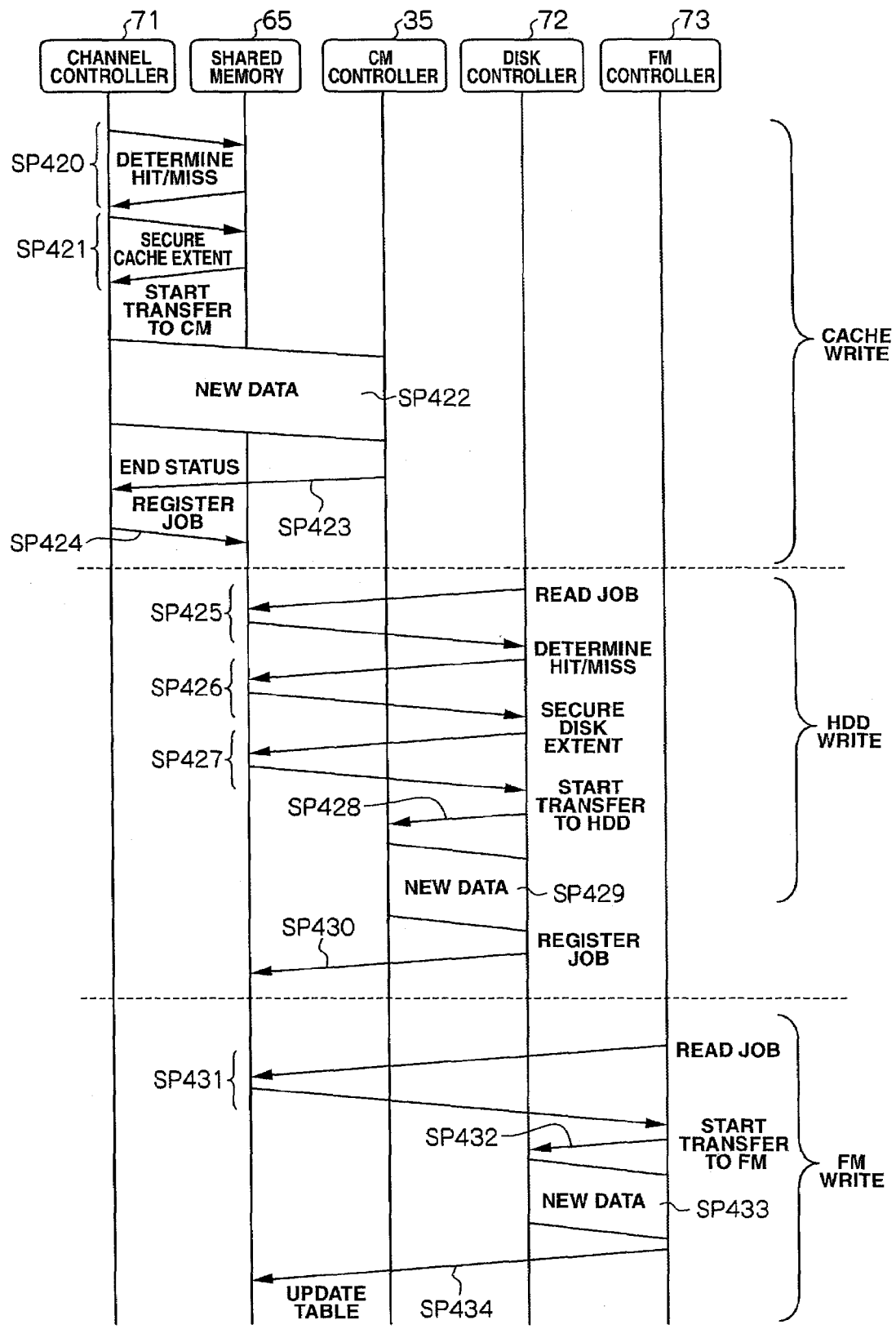
FIG. 39 is a ladder chart explaining the processing flow during a fourth data write mode according to another embodiment of the present invention.

FIG. 39 shows the processing flow during the fourth data write mode of the storage system 60.

With the storage system 60, in a case where the fourth data write mode is set as the data write mode, when a data write request and write-target data are sent from the host 30, the channel controller 61 that received this data write request executes processing that is roughly the same as the processing at step SP1 81 to step SP1 84 of the fourth data write processing explained with reference to FIG. 21 so as to duplicate such write-target data in the cache memory 34 (SP420 to SP422). The channel controller 61 thereafter registers the corresponding "job" in the shared memory 65 and updates the data management table 50 as in step SP1 8 of FIG. 21 (SP424).

The disk controller 62 is periodically monitoring the shared memory 65, and, when it detects that the "job" has been registered in the shared memory 65, it executes processing that is roughly that same as the processing at step SP188 to step SP192 of FIG. 21 to duplicate data, which was duplicated in the cache memory 34, in the hard disk drive 41 (SP425 to SP429). The disk controller 62 thereafter registers the corresponding "job" in the shared memory 65 and updates the data management table 50 as in step SP195 of FIG. 21 (SP434).

Further, the flash memory controller 63 is periodically monitoring the shared memory 65, and, when it detects that the "job" has been registered in the shared memory 65, it executes processing that is roughly that same as the processing at step SP196 to step SP198 of FIG. 21 to duplicate write-target data, which was duplicated in the hard disk drive 41, in the flash memory 34 (SP431 to SP433). The flash memory controller 63 thereafter updates the data management table 50 as in step SP20 of FIG. 21 (SP434).

Incidentally, explanation of the specific processing contents of the microprocessor 61A of the channel controller 61 during the fourth data write mode is omitted since it is the same as the processing contents of the first mode cache write processing explained with reference to FIG. 12, explanation of the specific processing contents of the microprocessor 62A of the disk controller 62 during the fourth data write mode is omitted since it is the same as the processing contents of the third mode hard disk write processing explained with reference to FIG. 38, and explanation of the specific processing contents of the microprocessor 63A of the flash memory controller 63 during the fourth data write mode is omitted since it is the same as the processing contents of the second mode flash memory write processing explained with reference to FIG. 35.

(2-2-2) Details of Data Read Processing

Details regarding the data read processing in the storage system 60 according to the present embodiment are now explained.

The storage system 60 of this embodiment, as with the storage system 1 of the first embodiment (FIG. 3), has the data read modes applying the first and second data read modes explained with reference to FIG. 4D-1 and FIG. 4D-2.

In the case of the storage system 60 of this embodiment also, a mode between the first and second data read modes is selected and designated by a user or a management computer (not shown) according to the structural specification, purpose of use, or operating status of the storage system 60; type of stored data; access characteristics from the host 30, and so on upon activating the storage system. Further, the microprocessor 39 may also automatically select a mode at an arbitrary opportunity while the storage system 60 is running. For example, when the read performance of the cache memory 34 is better than the read performance of the flash memory 20, or the data stored in the flash memory 20 is random access data, the first data read mode is selected. Meanwhile, for instance, when the connection 36 of the storage system is a crossbar switch, the second data read method is selected.

Incidentally, information on the selected data read method is registered in the memory 38, and each microprocessor 39 is able to refer to the data read method by accessing the memory 38.

Figure 40:
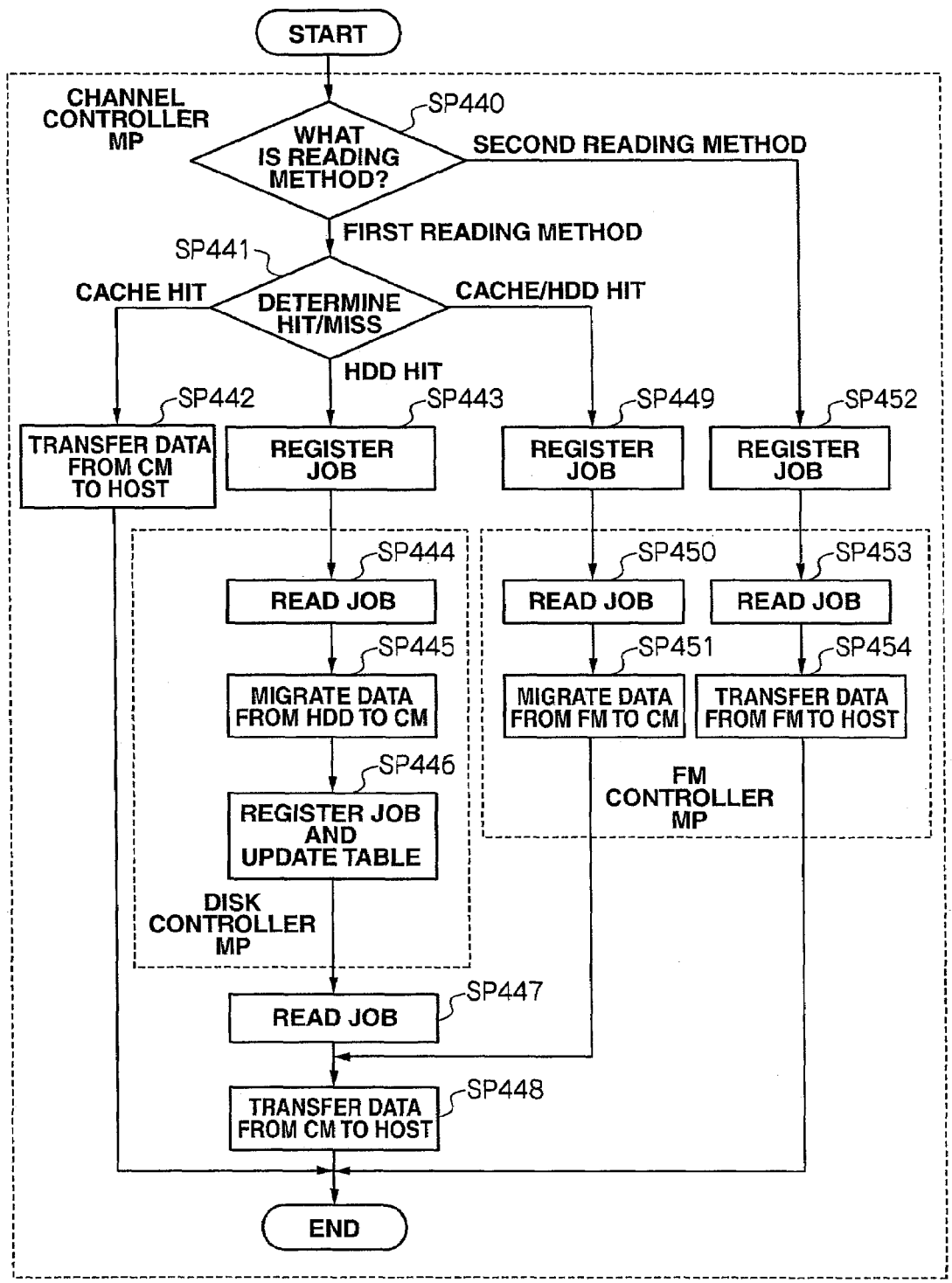
FIG. 40 is a flowchart showing the processing flow during the data read mode according to another embodiment of the present invention.

FIG. 40 is a flowchart showing the processing flow during the data read mode of the storage system 60 according to the present embodiment.

With the storage system 60, when a data read request is given from the host 30, the microprocessor 61A of the channel controller 61 that received this data read request foremost determines whether the first or second data read method is currently set as the data read method (SP440).

When the microprocessor 61A determines that the first data read method is set as the data read method, it performs the hit/miss determination as in step SP250 of the first data read processing explained with reference to FIG. 26 (SP441).

When the microprocessor 61A determines that the read-target data is stored in the cache memory 34 (cache hit), it controls the cache controller 35 accordingly to read the read-target data from the cache memory 34 and send it to the host 30 (SP442).

Meanwhile, when the microprocessor 61A determines at step SP441 that the read-target data is stored in the hard disk drive 41 (HDD hit), it stores the corresponding "job" in the shared memory 65 (SP443).

The microprocessor 62A of the disk controller 62 is periodically monitoring the shared memory 65, and, when it detects that the "job" has been registered in the shared memory 65, it reads this "job" (SP444), and thereafter reads the read-target data from the hard disk drive 41 and transfers it to the cache memory controller 35 (SP445). The cache memory controller 35 thereby stores the read-target data given from the disk controller 62 into the cache memory 34.

Further, the microprocessor 62A of the disk controller 62 registers the corresponding "job" of migrating the read-target data from the hard disk drive 41 to the cache memory 34 in the shared memory 65, and updates the data management table 50 accordingly (SP446).

Here, the microprocessor 62A of the channel controller 61 is monitoring the shared memory 65, and, when it detects that the "job" has been stored in the shared memory 65, it reads this "job" from the shared memory 65 (SP447), and thereafter reads the read-target data from the cache memory 34 based on the read "job" and transfers it to the host 30 (SP448).

Meanwhile, when the microprocessor 61A of the channel controller 61 determines at step SP441 that the read-target data is not stored in either the cache memory 34 or the hard disk drive 41 (cache miss, HDD miss), it registers a corresponding "job" in the shared memory 65 (SP449).

Here, the microprocessor 62A of the flash memory controller 63 is monitoring the shared memory 65, and, when it detects that the "job" has been stored in the shared memory 65, it reads this "job" from the shared memory 65 (SP450), and thereafter reads the read-target data from the flash memory 20 based on the read "job" and migrates it to the cache memory 34 (SP451). Thereby, the read-target data is thereafter read from the cache memory 34 and sent to the host 30 based on the control of the microprocessor 61A of the channel controller 61 (SP448).

Contrarily, when the microprocessor 61A of the channel controller 61 determines at step SP440 that the second data read method is set as the data read method, it registers a corresponding "job" in the shared memory 65 (SP452).

When the microprocessor 63A of the flash memory controller 63 detects that the "job" has been stored in the shared memory 65, it reads the "job" from the shared memory 65 (SP453) and, based on this "job", reads the read-target data from the flash memory 20 and sends it directly to the host 30 via the channel controller 61 (SP454).

(2-3) Effect of Present Embodiment

According to the foregoing configuration, the storage system 60 configured as illustrated in FIG. 28 is able to prolong the duration of the flash memory 20 and dramatically reduce problems arising in connection with malfunctions in the flash memory 20 as with the storage system 1 of the first embodiment. Thereby, it is possible to realize a highly reliable storage apparatus with high access speed and low power consumption.

(2) THIRD EMBODIMENT (3-1) Configuration of Storage System in Third Embodiment

Figure 41:
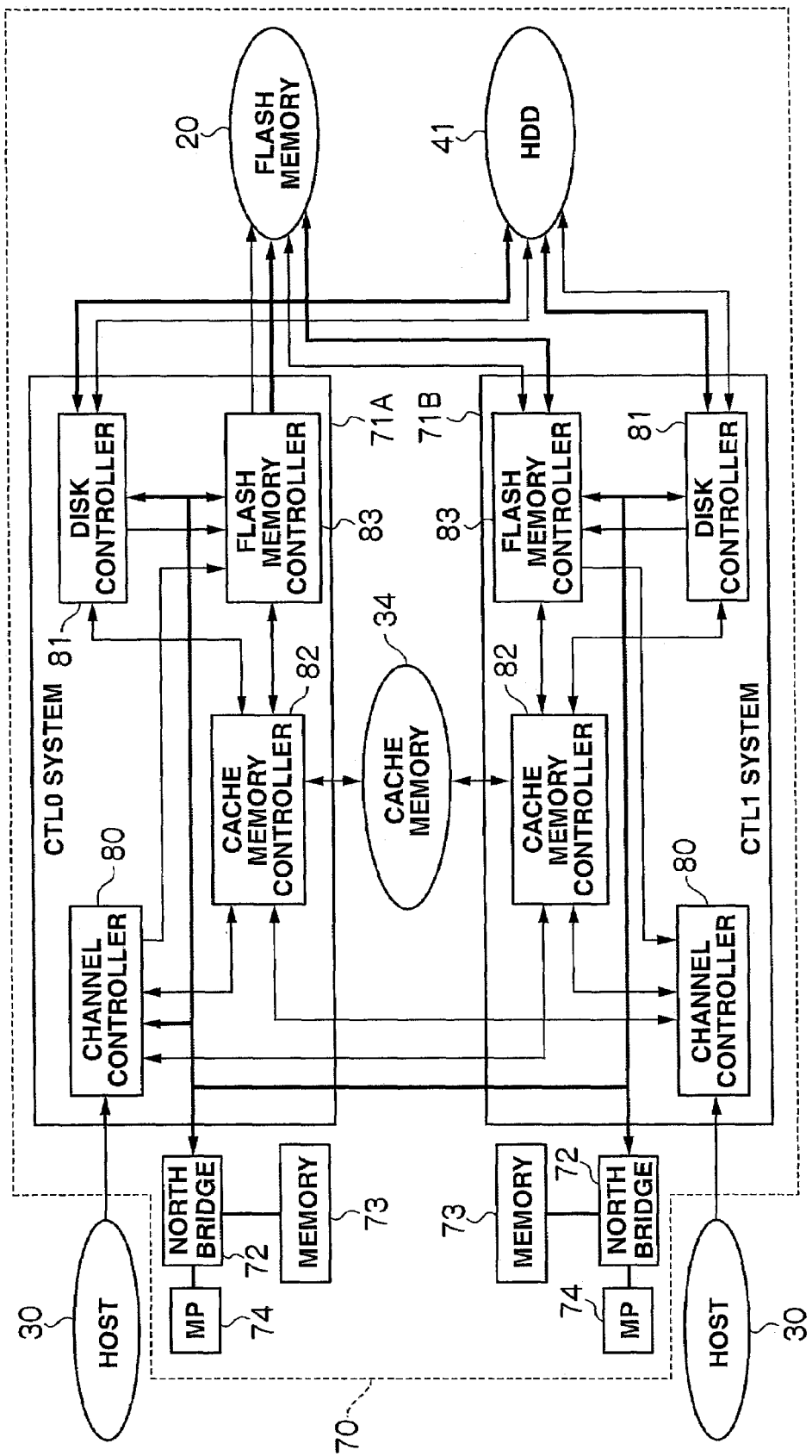
FIG. 41 is a block diagram showing the internal configuration of a storage system according to yet another embodiment of the present invention.

FIG. 41, which is given the same reference numerals for the components corresponding to those illustrated in FIG. 3, shows a storage system 70 according to the third embodiment. The storage system 70 comprises two controller units 71A, 71 B of a "0 system" and "1 system"; a north bridge 72, a memory 73 and a microprocessor 74 provided in association with the respective controller units 71A, 71 B; a cache memory 34, a flash memory 20, and a hard disk drive 41.

Each controller unit 71A, 71 B comprises a channel controller 80, a disk controller 81, a cache memory controller 82, and a flash memory controller 83. The channel controller 80, the disk controller 81, the cache memory controller 82 and the flash memory controller 83 have the same functions as the channel controller 31, the disk controller 32, the cache memory controller 35 and the flash memory controller 33 of the first embodiment depicted in FIG. 3, and the explanation thereof is omitted.

The north bridge 72, the memory 73 and the microprocessor 74 have the same functions as the north bridge 37, the memory 40 and the microprocessor 39 of the first embodiment, and the explanation thereof is omitted. Incidentally, in FIG. 41, the thick lines represent a control line and the thin lines represent a data line.

Accordingly, with the storage system 70, the same data write processing and data read processing of the first embodiment explained with reference to FIG. 10 to FIG. 26 are performed.

(3-2) Effect of Present Embodiment

According to the foregoing configuration, the storage system 70 configured as illustrated in FIG. 41 is able to prolong the duration of the flash memory 20 and dramatically reduce problems arising in connection with malfunctions in the flash memory 20 as with the storage system 1 of the first embodiment. Thereby, it is possible to realize a highly reliable storage apparatus with high access speed and low power consumption.

(3) OTHER EMBODIMENTS

Figure 42:
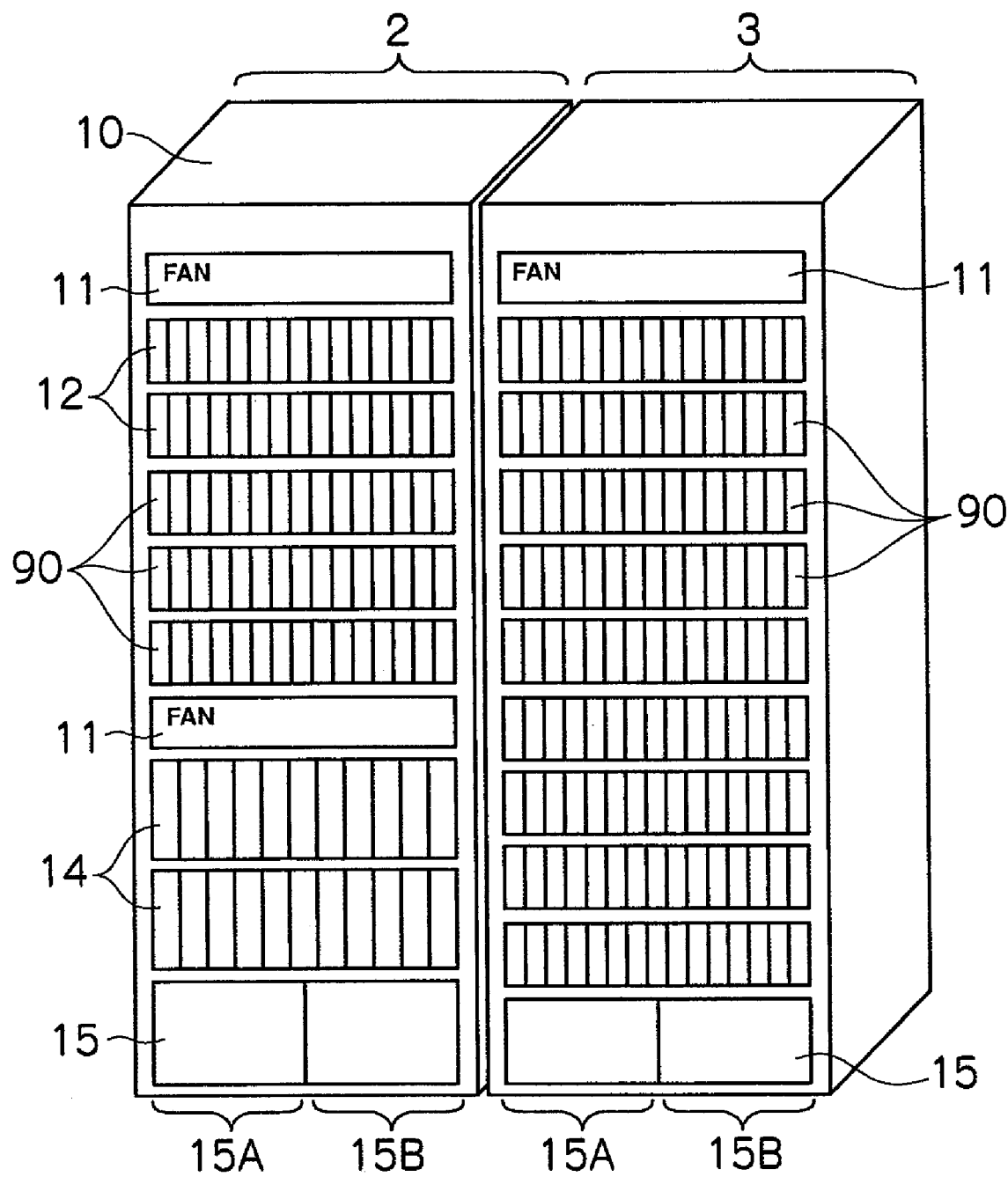
FIG. 42 is a perspective view schematically showing the external configuration of a storage system according to another embodiment.

Incidentally, in the first to third embodiments described above, although a case was explained without giving any consideration to the compatibility of the flash memory package 13 and the hard disk drive unit 12, the present invention is not limited thereto, and, for instance, as shown in FIG. 42 given the same reference numerals for the components corresponding to those illustrated in FIG. 1, the flash memory package 90 and the hard disk drive 41 may be formed to be in the same size and shape in order to realize compatibility between the flash memory package 90 and the hard disk drive 41.

Further, in the first and second embodiments described above, although a case was explained of using the hard disk drive 41 as a disk-shaped memory device with a greater data write cycle than the flash memory 20, the present invention is not limited thereto, and various other disk-shaped memory devices can be broadly applied.

Moreover, in the first and third embodiments described above, although a case was explained where the first control unit for controlling the reading and writing of data from and into the flash memory 20 was configured from the flash memory controller 33 and the microprocessor 39, and the first control unit was configured from the flash memory controller 61 in the second embodiment, various other configurations may be broadly applied for the configuration of the first control unit.

Similarly, in the first and third embodiments described above, although a case was explained where the second control disk for controlling the reading and writing of data from and into the hard disk drive 41 was configured from the disk controller 32 and the microprocessor 39, and the second control unit was configured from the disk controller 62 in the second embodiment, various other configurations may be broadly applied for the configuration of the second control unit.

Further, in the first to third embodiments described above, although a case was explained where the third control unit for controlling the reading and writing of data from and into the cache memory 34 was configured from the cache memory controller 35 and the microprocessor 39, various other configurations may be broadly applied for the configuration of the third control unit.

Incidentally, in the first to third embodiments described above, as shown in FIG. 4A, the write-target data sent from the host 30 is stored in the cache memory 34, and thereafter migrated to the flash memory 20 at a prescribed timing via the hard disk drive 41. Here, when the capacity of the cache memory 34 is large or depending on the type of access characteristics of data, data may be migrated from the cache memory 34 to the flash memory 20. Further, the sending and receiving of data and control information in the configuration of the storage system 1, the storage system 60 or the storage system 70 in the embodiments described above can be executed among all realizable structural components.

The present invention can be broadly applied to various storage systems to be used in various applications.

We claim:

1. A storage apparatus connected to a host system, comprising:
   a nonvolatile memory for storing data sent and received from said host system;
   a disk device for storing data sent and received from said host system;
   a cache memory for temporarily storing data sent and received from said host system;
   a first control unit for controlling the reading and writing of said data from and into said nonvolatile memory;
   a second control unit for controlling the reading and writing of said data from and into said disk device; and
   a third control unit for controlling the reading and writing of said data from and into said cache memory;
   wherein said first, second and third control units are connected via a mutual network;
   said third control unit stores said data sent from said host system in said cache memory, and reads said data from said cache memory at a prescribed opportunity and sends it to said second control unit;
   said second control unit stores said data sent from said third control unit in said disk device and, when a prescribed condition is satisfied, reads said data from said disk device and sends it to said first control unit; and
   said first control unit stores said data sent from said second control unit in said nonvolatile memory.

2. The storage apparatus according to claim 1, further comprising a fourth control unit for controlling the sending and receiving of data to and from said host system;
   wherein said fourth control unit determines whether said data is stored in either said cache memory or said disk device upon receiving a read request of said data from said host system, makes said third control unit read said data from said cache memory when said data is stored in said cache memory, and sends the read data to said host system.

3. The storage apparatus according to claim 1, further comprising a fourth control unit for controlling the sending and receiving of data to and from said host system;
   wherein said fourth control unit determines whether said data is stored in either said cache memory or said disk device upon receiving a read request of said data from said host system, makes said second control unit read said data from said disk device when said data is stored in said disk device, and sends the read data to said host system via said cache memory.

4. The storage apparatus according to claim 1, further comprising a fourth control unit for controlling the sending and receiving of data to and from said host system;
   wherein said fourth control unit determines whether said data is stored in either said cache memory or said disk device upon receiving a read request of said data from said host system, makes said first control unit read said data from said nonvolatile memory when said data is not stored in either said cache memory or said disk device, and sends the read data to said host system via said cache memory or directly.

5. The storage apparatus according to claim 1, wherein said prescribed condition is at least one of either a predetermined period of time lapsing from the last time said data stored in said disk device was migrated to said nonvolatile memory, or a data volume of said data stored in said disk device exceeding a prescribed volume.

6. The storage apparatus according to claim 1, wherein said second control unit and/or first control unit duplicates said data with dual writing or parity and stores it in the corresponding said disk device or said nonvolatile memory.

7. A controller for controlling a storage apparatus connected to a host system, comprising:
   a first control unit for controlling the reading and writing of data from and into a nonvolatile memory storing said data to be sent and received from said host system;
   a second control unit for controlling the reading and writing of data from and into a disk device storing data to be sent and received from said host system; and
   a third control unit for controlling the reading and writing of data from and into a cache memory temporarily storing said data to be sent and received from said host system;
   wherein said first, second and third control units are connected via a mutual network;
   said third control unit stores said data sent from said host system in said cache memory, and reads said data from said cache memory at a prescribed opportunity and sends it to said second control unit;
   said second control unit stores said data sent from said third control unit in said disk device and, when a prescribed condition is satisfied, reads said data from said disk device and sends it to said first control unit; and
   said first control unit stores said data sent from said second control unit in said nonvolatile memory.

8. The controller according to claim 7, further comprising a fourth control unit for controlling the sending and receiving of data to and from said host system;
   wherein said fourth control unit determines whether said data is stored in either said cache memory or said disk device upon receiving a read request of said data from said host system, makes said third control unit read said data from said cache memory when said data is stored in said cache memory, and sends the read data to said host system.

9. The controller according to claim 7, further comprising a fourth control unit for controlling the sending and receiving of data to and from said host system;
   wherein said fourth control unit determines whether said data is stored in either said cache memory or said disk device upon receiving a read request of said data from said host system, makes said second control unit read said data from said disk device when said data is stored in said disk device, and sends the read data to said host system via said cache memory.

10. The controller according to claim 7, further comprising a fourth control unit for controlling the sending and receiving of data to and from said host system;
    wherein said fourth control unit determines whether said data is stored in either said cache memory or said disk device upon receiving a read request of said data from said host system, makes said first control unit read said data from said nonvolatile memory when said data is not stored in either said cache memory or said disk device, and sends the read data to said host system via said cache memory or directly.

11. The controller according to claim 7, wherein said prescribed condition is at least one of either a predetermined period of time lapsing from the last time said data stored in said disk device was migrated to said nonvolatile memory, or a data volume of said data stored in said disk device exceeding a prescribed volume.

12. The controller according to claim 7, wherein said second control unit and/or first control unit duplicates said data with dual writing or parity and stores it in the corresponding said disk device or said nonvolatile memory.

13. A control method of controlling a storage apparatus connected to a host system;
    wherein said storage apparatus comprises:
    a nonvolatile memory for storing data sent and received from said host system;
    a disk device for storing data sent and received from said host system; and
    a cache memory for temporarily storing data sent and received from said host system;
    wherein said control method comprises:
    a first step, performed by a third control unit, of controlling reading and writing of data from and into said cache memory including writing said data sent from said host system in said cache memory at a prescribed opportunity;
    a second step, performed by a second control unit of controlling reading and writing of data from and into said disk device including writing said data sent from said third control unit in said disk device and, when a prescribed condition is satisfied, reading said data from said disk device; and
    a third step, performed by a first control unit of controlling reading and writing of data from and into said nonvolatile memory including writing said data read from said disk device in said nonvolatile memory.

14. The control method according to claim 13, further comprising a fourth step for determining whether said data is stored in either said cache memory or said disk device upon receiving a read request of said data from said host system, reading said data from said cache memory when said data is stored in said cache memory, and sending the read data to said host system.

15. The control method according to claim 13, further comprising a fourth step for determining whether said data is stored in either said cache memory or said disk device upon receiving a read request of said data from said host system, reading said data from said disk device when said data is stored in said disk device, and sending the read data to said host system via said cache memory.

16. The control method according to claim 13, further comprising a fourth step for determining whether said data is stored in either said cache memory or said disk device upon receiving a read request of said data from said host system, reading said data from said nonvolatile memory when said data is not stored in either said cache memory or said disk device, and sending the read data to said host system via said cache memory or directly.

17. The control method according to claim 13, wherein said prescribed condition is at least one of either a predetermined period of time lapsing from the last time said data stored in said disk device was migrated to said nonvolatile memory, or a data volume of said data stored in said disk device exceeding a prescribed volume.

18. The control method according to claim 13, wherein at said second and/or first step, said data is duplicated with dual writing or parity, and stored in the corresponding said disk device or said nonvolatile memory.

* * * * *